(12) United States Patent
Nakahori et al.

(10) Patent No.: US 8,279,629 B2
(45) Date of Patent: Oct. 2, 2012

(54) SWITCHING POWER SUPPLY

(75) Inventors: Wataru Nakahori, Tokyo (JP); Shinya Ofuji, Tokyo (JP)

(73) Assignee: TDK Corporation, Tokyo (JP)

( * ) Notice: Subject to any disclaimer, the term of this patent is extended or adjusted under 35 U.S.C. 154(b) by 244 days.

(21) Appl. No.: 12/842,161

(22) Filed: Jul. 23, 2010

(65) Prior Publication Data

US 2011/0026276 A1  Feb. 3, 2011

(30) Foreign Application Priority Data

Jul. 29, 2009 (JP) ................. 2009-176534
Sep. 11, 2009 (JP) ................. 2009-210458
May 31, 2010 (JP) ................. 2010-124610

(51) Int. Cl.
*H02M 3/335* (2006.01)
(52) U.S. Cl. ............... 363/17; 363/98; 363/132
(58) Field of Classification Search .......... 363/17, 363/37, 56.02, 98, 132, 133, 136
See application file for complete search history.

(56) References Cited

U.S. PATENT DOCUMENTS

| | | | |
|---|---|---|---|
| 5,291,382 A | 3/1994 | Cohen | |
| 5,619,404 A | 4/1997 | Zak | |
| 5,784,266 A | 7/1998 | Chen | |
| 6,115,267 A | 9/2000 | Herbert | |
| 6,304,460 B1 | 10/2001 | Cuk | |
| 6,343,021 B1 | 1/2002 | Williamson | |
| 6,388,896 B1 | 5/2002 | Cuk | |
| 6,396,714 B2 * | 5/2002 | Kato | 363/17 |
| 6,400,579 B2 | 6/2002 | Cuk | |
| 6,462,962 B1 | 10/2002 | Cuk | |
| 6,594,158 B2 | 7/2003 | Batarseh et al. | |
| 6,807,069 B2 | 10/2004 | Nieminen et al. | |
| 6,865,096 B1 | 3/2005 | Geissler | |
| 6,906,930 B2 | 6/2005 | Jang et al. | |

(Continued)

FOREIGN PATENT DOCUMENTS

GB    2 394 369 A    4/2004

(Continued)

OTHER PUBLICATIONS

Endo et al., "A Novel Single-Stage Active Clamped PFC Converter," Intelec 2003, International Telecommunications Energy Conference, Conf. 25, Yokohama, Japan, Oct. 19-23, 2003, pp. 124-131.

(Continued)

*Primary Examiner* — Nguyen Tran
(74) *Attorney, Agent, or Firm* — Oliff & Berridge, PLC

(57) ABSTRACT

A switching power supply includes: a transformer including primary and secondary windings; a switching circuit including first and second switching elements, first and second rectifying elements, first and second capacitive elements and a first inductor; and a rectifying/smoothing circuit. A first bridge circuit is configured by the first and second switching elements located in a diagonal arrangement and the first and second capacitive elements also located in a diagonal arrangement. The first and second rectifying elements are connected in parallel to the first and second switching elements, respectively. One of the first and second rectifying elements is in forward direction and other is in inverse direction. The first inductor is disposed on a connection line between the pair of input terminals and the first bridge circuit. The primary winding is connected to the first bridge circuit to form a H-bridge configuration. The secondary winding is disposed in the rectifying/smoothing circuit.

18 Claims, 61 Drawing Sheets

U.S. PATENT DOCUMENTS

| | | |
|---|---|---|
| 7,130,205 B2 | 10/2006 | Peng |
| 7,145,786 B2 * | 12/2006 | Vinciarelli ................ 363/17 |
| 7,164,589 B1 | 1/2007 | Soldano et al. |
| 7,215,560 B2 | 5/2007 | Soldano et al. |
| 7,336,512 B2 | 2/2008 | Geissler |
| 7,355,868 B2 | 4/2008 | Soldano |
| 7,405,955 B2 * | 7/2008 | Nakahori ................ 363/52 |
| 7,535,205 B2 | 5/2009 | Popescu et al. |
| 7,605,570 B2 | 10/2009 | Liu et al. |
| 7,701,182 B2 | 4/2010 | Yoshida |
| 2005/0041439 A1 * | 2/2005 | Jang et al. ................ 363/17 |
| 2006/0198172 A1 | 9/2006 | Wood |
| 2008/0074905 A1 | 3/2008 | Moiseev et al. |
| 2008/0101097 A1 | 5/2008 | Kawasaki et al. |
| 2008/0212341 A1 | 9/2008 | Moiseev |
| 2008/0278972 A1 | 11/2008 | Kimura |
| 2009/0128277 A1 | 5/2009 | Moiseev |

FOREIGN PATENT DOCUMENTS

| | | |
|---|---|---|
| JP | A-4-364358 | 12/1992 |
| JP | A-5-276751 | 10/1993 |
| JP | A-9-63782 | 3/1997 |
| JP | A-9-149648 | 6/1997 |
| JP | A-10-178775 | 6/1998 |
| JP | A-2003-92876 | 3/2003 |
| JP | A-2003-92877 | 3/2003 |
| JP | A-2003-92881 | 3/2003 |
| JP | A-2003-102175 | 4/2003 |
| JP | A-2003-533163 | 11/2003 |
| JP | B2-3486603 | 1/2004 |
| JP | B2-3557385 | 8/2004 |
| JP | A-2004-260991 | 9/2004 |
| JP | A-2005-51994 | 2/2005 |
| JP | A-2005-51995 | 2/2005 |
| JP | B2-3665021 | 6/2005 |
| JP | B2-3665023 | 6/2005 |
| JP | B2-3665054 | 6/2005 |
| JP | B2-3673075 | 7/2005 |
| JP | A-2006-115660 | 4/2006 |
| JP | B2-3790256 | 6/2006 |
| JP | A-2006-211773 | 8/2006 |
| JP | A-2007-28894 | 2/2007 |
| JP | A-2007-43858 | 2/2007 |
| JP | A-2007-189835 | 7/2007 |
| JP | A-2007-236155 | 9/2007 |
| JP | A-2007-236156 | 9/2007 |
| JP | A-2007-311397 | 11/2007 |
| JP | A-2007-318999 | 12/2007 |
| JP | A-2008-72840 | 3/2008 |
| JP | A-2008-79454 | 4/2008 |
| JP | A-2008-99514 | 4/2008 |
| JP | A-2008-113532 | 5/2008 |
| JP | A-2008-113548 | 5/2008 |
| JP | A-2008-199878 | 8/2008 |
| JP | A-2008-535460 | 8/2008 |
| JP | B2-4136342 | 8/2008 |
| JP | A-2008-283819 | 11/2008 |
| JP | A-2008-289228 | 11/2008 |
| JP | A-2009-11109 | 1/2009 |
| JP | A-2009-123935 | 6/2009 |
| JP | A-2009-188746 | 8/2009 |
| WO | WO 01/73931 A1 | 10/2001 |
| WO | WO 01/86792 A1 | 11/2001 |
| WO | WO 02/21672 A1 | 3/2002 |
| WO | WO 02/089303 A1 | 11/2002 |
| WO | WO 2006/052794 A2 | 5/2006 |
| WO | WO 2006/105247 A2 | 10/2006 |
| WO | WO 2009/070031 A1 | 6/2009 |

OTHER PUBLICATIONS

European Search Report completed Nov. 23, 2010 in European Application No. EP 10 00 7857.

* cited by examiner

|  | V13>V14 | V13<V14 |
|---|---|---|
| CTL2 | H | L |
| CTL1 | L | H |

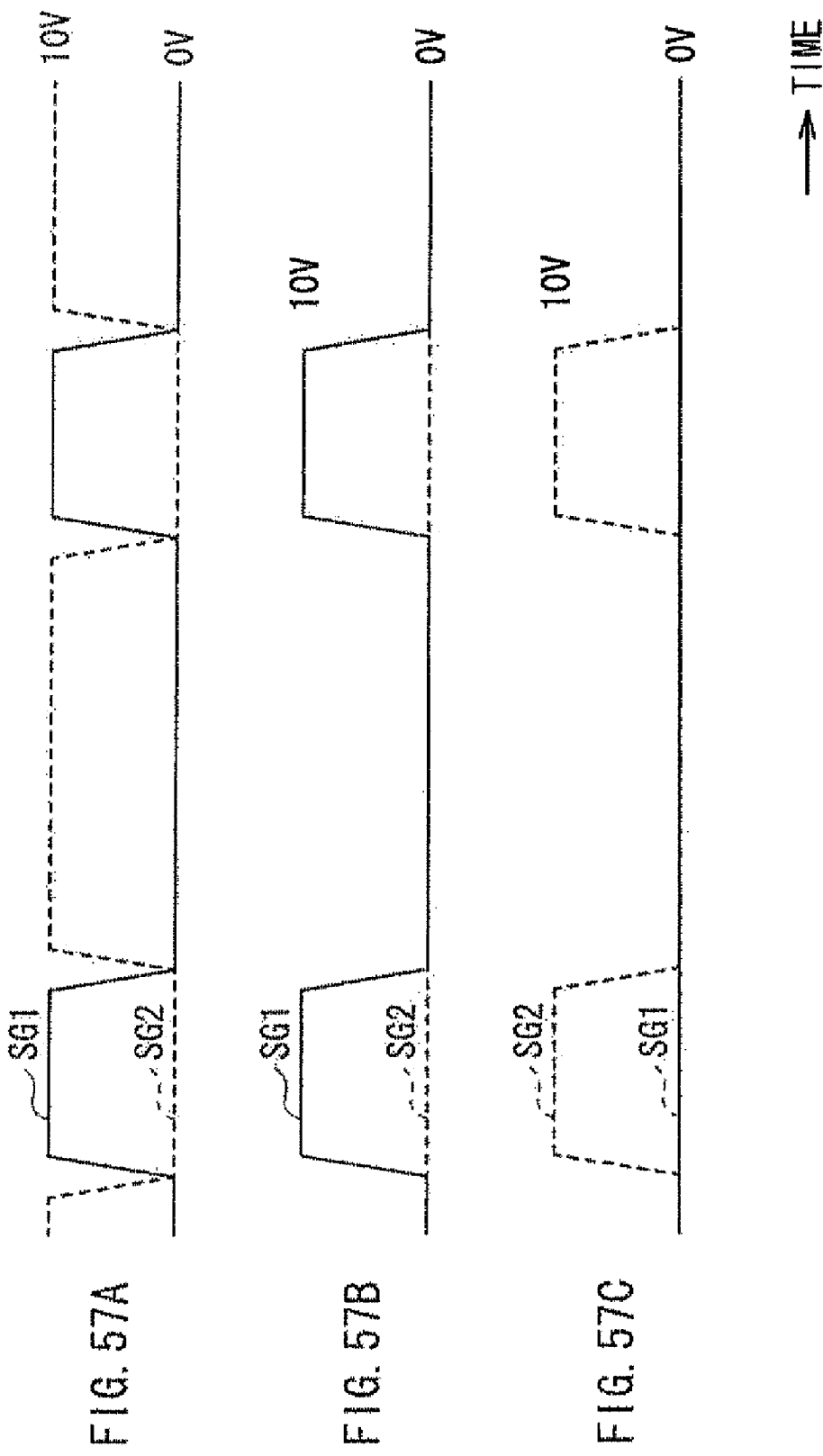

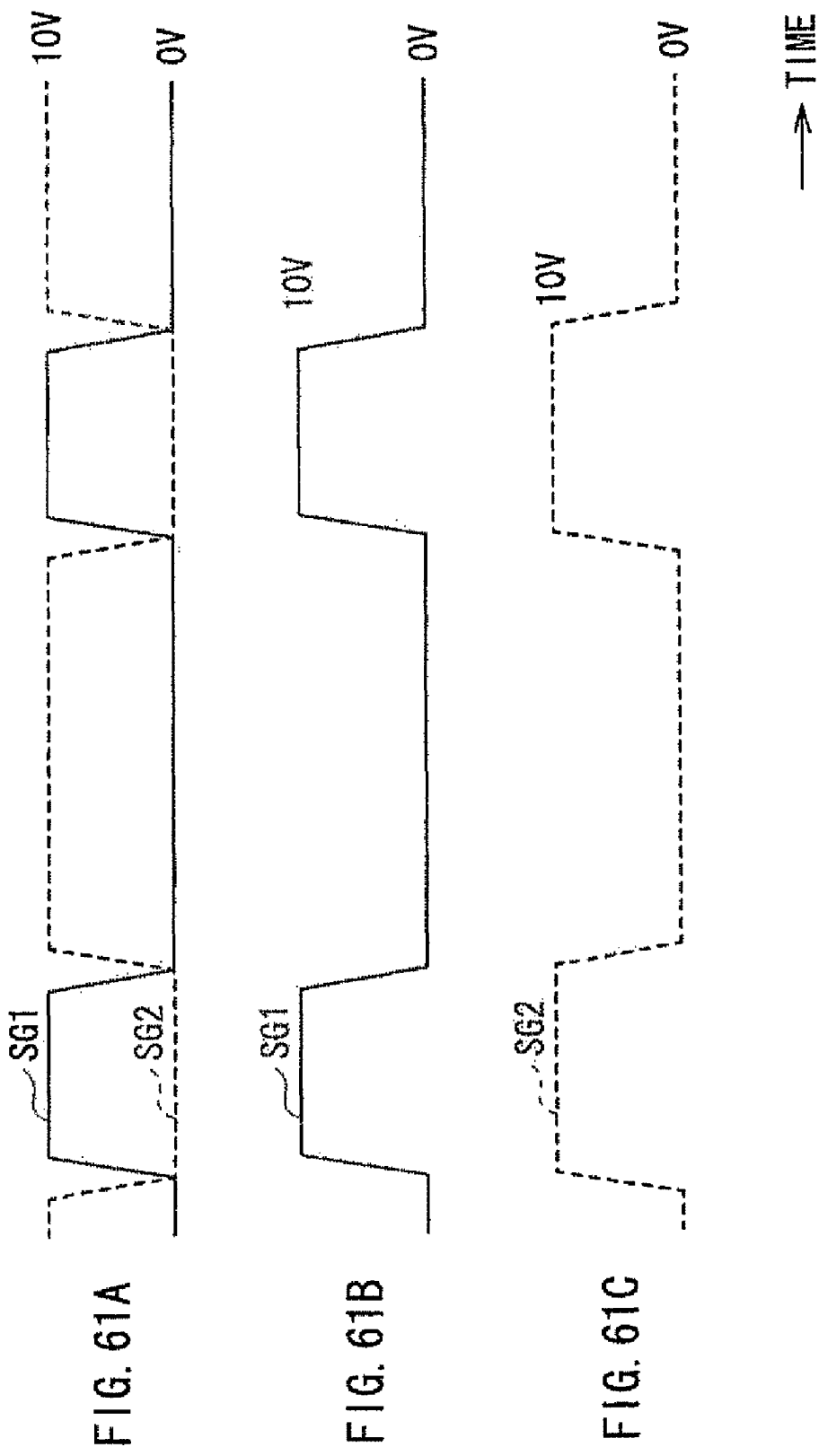

SWITCHING POWER SUPPLY

BACKGROUND OF THE INVENTION

1. Field of the Invention

The present invention relates to a switching power supply provided with a switching circuit and a rectifying/smoothing circuit.

2. Description of the Related Art

For use as a switching power supply, various types of DC (Direct Current)-DC converters have been proposed and actually used. Such DC-DC converters are often of a type in which the switching operation of a switching circuit (inverter circuit) causes a switching of a DC input voltage. The switching circuit is the one connected to the primary winding of a power conversion transformer (transformer element). The resulting switching output (inverter output) is then led to the secondary winding of the power conversion transformer (transformer). The voltage appeared in the secondary winding as such as a result of the switching operation of the switching circuit is rectified by a rectifying circuit, and then is converted into DC by a smoothing circuit before output.

Such a DC-DC converter is not the only example for use as a switching power supply, and various types of AC (Alternating Current)-DC converters have been also proposed in which an AC input voltage is converted into a DC output voltage. An example includes Japanese Patent No. 3486603.

SUMMARY OF THE INVENTION

In order to keep up with various different application uses expected in these days for such switching power supplies, the switching power supplies seem to be expected to have a higher degree of operation flexibility, e.g., capable of functioning both as a DC-DC converter and an AC-DC converter. Also in view of the simplicity of the device configuration, the switching power supplies are hoped to operate as a DC-DC converter with a simple configuration.

It is thus desirable to provide a switching power supply that may be with a higher degree of operation flexibility.

It is also desirable to provide a switching power supply in a simple configuration.

A first switching power supply in an embodiment of the invention generates a Direct-Current (DC) output voltage by conversion of an input voltage coming from a pair of input terminals, and outputs the resulting DC output voltage from a pair of output terminals. Such a switching power supply includes a transformer, a switching circuit, and a rectifying/smoothing circuit. The transformer includes a primary winding disposed on the side of the pair of input terminals, and a secondary winding disposed on the side of the pair of output terminals. The switching circuit is disposed on the side of the pair of input terminals, and including first and second switching elements, first and second rectifying elements, first and second capacitive elements, and a first inductor. The rectifying/smoothing circuit is disposed on the side of the pair of output terminals. In the switching circuit, a first bridge circuit is configured by the first and second switching elements located in a diagonal arrangement, and by the first and second capacitive elements also located in a diagonal arrangement. The first rectifying element is connected in parallel to the first switching element, and the second rectifying element is connected in parallel to the second switching element. One of these first and second rectifying elements is connected in forward direction and other is connected in inverse direction. The first inductor is disposed on a connection line between the pair of input terminals and the first bridge circuit. The primary winding is connected to the first bridge circuit to form a H-bridge configuration, and the secondary winding is disposed in the rectifying/smoothing circuit.

With the first switching power supply in the embodiment of the invention, an AC voltage is generated by the switching circuit by a switching of a DC or AC input voltage coming from the pair of input terminals. Thus generated AC voltage is transformed by the transformer, and the resulting AC voltage is then rectified and smoothed by the rectifying/smoothing circuit, whereby the pair of output terminals output a DC output voltage. That is, with the configuration including the switching circuit described as above, the transformer, and the rectifying/smoothing circuit, the resulting switching power supply may operate both as a DC-DC converter, i.e., generates a DC output voltage by conversion of a DC input voltage, and as an AC-DC converter, i.e., generates a DC output voltage by conversion of an AC input voltage, only with a single circuit, for example.

With the first switching power supply in the embodiment of the invention, the rectifying/smoothing circuit is preferably provided with a second inductor. If this is the configuration, the input current is reduced in ripple compared with the configuration not including such a second inductor. As such, for the first switching power supply to operate as a DC-DC converter, for example, this accordingly leads to the reduction of noise in the input current, and to the possible improvement of a power factor when the first switching power supply operates as an AC-DC converter, for example. Herein, the first and second inductors may or may not be magnetically coupled to each other.

With the first switching power supply in the embodiment of the invention, the primary winding includes the first and second primary windings connected in series to each other, and the secondary winding includes first and second secondary windings. Herein, the first secondary winding is magnetically coupled to the first primary winding, and the second secondary winding is magnetically coupled to the second primary winding.

In such a configuration, possibly, the rectifying/smoothing circuit may include third and fourth rectifying elements, and a third capacitive element. Also in the rectifying/smoothing circuit, a second bridge may be configured by an arm including the first secondary winding and the third rectifying element, and by another arm including the second secondary winding and the fourth rectifying element. Such a second circuit is connected to the second inductor to form a H-bridge configuration, and the third capacitive element is disposed between a pair of connection lines which connects the second bridge circuit to the pair of output terminals.

The first switching power supply in the embodiment of the invention is preferably so configured as to operate both as a DC-DC converter, i.e., generates a DC output voltage by DC-DC voltage conversion of a DC input voltage provided as the input voltage, and as an AC-DC converter, i.e., generates a DC output voltage by AC-DC voltage conversion of an AC input voltage provided as the input voltage. If this is the configuration, the resulting switching power supply is accordingly enabled to operate both as the DC-DC converter and the AC-DC converter only with a single circuit so that the operation flexibility therein may be favorably improved. The higher operation flexibility as such accordingly allows the design sharing between these two converters, thereby implementing the reduction of time for device development and the design cost. Considering the operation as an AC-DC converter, unlike in the previous AC-DC converter, there is no need for a bridge circuit or others in a rectifying diode so that the resulting AC-DC converter may operate with a simple configuration, i.e., with a reduced number of components. Moreover, the resulting switching power supply may have the better efficiency in its entirety.

With the first switching power supply in the embodiment of the invention, voltage boosting of the input voltage is achieved through control over a duty ratio of each of the first and second switching elements in the switching circuit. To be specific, an on-duty ratio, D, of the first switching element satisfies a relationship of "$D \times (1-D) > n \times (1-2D)$", where n is a ratio between the primary and secondary windings in the transformer in terms of winding turns. If this is the configuration, for the switching power supply to operate as an AC-DC converter, for example, the switching circuit becomes feasible to perform the voltage boosting (PFC: Power Factor Correction) so that the voltage conversion may be performed with a higher flexibility, and a power factor may be favorably improved.

With the first switching power supply in the embodiment of the invention, the rectifying/smoothing circuit may possibly include first and second elements, third and fourth rectifying elements, and a third capacitive element. In the rectifying/smoothing circuit, a third bridge circuit may be configured by an arm including the first element and the third rectifying element, and by another arm including the second element and the fourth rectifying element. The secondary winding is connected to the third bridge circuit to form a H-bridge configuration, and the third capacitive element may be disposed between a pair of connection lines which connects the third bridge circuit to the pair of output terminals. With the configuration including the switching circuit described as above, the transformer, and the rectifying/smoothing circuit, the resulting switching power supply may operate both as a DC-DC converter, i.e., generates a DC output voltage by conversion of a DC input voltage, and as an AC-DC converter, i.e., generates a DC output voltage by conversion of an AC input voltage, only with a single circuit. This accordingly allows the design sharing between these two converters, thereby implementing the reduction of time for device development and the design cost. Considering the operation as an AC-DC converter, unlike in the previous AC-DC converter, there is no need for a bridge circuit or others in a rectifying diode so that the resulting AC-DC converter may operate with a simple configuration, i.e., with a reduced number of components. Moreover, the resulting switching power supply may have the better efficiency in its entirety.

With such a configuration, as a first technique, each of the first and second elements may be each configured by an inductor. If this is the configuration, the input current is reduced in ripple compared with the configuration in which the first and second elements are both not inductors. Accordingly, when the switching power supply operates as a DC-DC converter, for example, this accordingly leads to the reduction of noise in the input current, and to the possible improvement of a power factor when the first switching power supply operates as an AC-DC converter, for example. Herein, the first inductor, and the inductors respectively being the first and second elements may or may not be magnetically coupled to one another.

Alternatively, as a second technique, the first and second elements may be each configured as a rectifying element, and the rectifying/smoothing circuit may be provided with a third inductor between the third bridge circuit and an end of the third capacitive element. Also with this configuration, compared with the configuration in which the rectifying/smoothing circuit is not including such a third inductor, the effects similar to those with the first technique may be achieved. Also in this case, the first and third inductors may be or may not be magnetically coupled to each other.

With the first switching power supply in the embodiment of the invention, with both the first and second techniques, voltage boosting of the input voltage is achieved through control over a duty ratio of each of the first and second switching elements in the switching circuit. To be specific, with the first technique described above, for example, an on-duty ratio, D, of the first switching element satisfies a relationship of "$D \times (1-D) > n \times (1-2D)$", where n is a ratio between the primary and secondary windings in the transformer in terms of winding turns. On the other hand, with the second technique described above, the on-duty ratio D is preferably set to satisfy $2D \times (1-D) > n \times (1-2D)$. If this is the configuration, for the switching power supply to operate as an AC-DC converter, for example, the switching circuit becomes feasible to perform the voltage boosting (PFC) so that the voltage conversion may be performed with a higher flexibility, and a power factor may be favorably improved. With the second technique, a ratio between the DC output voltage and the input voltage, i.e., DC output voltage/input voltage, takes a value twice as large as that with the first technique, and thus the on-duty ratio D ready for the voltage boosting may take a wide range of values compared with the first technique.

With the first switching power supply in the embodiment of the invention, either the first or second switching element may perform the switching operation by PWM (Pulse Width Modulation), and the remaining switching element may remains OFF state. If this is the configuration, the circuit in charge of controlling the switching operation in the switching circuit, i.e., drive circuit, may be simplified in configuration, thereby favorably leading to the reduction of the number of components and the cost.

A second switching power supply in another embodiment of the invention generates a DC output voltage by conversion of an input voltage coming from a pair of input terminals, and outputs the resulting DC output voltage from a pair of output terminals. Such a switching power supply includes a transformer, a switching circuit, and a rectifying/smoothing circuit. The transformer includes a primary winding disposed on the side of the pair of input terminals, and a secondary winding disposed on the side of the pair of output terminals. The switching circuit is disposed on the side of the pair of input terminals, and including a switching element, first and second rectifying elements, first and second capacitive elements, and a first inductor. The rectifying/smoothing circuit is disposed on the side of the pair of output terminals. In the switching circuit, a first bridge circuit is configured by the first and second rectifying elements located in a diagonal arrangement, and by the first and second capacitive elements also located in a diagonal arrangement. The switching element is connected in parallel to either the first or second rectifying element, and one of the first and second rectifying elements is connected in forward direction and other is connected in inverse direction. The first inductor is disposed on a connection line between the pair of input terminals and the first bridge circuit. The primary winding is connected to the first bridge circuit to form a H-bridge configuration, and the secondary winding is disposed in the rectifying/smoothing circuit.

With the second switching power supply in the embodiment of the invention, an AC voltage is generated by the switching circuit by a switching of a DC input voltage coming from the pair of input terminals. Thus generated AC voltage is transformed by the transformer, and the resulting AC voltage is then rectified and smoothed by the rectifying/smoothing circuit, whereby the pair of output terminals output a DC output voltage. That is, with the configuration including the switching circuit described as above, the transformer, and the rectifying/smoothing circuit, the resulting switching power supply may operate as a DC-DC converter, i.e., generates a DC output voltage by conversion of a DC input voltage. Also with the switching circuit in which the switching element is connected in parallel to either the first or second rectifying element, compared with the configuration in which the switching element is connected to each of the first and second rectifying elements, the number of the switching elements, i.e., the number of the elements, may be reduced in the switching circuit.

With the first switching power supply in the embodiment of the invention, with the configuration including the switching circuit described as above, the transformer, and the rectifying/ smoothing circuit, the resulting switching power supply may operate both as a DC-DC converter and an AC-DC converter only with a single circuit. This possibly leads to the increase of the operation flexibility therein.

With the second switching power supply in the embodiment of the invention, with the configuration including the switching circuit described as above, the transformer, and the rectifying/smoothing circuit, the resulting switching power supply may operate as a DC-DC converter with a reduced number of components in the switching circuit. This accordingly implements the operation as a DC-DC converter with a simple configuration.

Other and further objects, features and advantages of the invention will appear more fully from the following description.

BRIEF DESCRIPTION OF THE DRAWINGS

FIGS. 57A to 57C are each a timing diagram of a switching element in a modified example applicable to the first to third embodiments, illustrating the operation thereof;

FIGS. 61A to 61C are each a timing diagram of a switching element of FIGS. 59 and 60, illustrating the operation thereof.

DETAILED DESCRIPTION OF THE PREFERRED EMBODIMENTS

In the below, embodiments of the invention are described in detail by referring to the accompanying drawings.

First Embodiment

Entire Configuration of Switching Power Supply 1

Figure 1:
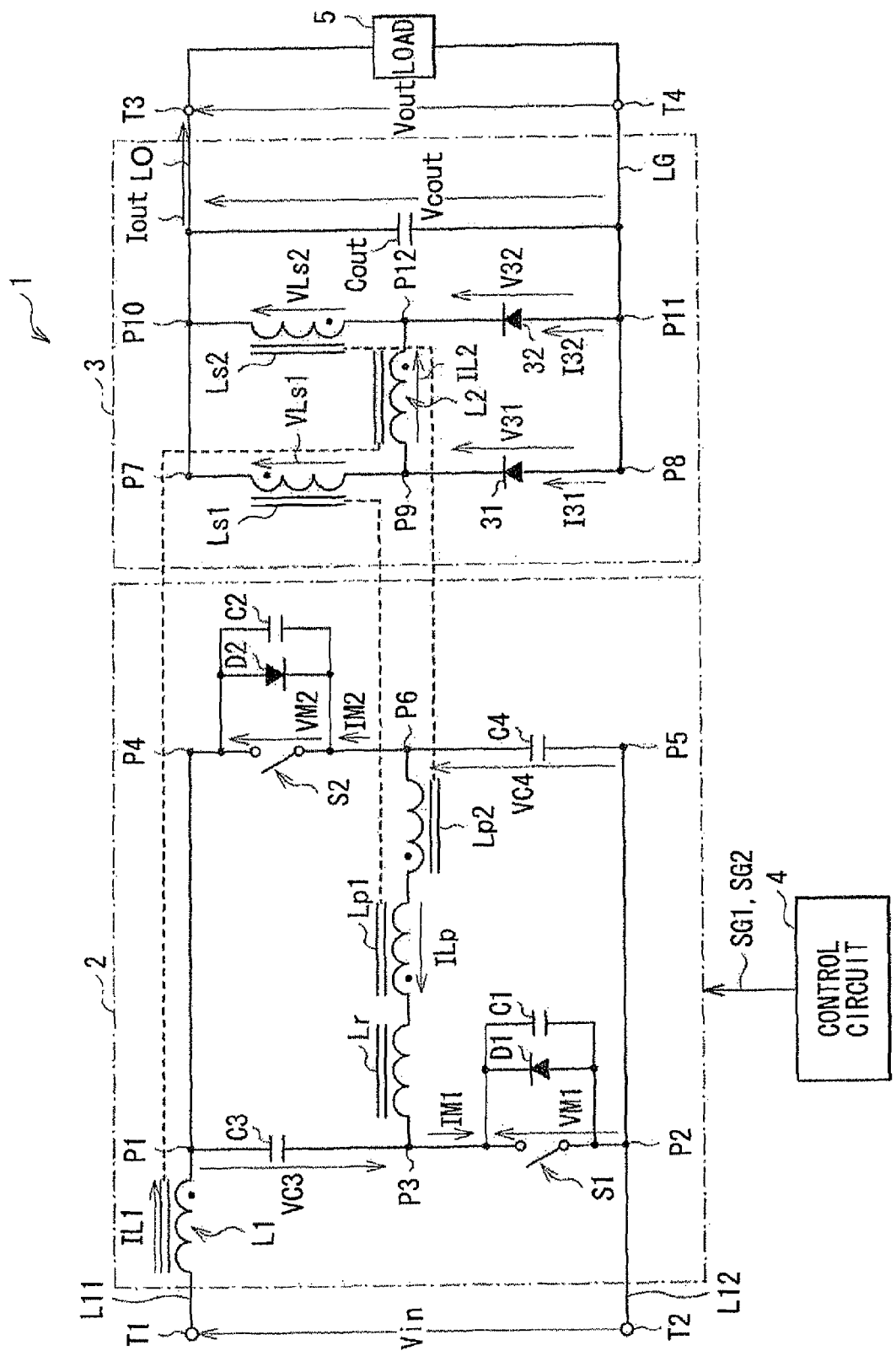
FIG. 1 is a circuit diagram of a switching power supply of a first embodiment of the invention, showing the configuration thereof.

FIG. 1 shows the circuit configuration of a switching power supply, i.e., switching power supply 1, in a first embodiment of the invention. This switching power supply 1 generates a DC output voltage Vout by voltage conversion of a DC or AC input voltage Vin coming from input terminals T1 and T2. The resulting DC output voltage Vout is provided to a battery that is not shown for driving a load 5. That is, the switching power supply 1 is so configured as to function as a DC-DC converter or an AC-DC converter.

Such a switching power supply 1 is configured to include a transformer, a switching circuit 2, a rectifying/smoothing circuit 3, and a control circuit 4. The transformer includes primary windings Lp1 and Lp2, and secondary windings Ls1 and Ls2, which all will be described later.

[Switching Circuit 2]

The switching circuit 2 performs a switching operation with respect to the DC or AC input voltage Vin applied between the input terminals T1 and T2. This switching operation is performed in response to drive signals SG1 and SG2 coming from the control circuit 4. This switching circuit 2 is configured to include two switching elements S1 and S2, capacitors C1 and C2, and diodes D1 and D2. The switching elements S1 and S2 respectively perform the switching operation in accordance with the drive signals SG1 and SG2. To these switching elements S1 and S2, the capacitors C1 and C2, and the diodes D1 and D2 are respectively connected in parallel. The switching circuit 2 is also provided therein with two other capacitors C3 and C4, and inductors L1 and Lr.

The inductor L1 is inserted to be positioned between the input terminal T1 and a connection point P1 on a connection line L11 that extends from the input terminal T1 to the output end.

The switching element S1 is disposed between a connection point P2 on a connection line L12 extending from the input terminal T1 to the output end, and a connection point P3. In the diode D1 connected in parallel to this switching element S1, the anode thereof is located on the side of the connection point P2, and the cathode thereof is located on the side of the connection point P3. On the other hand, the switching element S2 is positioned between a connection point P4 on the connection line L11, and a connection point P6. In the diode D2 connected in parallel to this switching element S2, the anode thereof is located on the side of the connection point P4, and the cathode thereof is located on the side of the connection point P6. That is, the diodes D1 and D2 are so disposed as to face in the opposite direction.

Note that the switching elements S1 and S2 are each exemplified by a MOS-FET (Metal Oxide Semiconductor—Field Effect Transistor), and an IGBT (Insulated Gate Bipolar Transistor), for example. When the switching elements are each a MOS-FET, the capacitors C1 and C2, and the diodes D1 and D2 may be each configured by the parasitic capacitance of the MOS-FET or by the body diode thereof. Alternatively, the capacitors C1 and C2 may be each configured by the junction capacitance of the diodes D1 and D2. If this is the configuration, there is no more need to provide the capacitors C1 and C2, and the diodes D1 and D2 separately from the switching elements, thereby being able to simplify the circuit configuration.

The capacitor C3 is disposed between a connection point P1 on a connection line L11, and the connection point P3. The capacitor C4 is disposed between a connection point P5 on the connection line L12, and the connection point P6.

The inductor Lr is connected in series between the connection points P3 and P6 respectively to the primary windings Lp1 and Lp2 of the transformer described above. To be specific, the inductor Lr is located between the connection point P3 and an end of the primary winding Lp1, and between the other end of the primary winding Lp1 and the connection point P6, the primary winding Lp2 is located. Instead of providing the inductor Lr separately as such, the inductor Lr may be configured with the leakage inductance of the primary windings Lp1 and Lp2.

In the switching circuit 2 as such, the switching elements S1 and S2 (including the diodes D1 and D2 and the capacitors C1 and C2) are placed diagonally to the capacitors C3 and C4, thereby configuring a bridge circuit, i.e., first bridge circuit. This first bridge circuit is H-bridge-connected with the inductor Lr, and the primary windings Lp1 and Lp2. In other words, in the switching circuit 2, the bridge circuit, i.e., first bridge circuit, is configured by the switching elements S1 and S2 (including the diodes D1 and D2 and the capacitors C1 and C2), the capacitors C3 and C4, the inductor Lr, and the primary windings Lp1 and Lp2.

[Rectifying/Smoothing Circuit 3]

The rectifying/smoothing circuit 3 is operated to rectify and smooth the voltage being the result after the transformation by the above-described transformer in response to the switching operation in the switching circuit 2. The resulting DC voltage after the operation of rectifying and smoothing as such is output between output terminals T3 and T4 as an output voltage Vout. Such a rectifying/smoothing circuit 3 is configured to include an inductor L2, two rectifying diodes 31 and 31, and an output smoothing capacitor Cout.

The inductor L2 is disposed between connection points P9 and P12, and is magnetically coupled to the inductor L1 described above. For such magnetic coupling between the inductors L1 and L2, the leakage inductance (not shown) exists but as an alternative to such leakage inductance, any other inductors may be individually provided. Between a connection point P7 on an output line LO and the connection point P9, the secondary winding Ls1 of the above-described transformer is disposed, and this secondary winding Ls1 is magnetically coupled to the primary winding Lp1. Herein, the output line LO is the one extending from the output terminal T3 to the input end. Between a connection point P10 also on the output line LO and the connection point P12, the secondary winding Ls2 of the transformer is disposed, and this secondary winding Ls2 is magnetically coupled to the primary winding Lp2.

The rectifying diode 31 is disposed between a connection point P8 on a ground line LG, and the connection point P9. The ground line LG is the one extending from the output terminal T4 to the input end. To be specific, the anode of the rectifying diode 31 is located on the side of the connection point P8, and the cathode thereof is located on the side of the connection point P9. The rectifying diode 32 is disposed between a connection point P11 on the ground line LG, and the connection point P12. To be specific, the anode of the rectifying diode 32 is located on the side of the connection point P11, and the cathode thereof is located on the side of the connection point P12.

In the rectifying/smoothing circuit 3 configured as such, a bridge circuit, i.e., second bridge circuit, is configured by an arm including the secondary wiring Ls1 and the rectifying diode 31, and by another arm including the secondary wiring Ls2 and the rectifying diode 32. This second bridge circuit is H-bridge-connected with the inductor L2. In other words, in the rectifying/smoothing circuit 3, the bridge circuit, i.e., second bridge circuit, is configured by the arm including the secondary wiring Ls1 and the rectifying diode 31, the other arm including the secondary wiring Ls2 and the rectifying diode 32, and the inductor L2.

The output smoothing capacitor Cout is disposed between the output line LO, i.e., a point between the connection point P10 and the output terminal T3, and the ground line LG, i.e., a point between the connection point P11 and the output terminal T4.

[Control Circuit 4]

The control circuit 4 is operated to drive the switching elements S1 and S2 in the switching circuit 2. To be specific, the control circuit 4 provides the above-described drive signals SG1 and SG2 respectively to the switching elements S1 and S2, thereby controlling ON and OFF of these switching elements S1 and S2.

Herein, the input terminals T1 and T2 are specific examples of "a pair of input terminals" in the embodiments of the invention, and the output terminals T3 and T4 are specific examples of "a pair of output terminals" therein. The switching elements S1 and S2 are respectively specific examples of "a first switching element" and "a second switching element" in the embodiments of the invention, the diodes D1 and D2 are respectively specific examples of "a first rectifying element" and "a second rectifying element" therein, and the capacitors C1 and C2 are respectively specific examples of "a first capacitive element" and "a second capacitive element" therein. The inductors L1 and L2 are respectively specific examples of "a first inductor" and "a second inductor" in the embodiments of the invention. The primary windings Lp1 and Lp2 are respectively specific examples of "a first primary winding" and "a second primary winding" in the embodiments of the invention, and the secondary windings Ls1 and Ls2 are respectively specific examples of "a first secondary winding" and "a second secondary winding" therein. The rectifying diodes 31 and 32 are respectively specific examples of "a third rectifying element" and "a fourth rectifying element" in the embodiments of the invention, and the output smoothing capacitor Cout is a specific example of "a third capacitive element" therein. The output line LO and the ground line LG are specific examples of "a pair of connection lines" in the embodiments of the invention.

[Advantages and Effects of Switching Power Supply 1]

Described next are the advantages and effects of the switching power supply 1 in this first embodiment.

[1. Basic Operation]

In this switching power supply 1, the switching circuit 2 generates an AC voltage by a switching of a DC or AC input voltage Vin coming from the input terminals T1 and T2. The resulting AC voltage is transformed by the transformer configured by the primary windings Lp1 and Lp2 in the switching circuit 2, and the secondary windings Ls1 and Ls2 in the rectifying/smoothing circuit 3. The AC voltage transformed as such is then output from the secondary windings Ls1 and Ls2.

The AC voltage being the result of the transformation as above is rectified in the rectifying/smoothing circuit 3 by the rectifying diodes 31 and 32. This accordingly generates a rectified output between the output line LO and the ground line LG. The rectified output is smoothed by the output rectifying capacitor Cout, and then is output from the output terminals T3 and T4 as a DC output voltage Vout. This DC output voltage Vout is supplied to a battery (not shown) for charging thereof, and the load 5 is driven thereby.

As such, the switching power supply 1 is operated to generate the DC output voltage Vout by DC-DC voltage conversion of the DC input voltage Vin, i.e., functions as a DC-DC converter, or to generate the DC output voltage Vout by AC-DC voltage conversion of the AC input voltage Vin, i.e., functions as an AC-DC converter. The details will be described below.

[2. Operation in Detail]

By referring to FIGS. 2 to 16, the specific operation of the switching power supply 1 is described in detail in comparison with a comparison example.

[2-1. Operation as DC-DC Converter]

First of all, by referring to FIGS. 2 to 12, described is an exemplary operation of the switching power supply 1 of FIG. 1 as a DC-DC converter.

FIGS. 2A to 2J are timing diagrams of the switching power supply 1 of FIG. 1, showing a voltage or current waveform of each component therein. As shown in FIGS. 3 to 9, the timing diagram corresponds to a case that a DC power supply 10 inputs a positive DC input voltage Vin between the input terminals T1 and T2. The positive voltage is the one higher in value on the side of the input terminal T1. In FIG. 2, A shows the voltage waveform of the drive signal SG1, and B shows that of the drive signal SG2. Also in FIG. 2, C shows the current waveform of a current IL1 flowing through the inductor L1 of FIG. 1. D shows the current waveform of a current ILp flowing through the components between the connection points P6 and P3, i.e., the primary wirings Lp2 and Lp1, and the inductor Lr. E shows three waveforms, i.e., the current waveform of a current IM2 flowing through an element group M2, the voltage waveform of a voltage VM2 in the element group M2 between both ends, and the voltage waveform of a voltage being the sum of voltages VC3 and VC4 (VC3+VC4). Herein, the element group M2 includes the switching element S2, the diode D2, and the capacitor C2. The voltage VC3 is of a value in the capacitor C3 between both ends, and the voltage VC4 is of a value in the capacitor C4 between both ends. F shows three waveforms, i.e., the current waveform of a current IM1 flowing through an element group M1, the voltage waveform of a voltage VM1 in the element group M1 between both ends, and the voltage waveform as above of the voltage being the sum of the voltages VC3 and VC4 (VC3+VC4). Herein, the element group M1 includes the switching element S1, the diode D1, and the capacitor C1. G shows the voltage waveform of a voltage VLs1 in the secondary winding Ls1 between ends, and of a voltage VLs2 in the secondary winding Ls2 between both ends. H shows the voltage waveform of a voltage V31 in the rectifying diode 31 between both ends, and of a voltage V32 in the rectifying diode 32 between both ends. I shows the current waveform of a current I31 flowing through the rectifying diode 31 in the forward direction, of a current I32 flowing through the rectifying diode 32 in the forward direction, and of a current IL2 flowing through the inductor L2. J shows the current waveform of an output current Iout, and the voltage waveform of an output voltage Vout, and of a voltage Vcout in the output smoothing capacitor Cout between both ends. Note here that the normal directions of such voltages and currents are assumed to be those respectively indicated by arrows in FIG. 1.

Figure 2:
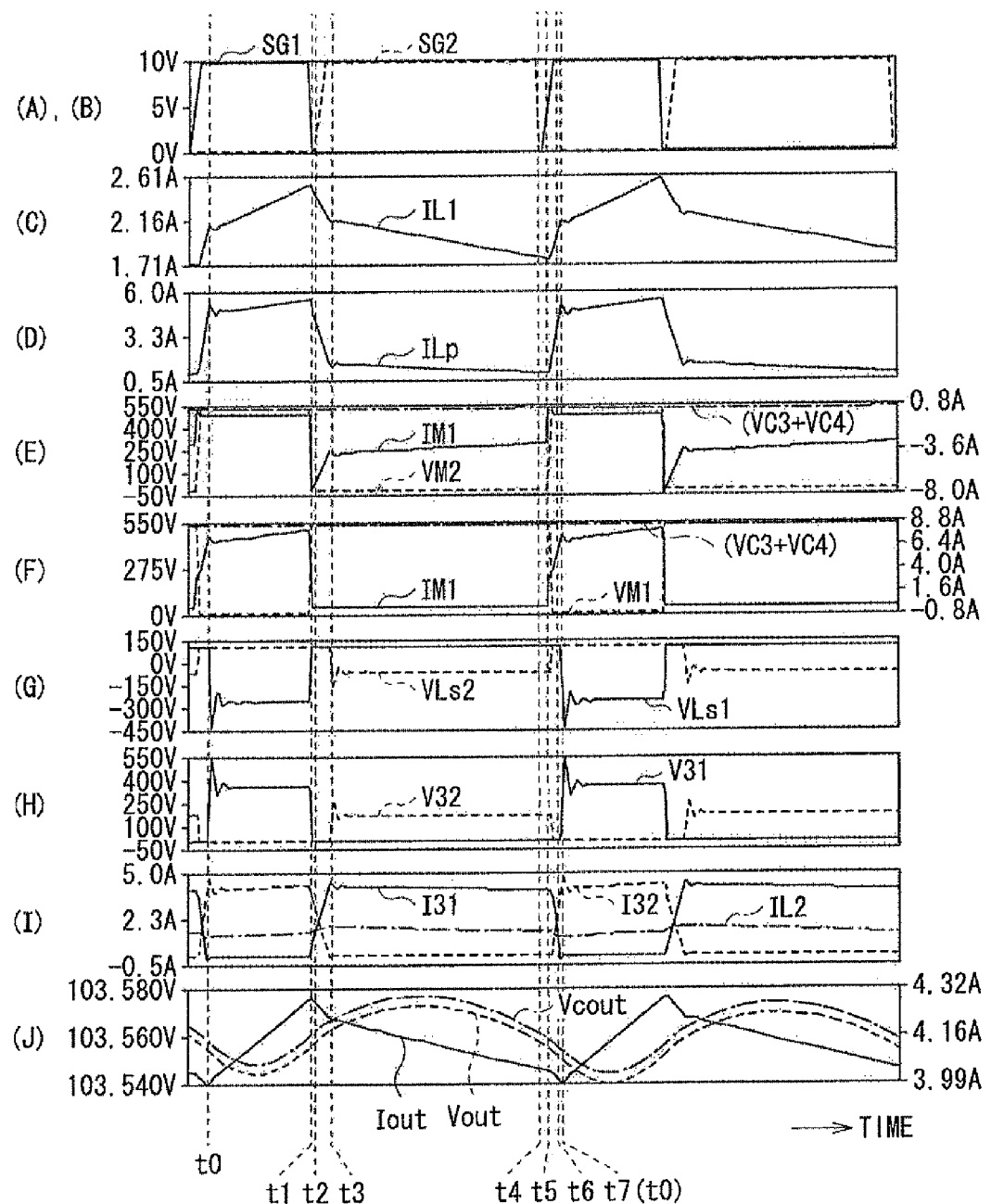
FIGS. 2A to 2J are timing diagrams of the switching power supply of FIG. 1, showing an exemplary operation thereof, i.e., operation as a DC-DC converter during a positive input.

FIGS. 3 to 9 each show the state of operation of the switching power supply 1 at respective timings of t0 to t7 (t0) in an operation cycle in FIG. 2.

Figure 3:
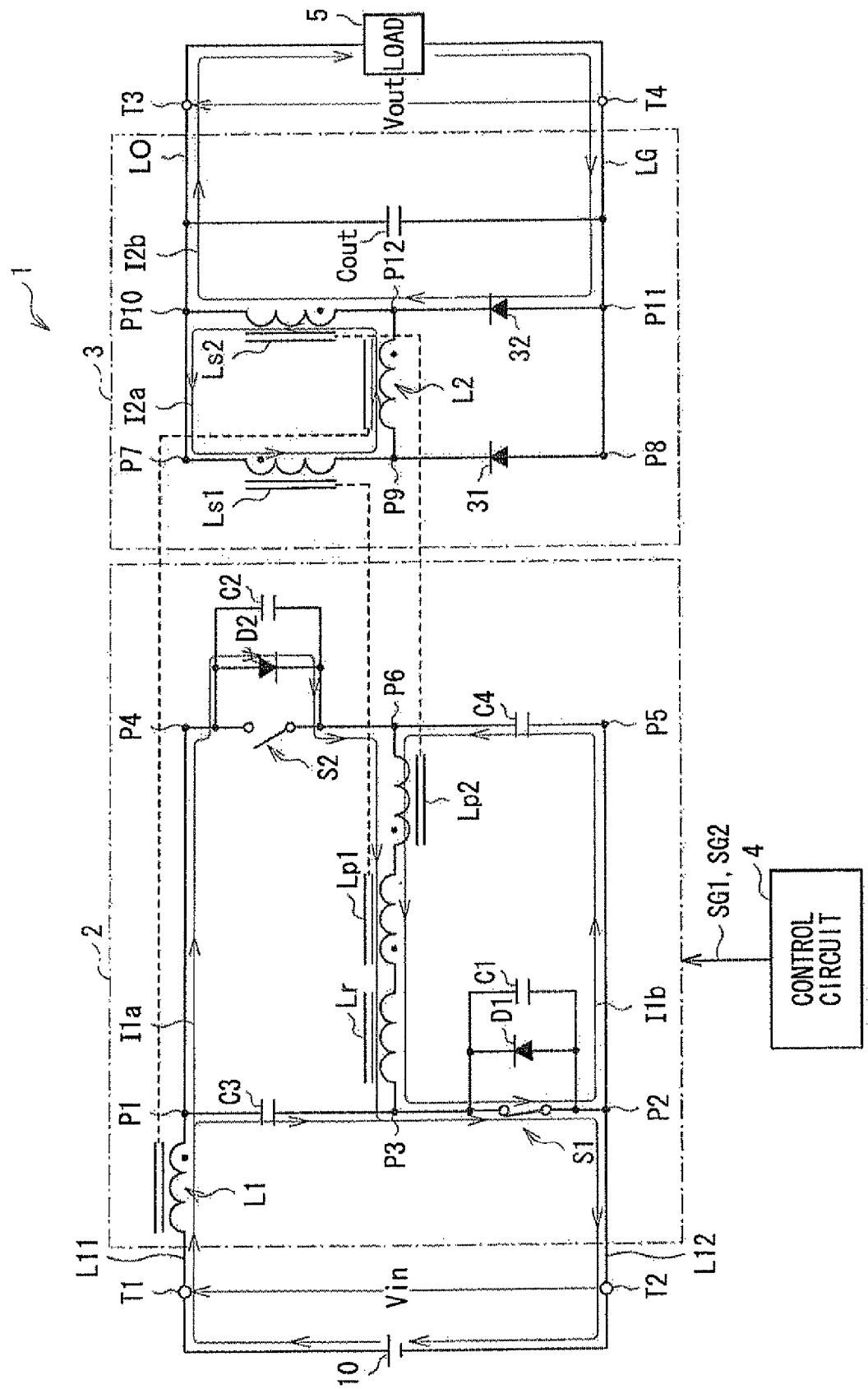
FIG. 3 is a circuit diagram of the switching power supply of FIG. 2, illustrating the operation thereof.

First of all, in a period from the timing t0 to t1 in FIG. 3, the switching element S1 is turned ON (A in FIG. 2), and the switching element S2 is turned OFF (B in FIG. 2). As a result, mesh currents I1a and I1b as shown in the drawing start flowing in the switching circuit 2. To be specific, the flow of the mesh current I1a starts from the DC power supply 10 to go via the input terminal T1 and the inductor L1, and then is directed in two paths, i.e., one is via the diode D2, the primary windings Lp2 and Lp1, and the inductor Lr, and the other is through the capacitor C3. After flowing in two paths as such, the mesh current I1a flows via the switching element S1 and the input terminal T2. On the other hand, the flow of the mesh current I1b circulates via the capacitor C4, the primary windings Lp2 and Lp1, the inductor Lr, the switching element S1, and the capacitor C4 in this order. Such flows of the mesh currents I1a and I1b energize the inductor Lr, and cause transmission of power in the transformer from the primary side, i.e., primary windings Lp1 and Lp2, to the secondary side, i.e., secondary windings Ls1 and Ls2. With such energization and power transmission, mesh currents I2a and I2b start flowing on the secondary side of the transformer as shown in the drawing, i.e., in the rectifying/smoothing circuit 3. To be specific, the flow of the mesh current I2a circulates via the secondary winding Ls1, the inductor L2, and the secondary winding Ls1 in this order. On the other hand, the flow of the mesh current I2b circulates via the secondary winding Ls2, the output terminal T3, the load 5, the output terminal T4, and the rectifying diode 32 in this order, whereby the load 5 is accordingly driven.

Figure 4:
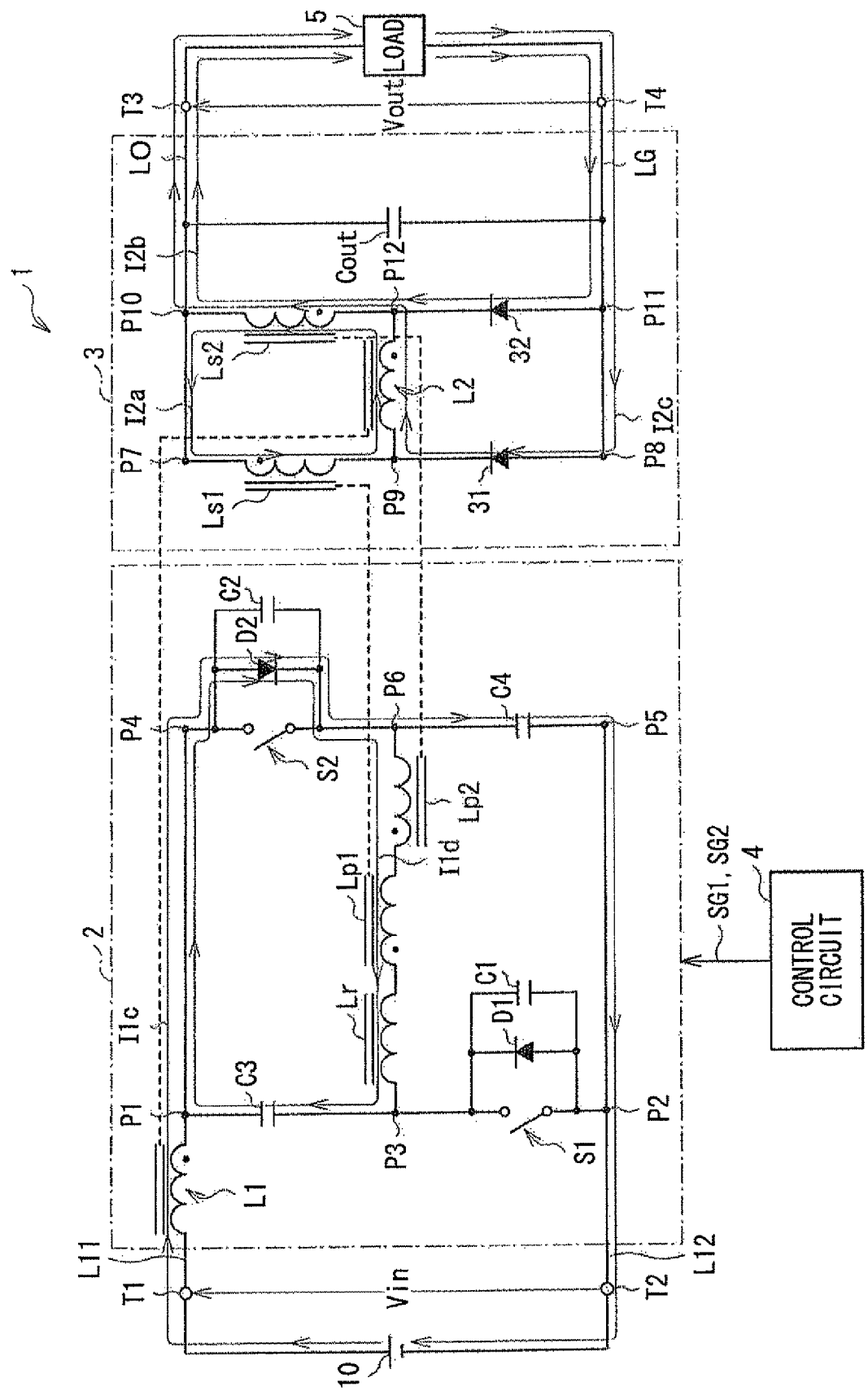
FIG. 4 is a circuit diagram of the switching power supply of FIG. 2, illustrating the operation thereof after the operation of FIG. 3.

Next, in a period from the timing t1 to t2 in FIG. 4, the switching element S1 is turned OFF at the timing t1 (A in FIG. 2). In response thereto, mesh currents I1mayd I1d as shown in the drawing start flowing in the switching circuit 2. To be specific, the flow of the mesh current I1c starts from the DC power supply 10 to go via the input terminal T1, the inductor L1, the diode D2, the capacitor C4, and the input terminal T2. The flow of the mesh current I1d circulates via the inductor Lr, the capacitor C3, the diode D2, the primary windings Lp2 and Lp1, and the inductor Lr in this order. On the other hand, on the secondary side of the transformer, i.e., in the rectifying/smoothing circuit 3, the mesh currents I2a and I2b, and a mesh current I2c as shown in the drawing start flowing. Herein, the flow of the mesh current I2c specifically circulates via the secondary winding Ls2, the output terminal T3, the load 5, the output terminal T4, the rectifying diode 31, and the inductor L2 in this order. With the flows of such mesh currents I2b and I2c, the load 5 is accordingly driven.

Figure 5:
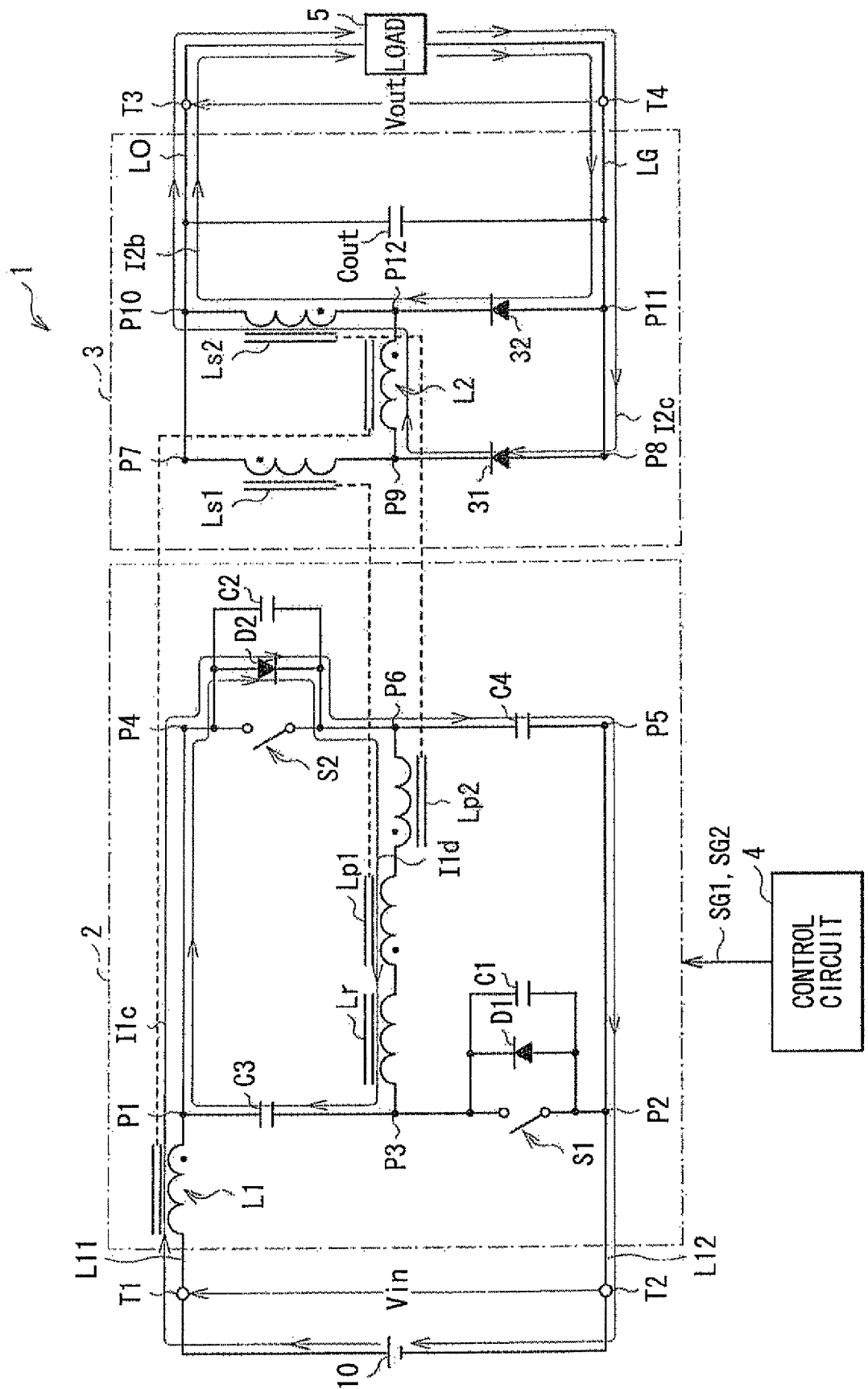
FIG. 5 is a circuit diagram of the switching power supply of FIG. 2, illustrating the operation thereof after the operation of FIG. 4.

Next, at the timing t2 of FIG. 5, the mesh current I2a described above does not flow any more on the secondary side of the transformer, i.e., in the rectifying/smoothing circuit 3. That is, in the rectifying/smoothing circuit 3, only the two flows of the mesh currents I2b and I2c drive the load 5.

Figure 6:
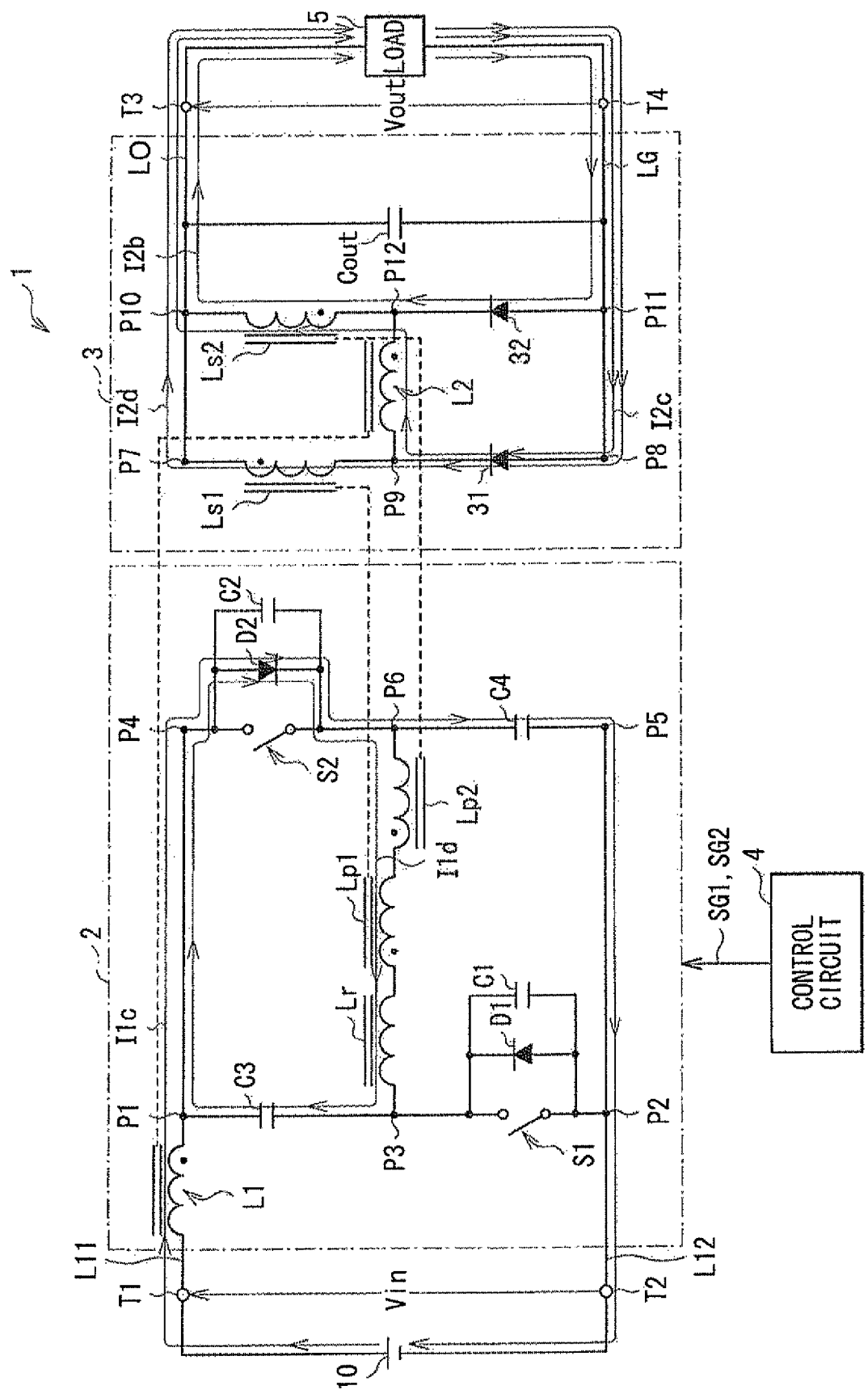
FIG. 6 is a circuit diagram of the switching power supply of FIG. 2, illustrating the operation thereof after the operation of FIG. 5.

Next, in a period from the timing t2 to t3 in FIG. 6, in addition to the mesh currents I2b and I2c described above, a mesh current I2d newly starts flowing on the secondary side of the transformer, i.e., in the rectifying/smoothing circuit 3. To be specific, the flow of the mesh current I2d circulates via the secondary winding Ls1, the output terminal T3, the load 5, the output terminal T4, and the rectifying diode 31 in this order. With the flows of such mesh currents I2b, I2mayd I2d, the load 5 is accordingly driven.

Figure 7:
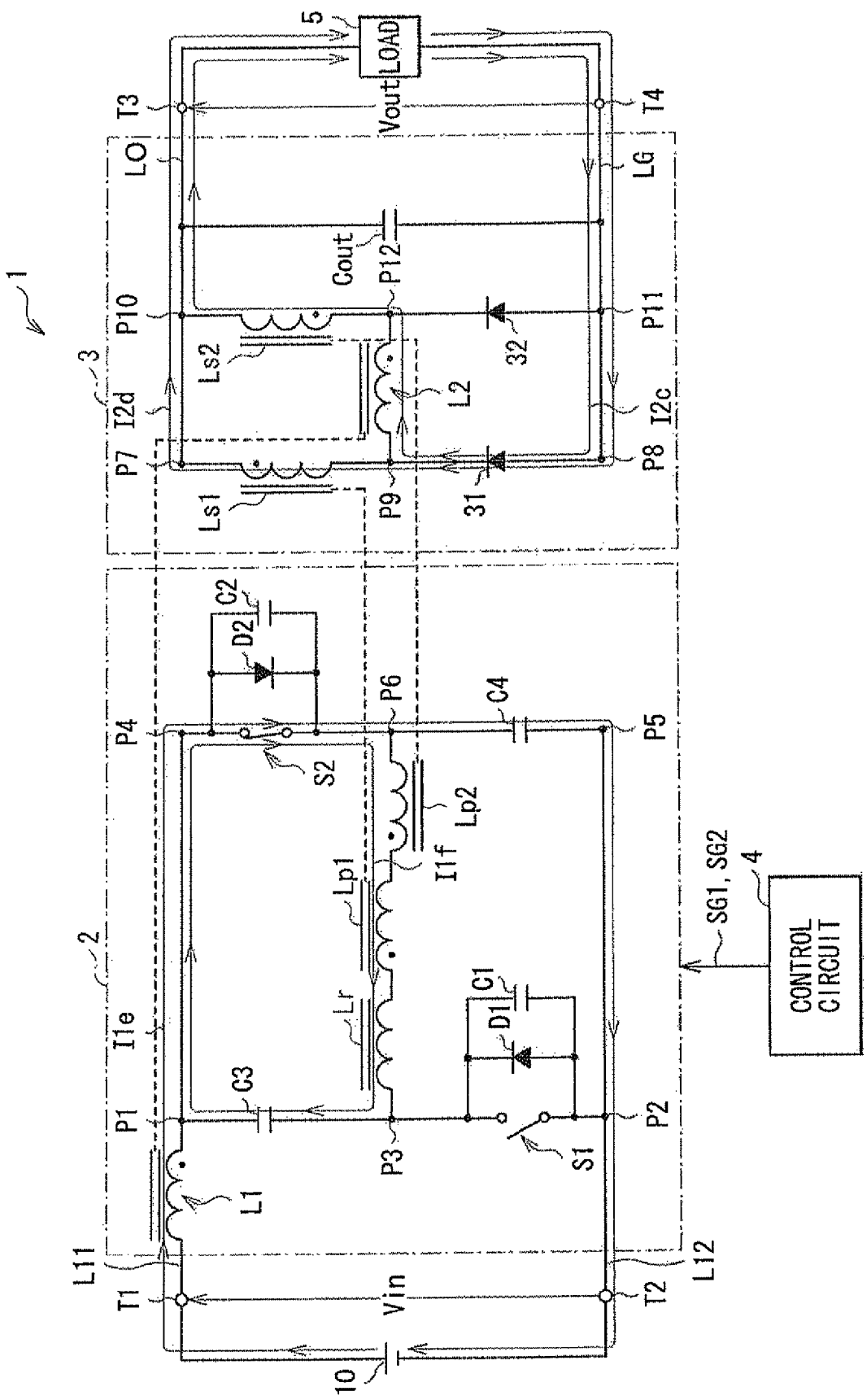
FIG. 7 is a circuit diagram of the switching power supply of FIG. 2, illustrating the operation thereof after the operation of FIG. 6.

Next, in a period from the timing t3 to t4 in FIG. 7, at the timing t3, the switching element S2 is turned ON (B in FIG. 2). In response thereto, mesh currents I1e and I1f as shown in the drawing start flowing in the switching circuit 2. To be specific, the flow of the mesh current I1e starts from the DC power supply 10 to go via the input terminal T1, the inductor L1, the switching element S2, the capacitor C4, and the input terminal T2. The flow of the mesh current I1f circulates via the inductor Lr, the capacitor C3, the switching element S2, the primary windings Lp2 and Lp1, and the inductor Lr in this order. On the other hand, on the secondary side of the transformer, i.e., in the rectifying/smoothing circuit 3, the mesh current I2b described above does not flow any more on the secondary side of the transformer, i.e., in the rectifying/smoothing circuit 3. That is, in the rectifying/smoothing circuit 3, only the two flows of the mesh currents I2mayd I2d drive the load 5.

Figure 8:
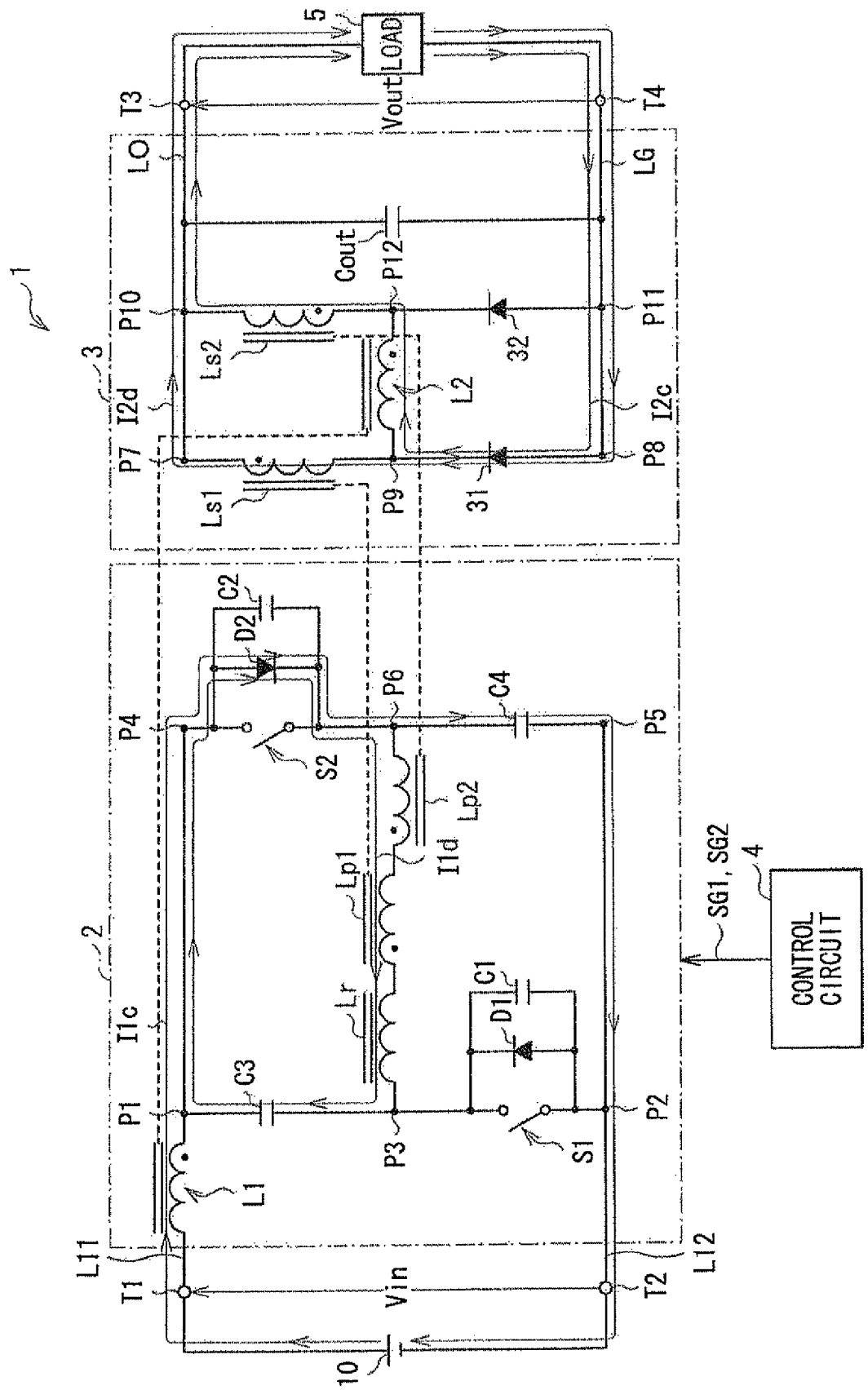
FIG. 8 is a circuit diagram of the switching power supply of FIG. 2, illustrating the operation thereof after the operation of FIG. 7.

Next, in a period from the timing t4 to t5 in FIG. 8, the switching element S2 is turned OFF at the timing t4 (B in FIG. 2). In response thereto, the mesh currents I1mayd I1d described above start flowing in the switching circuit 2 as shown in the drawing. On the other hand, on the secondary side of the transformer, i.e., in the rectifying/smoothing circuit 3, the mesh currents I2mayd I2d continue to flow so that the load 5 is accordingly driven thereby.

Figure 9:
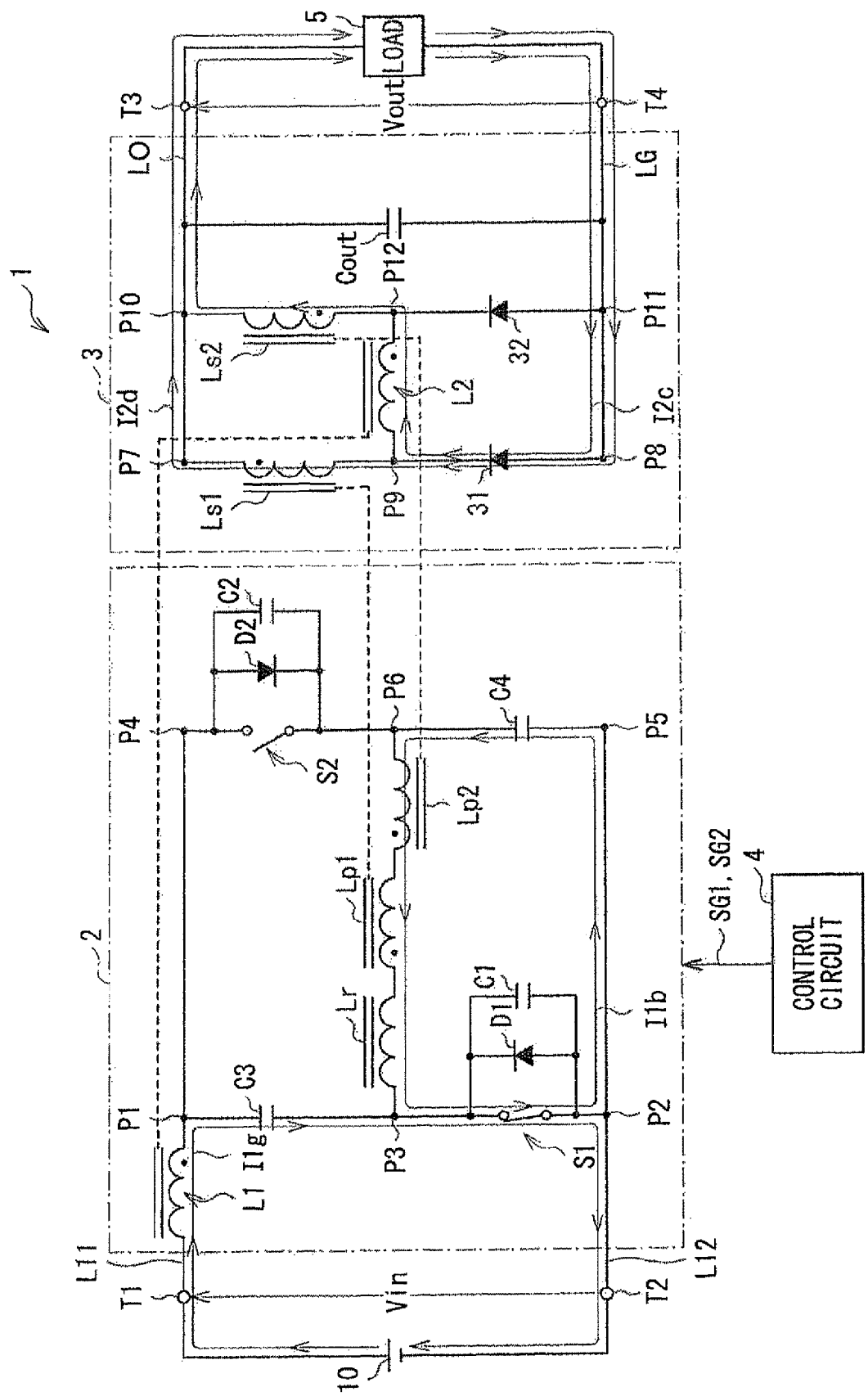
FIG. 9 is a circuit diagram of the switching power supply of FIG. 2, illustrating the operation thereof after the operation of FIG. 8.

Next, at the timing t5 of FIG. 9, the switching element S1 is turned ON (A in FIG. 2). In response thereto, the mesh current I1b and a mesh current Jig as shown in the drawing start flowing in the switching circuit 2. Herein, the flow of the mesh current I1g starts from the DC power supply 10 to go via the input terminal T1, the inductor L1, the capacitor C3, the switching element S1, and the input terminal T2. On the other hand, on the secondary side of the transformer, i.e., in the rectifying/smoothing circuit 3, the mesh currents I2mayd I2d continue to flow so that the load 5 is accordingly driven thereby.

Figure 10:
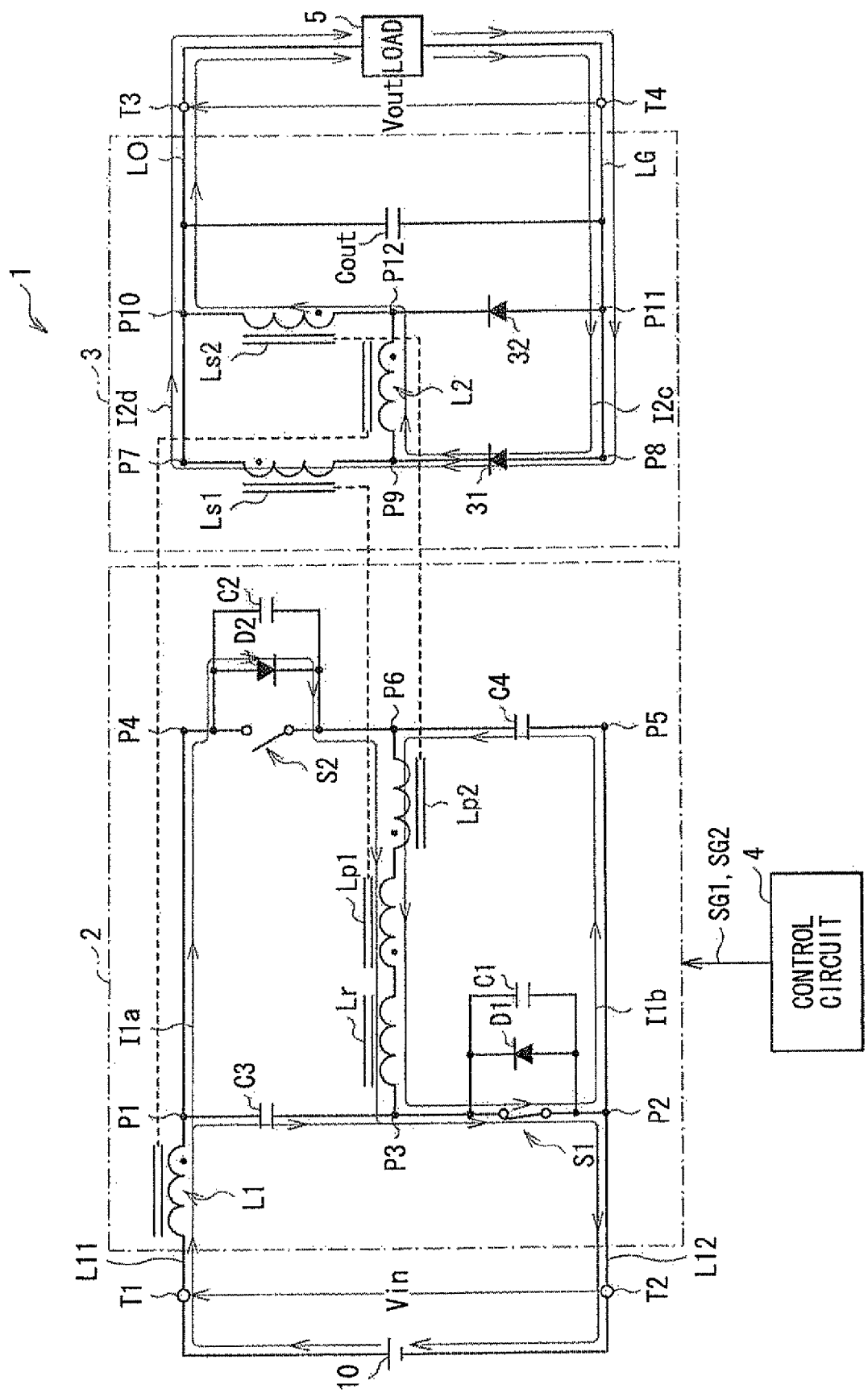
FIG. 10 is a circuit diagram of the switching power supply of FIG. 2, illustrating the operation thereof after the operation of FIG. 9.

Next, in a period from the timing t5 to t6 of FIG. 10, the mesh currents I1a and I1b described above start flowing in the switching circuit 2 as shown in the drawing. On the other hand, on the secondary side of the transformer, i.e., in the rectifying/smoothing circuit 3, the mesh currents I2c and I2d continue to flow so that the load 5 is accordingly driven thereby.

Figure 11:
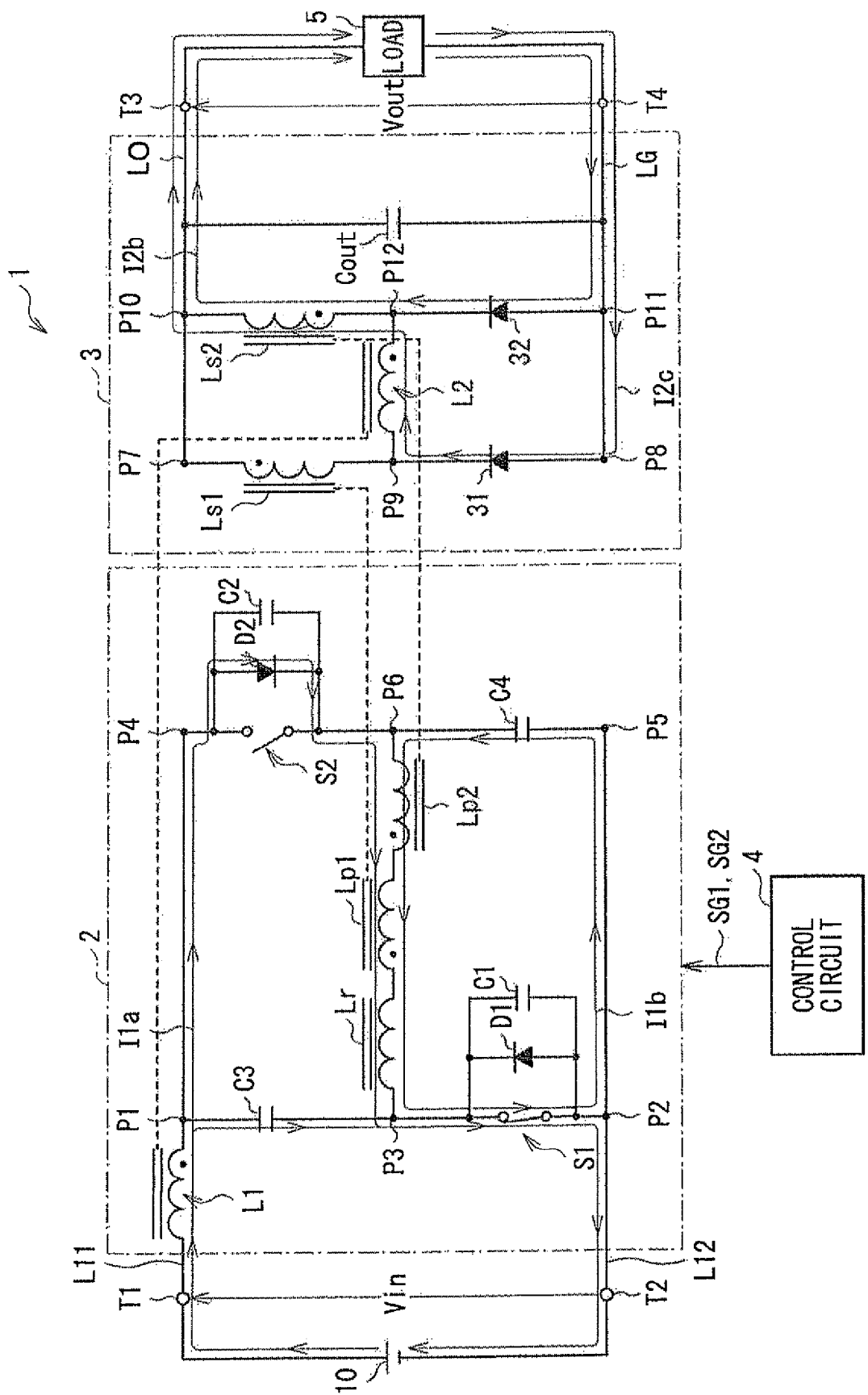
FIG. 11 is a circuit diagram of the switching power supply of FIG. 2, illustrating the operation thereof after the operation of FIG. 10.

Next, at the timing t6 in FIG. 11, the mesh currents I2b and I2c described above start flowing on the secondary side of the transformer, i.e., in the rectifying/smoothing circuit 3, as shown in the drawing so that the load 5 is accordingly driven thereby. Thereafter, at the timing t7 (t0), as shown in FIG. 3, the mesh currents I2a and I2b described above start flowing on the secondary side of the transformer, i.e., in the rectifying/smoothing circuit 3. This is the end of the operation of the switching power supply 1 as a DC-DC converter for a cycle when the input voltage Vin applied between the input terminals T1 and T2 is positive and DC and the state thereof becomes equivalent to that at the timing t0 in FIG. 2.

Figure 12:
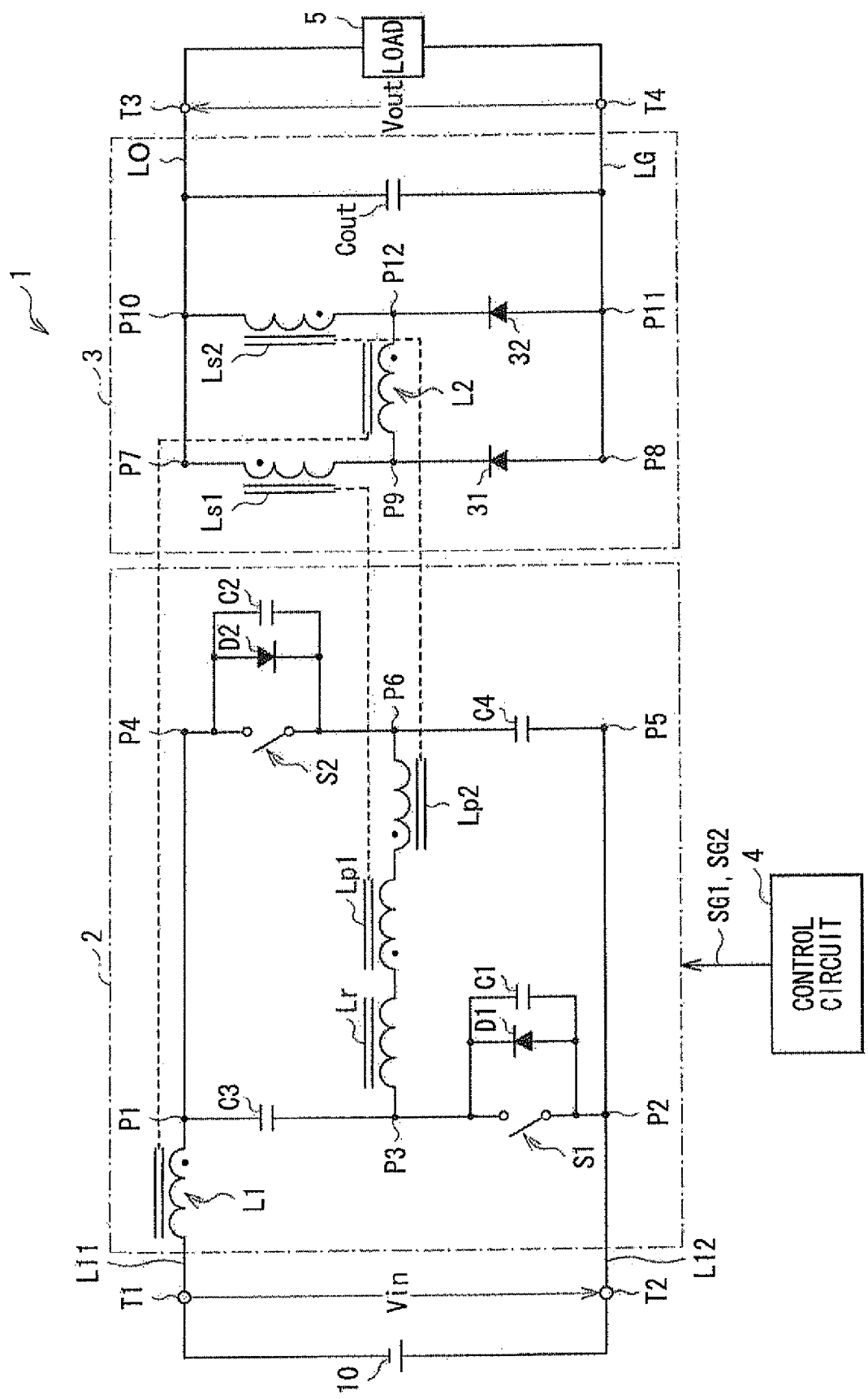
FIG. 12 is a circuit diagram of the switching power supply of FIG. 1, illustrating another exemplary operation thereof, i.e., operation as a DC-DC converter during a negative input.
Figure 13:
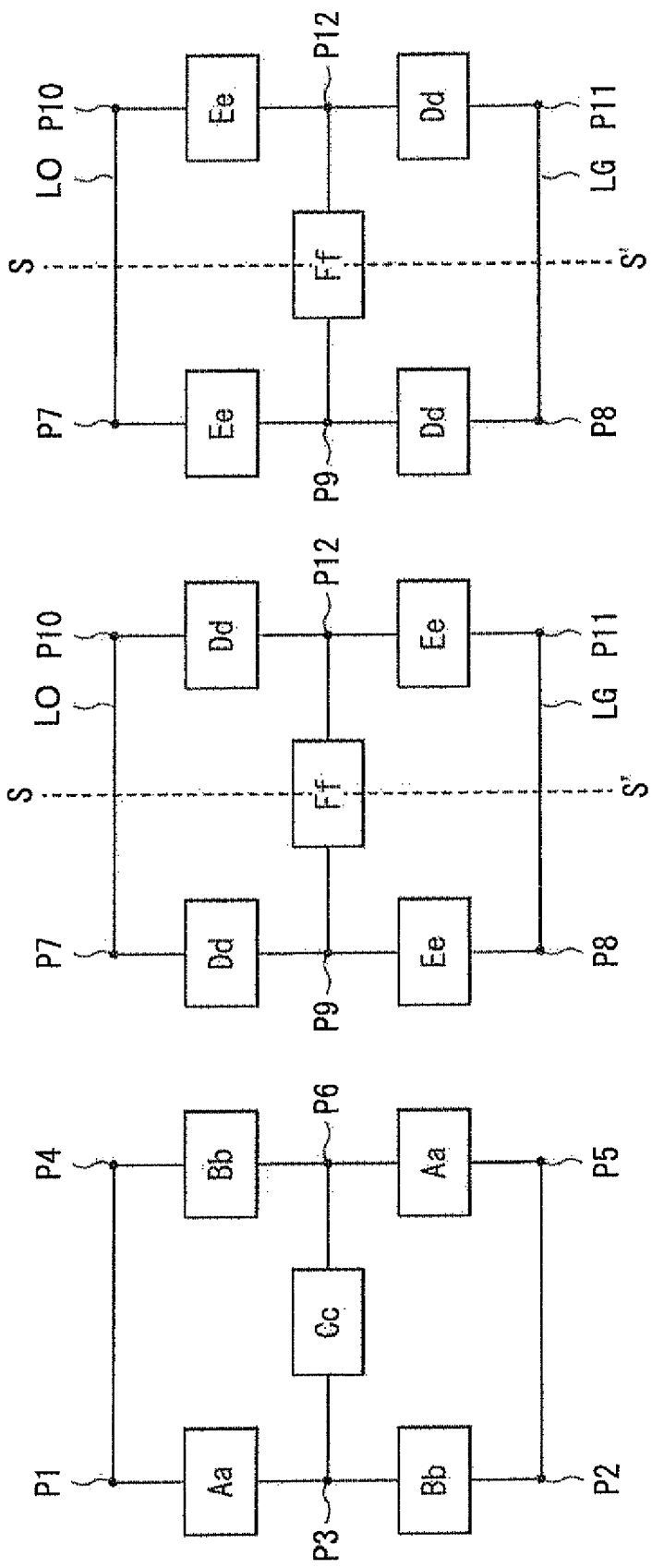
FIGS. 13A to 13C are each a circuit diagram of first and second bridge circuits, illustrating the symmetry of the configuration thereof.

On the other hand, as shown in FIG. 12, when the input voltage Vin coming from the DC power supply 10 for application between the input terminals T1 and T2 is negative (higher in value on the side of the input terminal T2) and DC, the switching power supply 1 operates as a DC-DC converter as below.

That is, in the switching power supply 1 in this embodiment, the configuration of the first bridge circuit in the switching circuit 2 is point symmetric as shown in FIG. 13A. To be specific, assuming that the first bridge circuit is configured by three element blocks of Aa, Bb, and Cc, the element blocks Aa and Bb are both point symmetric with respect to the element block Cc. The element block Cc includes the components disposed between the connection points P3 and P6, i.e., the inductor Lr and the primary windings Lp1 and Lp2 in this example. The block Aa includes the component(s) on the arms in the first bridge circuit, i.e., the capacitor C3 or C4 in this example, and the element block Bb includes the switching element S1, the diode D1, and the capacitor C1, or the switching element S2, the diode D2, and the capacitor C2 in this example.

On the other hand, as shown in FIG. 13B, the configuration of the second bridge circuit in the rectifying/smoothing circuit 3 is line symmetric. To be specific, assuming that the second bridge circuit is configured by three element blocks of Dd, Ee, and Ff, the element blocks Dd and Ee are both line symmetric with respect to a virtual line S-S' passing over the element block Ff and two points. The element block Ff includes the component(s) disposed between the connection points P9 and P12, i.e., the inductor L2 in this example. The element block Dd includes the component(s) on the arms in the second bridge circuit, i.e., the second winding Ls1 or Ls2 in this example, and the element block Ee includes the rectifying diode 31 or 32 in this example. The two points over which the virtual line S-S' passes include a point between the connection points P7 and P10 on the output line LO, and a point between the connection points P8 and P11 on the ground line LG. Note that, in FIG. 13B, on the arms in the second bridge circuit, the element block Dd is located on the side of the output line LO, and the element block Ee is located on the side of the ground line LG. Alternatively, as exemplarily shown in FIG. 13C, such a positional relationship between the element blocks Dd and Ee may be reversed. That is, on the arms in the second bridge circuit, the element block Ee may be disposed on the side of the output line LO, and the element block Dd may be disposed on the side of the ground line LG.

With the first and second bridge circuits configured symmetry as such, also when the input voltage Vin coming from the DC power supply 10 for application between the input terminals T1 and T2 is negative and DC, the switching power supply 1 operates similarly to the DC-DC converter described above by referring to FIGS. 2 to 11, i.e., operation when the input voltage Vin coming from the DC power supply 10 for application between the input terminals T1 and T2 is positive and DC.

[2-2. Operation as AC-DC Converter]

Figure 14:
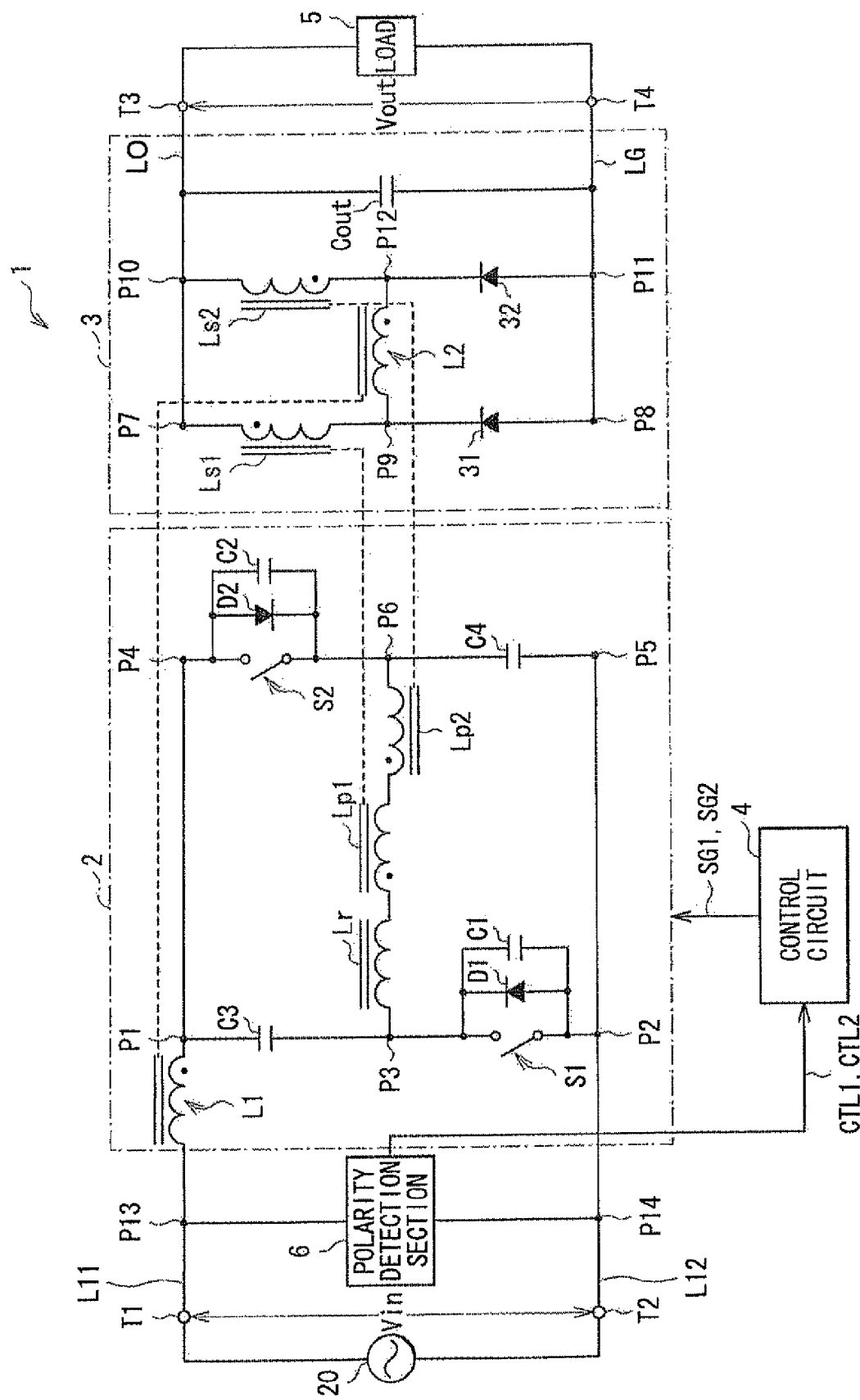
FIG. 14 is a circuit diagram of the switching power supply of FIG. 1, illustrating still another exemplary operation thereof, i.e., operation as an AC-DC converter.

As will be known from the above, if the input voltage Vin coming from an AC power supply 20 for application between the input terminals T1 and T2 is AC as shown in FIG. 14, the switching power supply 1 operates as an AC-DC converter as below. That is, by alternately repeating the operation, as described above, as the DC-DC converter when the input voltage Vin for application between the input terminals T1 and T2 is positive and the operation as the DC-DC converter when the input voltage Vin for application between the input terminals T1 and T2 is negative and DC, the switching power supply 1 becomes feasible to operate as an AC-DC converter when the input voltage Vin for application between the input terminals T1 and T2 is AC. As such, the switching power supply 1 in this embodiment is feasible to operate both as a DC-DC converter and an AC-DC converter with a single circuit.

Figures 15A, 15B:
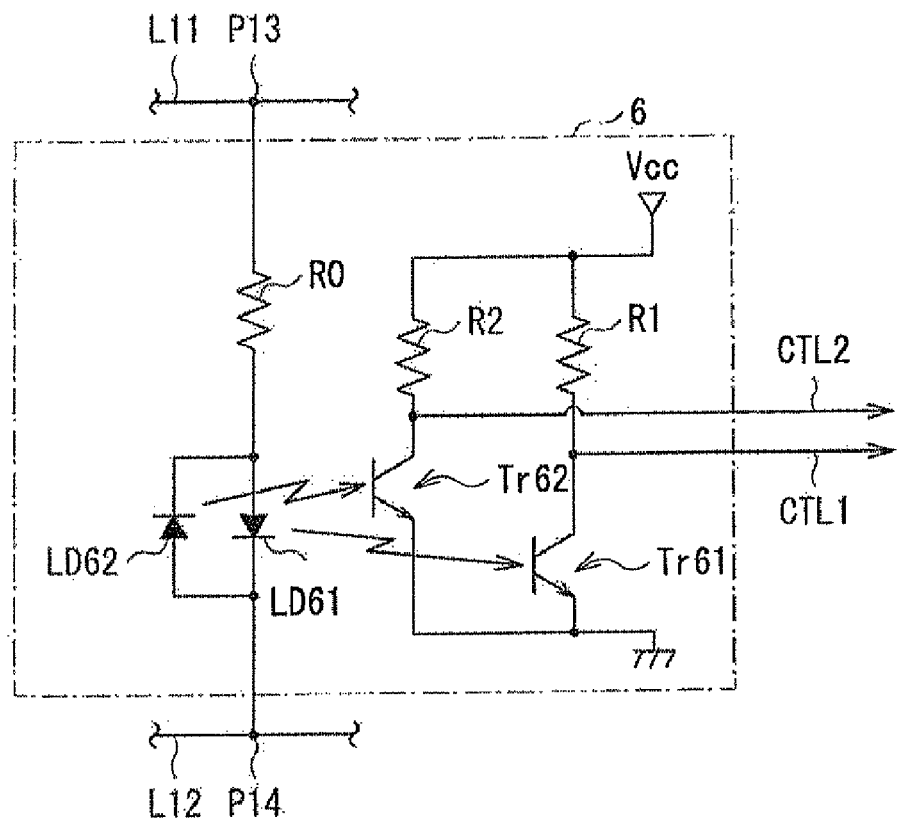
FIGS. 15A and 15B are each a diagram of a polarity detection section of FIG. 14, showing the detailed configuration thereof.

In such a case, the switching between the above-described operation as a DC-DC converter corresponding to the positive side and the above-described operation as a DC-DC converter corresponding to the negative side may be made in the control circuit 4 in response to control signals CTL1 and CTL2, for example. The control signals CTL1 and CTL2 are those related to the detection results derived by a polarity detection section 6 shown in FIG. 14 and FIGS. 15A and 15B. To be specific, the switching signals SG1 and SG2 may be changed in content in the control circuit 4 depending on whether the operation is on the positive or negative side, thereby changing the operation between the switching elements S1 and S2. Herein, FIG. 15B shows an exemplary relationship between the potential values that will be described later, i.e., which of a potential V13 on a connection point P13 and a potential V14 on a connection point P14 is larger in value, and the contents of the control signals CT1 and CT2, i.e., which is "H (High)" signal or "L (Low) signal.

In the configuration, the polarity detection section 6 is disposed between the connection point P13 on the connection line L11, i.e., a point between the input terminal T1 and the inductor L1, and the connection point P14 on the connection line L12, i.e., a point between the input terminal T2 and the connection point P2. This polarity detection section 6 is configured to include three resistors R0, R1, and R2, and two sets of photocouplers including two light emitting diodes (LEDs) LD61 and LD62, and two phototransistors Tr61 and Tr62 as shown in FIG. 15A. The resistor R0 is connected at one end to the connection point P13, and the other end thereof is connected to both the anode of the light-emitting diode LD61 and the cathode of the light-emitting diode LD62. The cathode of the light-emitting diode LD61 and the anode of the light-emitting diode LD62 are both connected to the connection point P14. On the other hand, one end of the resistor R1 and that of the resistor R2 are both connected to a power supply Vcc. The phototransistor Tr61 is so configured as to selectively receive lights coming from the light-emitting diode LD61. In the phototransistor Tr61, the collector thereof is connected to the remaining end of the resistor R1 not connected to the power supply Vcmayd to the signal line of the control signal CTL1, and the emitter thereof is grounded. The phototransistor Tr62 is so configured as to selectively receive lights coming from the light-emitting diode LD62. In the phototransistor Tr62, the collector thereof is connected to the remaining end of the resistor R1 not connected to the power supply Vcmayd to the signal line of the control signal CTL2, and the emitter thereof is grounded. The polarity detection section 6 configured as such utilizes the mechanism thereof of making only either the light-emitting diode LD61 or LD62 emits lights based on the flow direction, i.e., polarity, of the input current into the switching circuit 2, thereby generating a control signal CTL corresponding to the polarity.

[2-3. Comparison Between First Embodiment and Comparison Example in Terms of Advantages and Effects]

Figure 16:
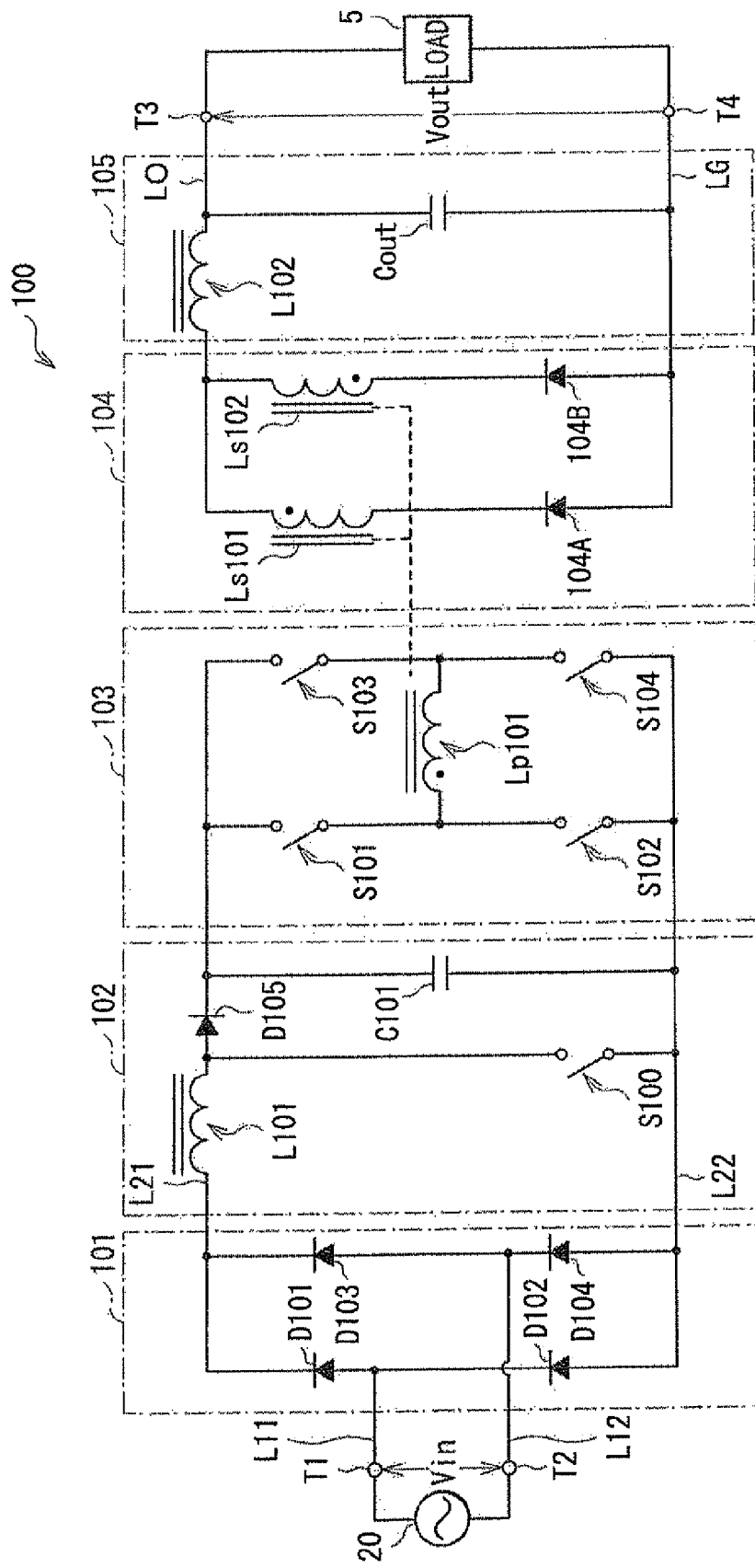
FIG. 16 is a circuit diagram of a switching power supply (AC-DC converter) in a comparison example, showing the configuration thereof.
Figure 17:
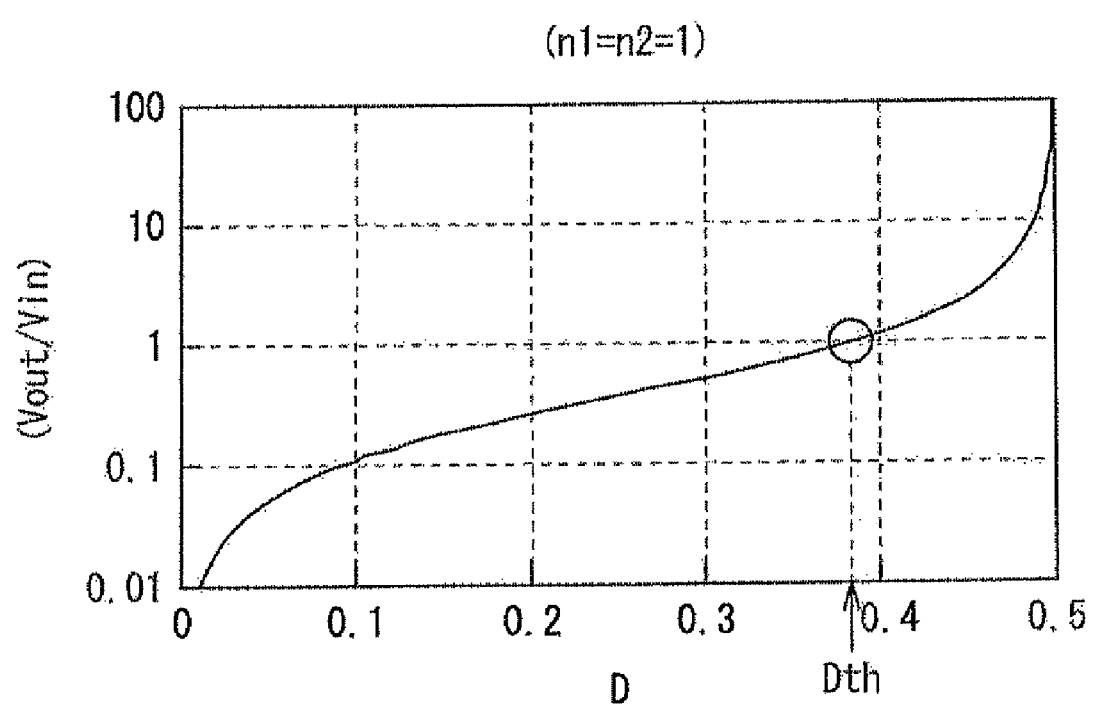
FIG. 17 is a characteristic diagram showing an exemplary relationship between an on-duty ratio and an input/output voltage ratio in the switching power supply of FIG. 1.

By referring also to FIGS. 16 and 17 in addition to FIGS. 1 to 15, the switching power supply 1 in this first embodiment is compared with a previous switching power supply 100 in a comparison example in terms of their advantages, and a detailed description is provided thereabout.

Configuration and Advantages of Comparison Example

FIG. 16 shows the circuit configuration of the switching power supply 100 in the comparison example. This switching power supply 100 functions as an AC-DC converter, and is configured to include the input terminals T1 and T2, a rectifying circuit 101, a PFC (Power Factor Correction) circuit 102, an inverter circuit 103, another rectifying circuit 104, a smoothing circuit 105, and the output terminals T3 and T4. The input terminals T1 and T2 are those provided with an AC input voltage Vin from the AC power supply 20, and the output terminals T3 and T4 are those for a supply of a DC output voltage Vout to the load 5. The PFC circuit 102 is the one operated for the voltage boosting. Note that the components in the switching power supply 100, i.e., the rectifying circuit 101, the PFC circuit 102, and the inverter circuit 103, all correspond to the switching circuit 2 in the switching power supply 1 in the first embodiment. Moreover, the rectifying circuit 104 and the smoothing circuit 105 in the switching circuit 100 both correspond to the rectifying/smoothing circuit 3 in the switching power supply 1. Herein, any component same as that in the first embodiment is provided with the same reference numeral, and is not described again if appropriate.

The rectifying circuit 101 is provided therein with a rectifying bridge circuit including four rectifying diodes D101 to D104. To be specific, the anode of the rectifying diode D101 is connected to the connection line L11 extending from the input terminal T1, and the cathode thereof is connected to a connection line L21. The anode of the rectifying diode D102 is connected to a connection line L22, and the cathode thereof is connected to the connection line L11. The anode of the rectifying diode D103 is connected to the connection line L12 extending from the input terminal T2, and the cathode thereof is connected to the connection line L21. The anode of the rectifying diode D104 is connected to the connection line L22, and the cathode thereof is connected to the connection line L12.

The PFC circuit 102 is configured to include an inductor L101, a switching element S100, a diode D105, and a capacitor C101. To be specific, the inductor L101 is inserted to be positioned on the connection line L21, and the switching element S100 is disposed between one end of this inductor L101 and the connection line L22. In the diode D105, the anode thereof is connected to the end of the inductor L101, and the cathode thereof is connected to one end of the capacitor C101. The remaining end of the capacitor C101 is connected to the connection line L22.

The inverter circuit 103 is of a full-bridge type including four switching elements S101 to S104. To be specific, one end of the switching element S101 and that of the switching element S103 are both connected to the connection line L21, and one end of the switching element S102 and that of the switching element S104 are both connected to the connection line L22. The remaining ends of the switching elements S101 and S102 are connected to each other, and the remaining ends of the switching elements S103 and S104 are connected to each other. Such a full-bridge circuit is H-bridge-connected with a primary winding Lp101 of the transformer.

The rectifying circuit 104 is provided therein with two rectifying diodes 104A and 104B. The rectifying circuit 104 is also provided therein with secondary windings Ls101 and Ls102 of the transformer. Herein, these two secondary windings Ls101 and Ls102 are both magnetically coupled to the primary winding Lp101 of the transformer described above. In such a rectifying circuit 104, the anode of the rectifying diode 104A is connected to the ground line LG extending from the output terminal T4, and the cathode thereof is connected to one end of the secondary winding Ls101. The anode of the rectifying diode 104B is connected to the ground line LG, and the cathode thereof is connected to one end of the secondary winding Ls102. The remaining ends of the secondary windings Ls101 and Ls102 are both connected to the output line LO extending from the output terminal T3.

The smoothing circuit 105 is configured to include a choke coil L102, and the output smoothing capacitor Cout. To be specific, the choke coil L102 is inserted to be positioned on the output line LO, and the output smoothing capacitor Cout is disposed between a connection point on the output line LO, i.e., a point between the choke line L102 and the output terminal T3, and the ground line LG.

As such, in the switching power supply 100 in this comparison example, the rectifying circuit 101 being a rectifying bridge circuit is provided to make the switching power supply 100 function as an AC-DC converter. Also in the switching power supply 100, three (three-phase) circuits (converters) are provided on the primary side of the transformer. The resulting circuit configuration is thus complicated in the switching power supply 100 in its entirety, and the device efficiency is also low.

Advantages of First Embodiment

On the other hand, the switching power supply 1 in the first embodiment is configured to include the switching circuit 2 of the configuration of FIG. 1, the transformer including the primary windings Lp1 and Lp2 and the secondary windings Ls1 and Ls2, and the rectifying/smoothing circuit 3.

Such a configuration favorably eliminates the need for such a rectifying bridge circuit unlike in the comparison example described above, and reduces the number of the circuits needed on the primary side of the transformer, i.e., reduced to one (one-phase) circuit (switching circuit 2). Accordingly, compared with the comparison example described above, the resulting switching power supply 1 of this embodiment is feasible to operate as an AC-DC converter with a simple configuration, i.e., with a reduced number of components.

Moreover, with the inductor L2 provided in the rectifying/smoothing circuit 3, compared with the configuration not including such an inductor L2, the input current, i.e., current IL1 flowing through the inductor L1, is reduced in ripple.

Note that, in this embodiment, the switching circuit 2 is preferably capable of the voltage boosting of the input voltage Vin through control over a duty ratio between the switching elements S1 and S2.

To be specific, in the steady state, the inductance of the inductor L1, and those of the primary windings Lp1 and Lp2 may be expressed by the following equations 1 to 3, where the number of winding turns of the primary winding Lp1 and that of the primary winding Lp2 in the transformer are respectively Np1 and Np2, the number of winding turns of the secondary winding Ls1 and that of the secondary winding Ls2 therein are respectively Ns1 and Ns2, the ratio between the primary winding Lp1 and the secondary winding Ls1 in terms of winding turns is n1 (=Np1/Ns1), the ratio between the primary winding Lp2 and the secondary winding Ls2 in terms of winding turns is n2 (=Np2/Ns2), the ON-time and OFF-time of the switching element S1 are respectively ton and toff, the switching cycle is T (=ton+toff), and the on-duty ratio of the switching element S1 is D (=ton/T). Moreover, in the equations, Vin denotes the input voltage, the Vout denotes the output voltage, VC3 denotes the voltage in the capacitor C3 between both ends, and the VC4 denotes the voltage in the capacitor C4 between both ends. In this example, these equations are derived with no consideration of the magnetic coupling between the inductors L1 and L2.

Equation 1

$$\begin{cases} \dfrac{V_{in} + VC3}{L1} t_{on} = \dfrac{VC4 + V_{in}}{L1} t_{off} & (1) \\ \dfrac{VC4 - n1 \cdot V_{out}}{Lp1} t_{on} = \dfrac{n1 \cdot V_{out}}{Lp1} t_{off} & (2) \\ \dfrac{n2 \cdot V_{out}}{Lp2} t_{on} = \dfrac{VC3 - n2 \cdot V_{out}}{Lp2} t_{off} & (3) \end{cases}$$

Through rearrangement of these equations 1 to 3, the following equations 4 to 6 are to be derived with which the input/output voltage ratio (Vout/Vin) and the voltages VC3 and VC4 are defined. With the equation 4, if the on-duty ratio D of the switching element S1 is so set as to satisfy (Vout/Vin)>1, the input voltage Vin is to be boosted as described above. Herein, assuming that the ratio of winding turns satisfies n1=n2=n, satisfying D×(1−D)>n×(1−2D) will do. Also assuming that the ratio of winding turns satisfies n1=n2=1, the following equations 7 to 9 are to be derived, and in this case, it is known that the on-duty ratio D of the switching element S1 becomes larger than 0.5, i.e., D<0.5.

Equation 2

$$\begin{cases} \dfrac{V_{out}}{V_{in}} = \dfrac{D(1-D)}{n1(1-2D) + (n1-n2)D^2} & (4) \\ VC3 = \dfrac{n2 \cdot D}{n1(1-2D) + (n1-n2)D^2} V_{in} & (5) \\ VC4 = \dfrac{n2(1-D)}{n1(1-2D) + (n1-n2)D^2} V_{in} & (6) \end{cases}$$

Equation 3

$$\begin{cases} \dfrac{V_{out}}{V_{in}} = \dfrac{D(1-D)}{1-2D} & (7) \\ VC3 = \dfrac{D}{1-2D} V_{in} & (8) \\ VC4 = \dfrac{1-D}{1-2D} V_{in} & (9) \end{cases}$$

As such, as shown in FIG. 17, for example, by setting the on-duty ratio D of the switching element S1 to be larger than a duty threshold value Dth, i.e., a value corresponding to the on-duty ratio D when (Vout/Vin)=1 is satisfied, it is known that the input voltage Vin is to be actually boosted.

Because the switching power supply 1 is capable of the voltage boosting as such, compared with the previous DC-DC converter, the range for the input voltage may be wider while the switching power supply 1 is operating as a DC-DC converter.

As described above, in the first embodiment, the switching power supply 1 is provided with the switching circuit 2 of the configuration of FIG. 1, the transformer including the primary windings Lp1 and Lp2 and the secondary windings Ls1 and Ls2, and the rectifying/smoothing circuit 3. This configuration favorably allows the switching power supply 1 to operate both as a DC-DC converter and an AC-DC converter with a single circuit, thereby being able to increase the operation flexibility therein.

Further, because the rectifying/smoothing circuit 3 is provided therein with the inductor L2, compared with the configuration not including such an inductor L2, the input current, i.e., current IL1 flowing through the inductor L1, may be reduced in ripple. This accordingly allows the reduction of noise in the input current when the switching power supply 1 operates as a DC-DC converter, for example, and when the switching power supply 1 operates as a AC-DC converter, this allows the possible improvement of a power factor.

Still further, as described above, the switching power supply 1 in this embodiment may operate both as a DC-DC converter and an AC-DC converter with a single circuit so that the operation flexibility therein may be favorably increased. The higher operation flexibility as such accordingly allows the design sharing between these two converters, thereby implementing the reduction of time for device development and the design cost. Considering the operation as an AC-DC converter, unlike in the previous AC-DC converter, there is no need for the bridge circuit or others in the rectifying diode so that the resulting switching power supply 1 may operate as an AC-DC converter with a simple configuration, i.e., with a reduced number of components, and may have the better efficiency in its entirety.

What is more, when the switching circuit 2 is capable of the voltage boosting of the input voltage Vin through control over the duty ratio between the switching elements S1 and S2, the change of voltage, i.e., voltage bucking or boosting, may be smoothly made. In consideration thereof, for the switching power supply 1 to operate as an AC-DC converter, for example, due to the fact that the switching circuit 2 is capable of the voltage boosting, i.e., PFC operation, the voltage conversion may be performed with a higher flexibility, and the power factor may be favorably improved.

Described next are modified examples (modified examples 1 to 4) of the first embodiment described above. In the below, any component same as that in the first embodiment is provided with the same reference numeral, and is not described again if appropriate.

Modified Example 1

Figure 18:
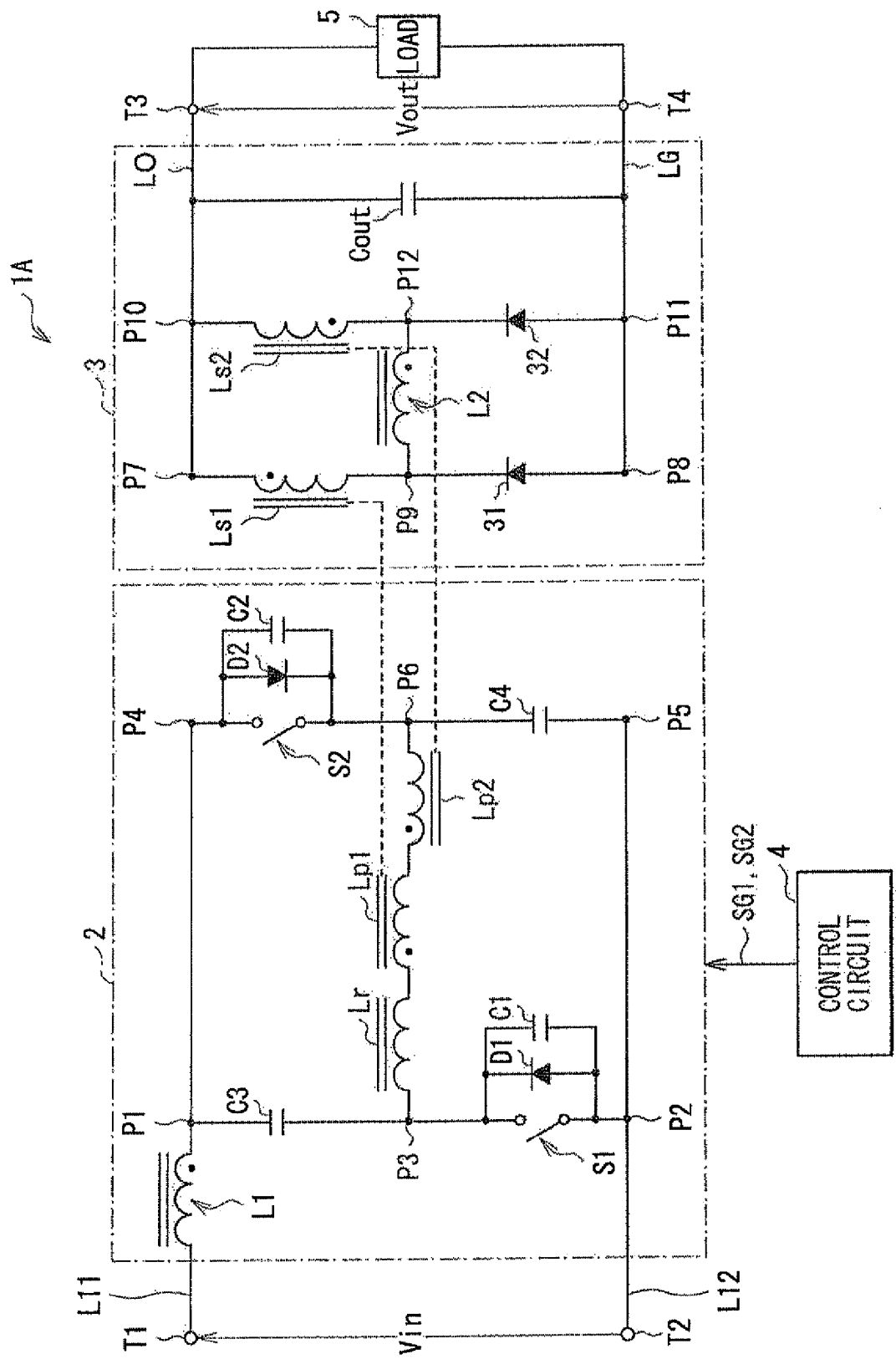
FIG. 18 is a circuit diagram of a switching power supply in a modified example (modified example 1) of the first embodiment, showing the configuration thereof.

FIG. 18 shows the circuit configuration of a switching power supply, i.e., switching power supply 1A, in the modified example 1. The switching power supply 1A in this modified example 1 is configured similarly to the switching power supply 1 in the first embodiment described above except that the inductors L1 and L2 are not magnetically coupled to each other.

Also in the switching power supply 1A of such a configuration, the same effects as the switching power supply 1 of the first embodiment above may be achieved with the advantages similar thereto.

Figure 19:
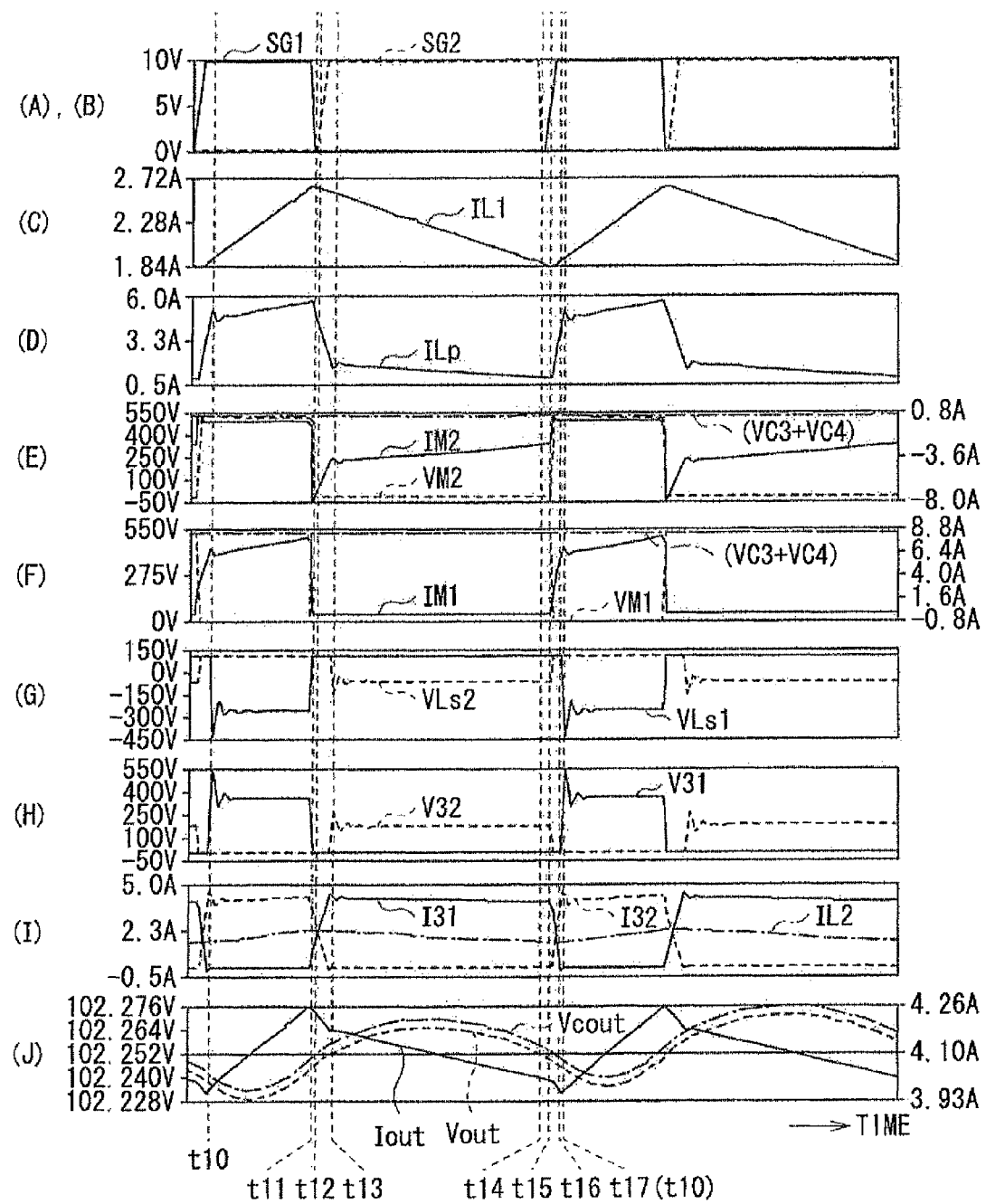
FIG. 19 is a timing diagram of the switching power supply of FIG. 18, showing an exemplary operation thereof, i.e., operation as a DC-DC converter during a positive input.

As an example, as exemplarily shown in A to J in FIG. 19, when operating as a DC-DC converter, i.e., when the input voltage Vin applied between the input terminals T1 and T2 is positive and DC, the switching power supply 1A operates similarly to A to J in FIG. 2 described in the first embodiment above. Although not shown, when operating as an AC-DC converter, the switching power supply 1A operates similarly as described in the first embodiment above.

Modified Example 2

Figure 20:
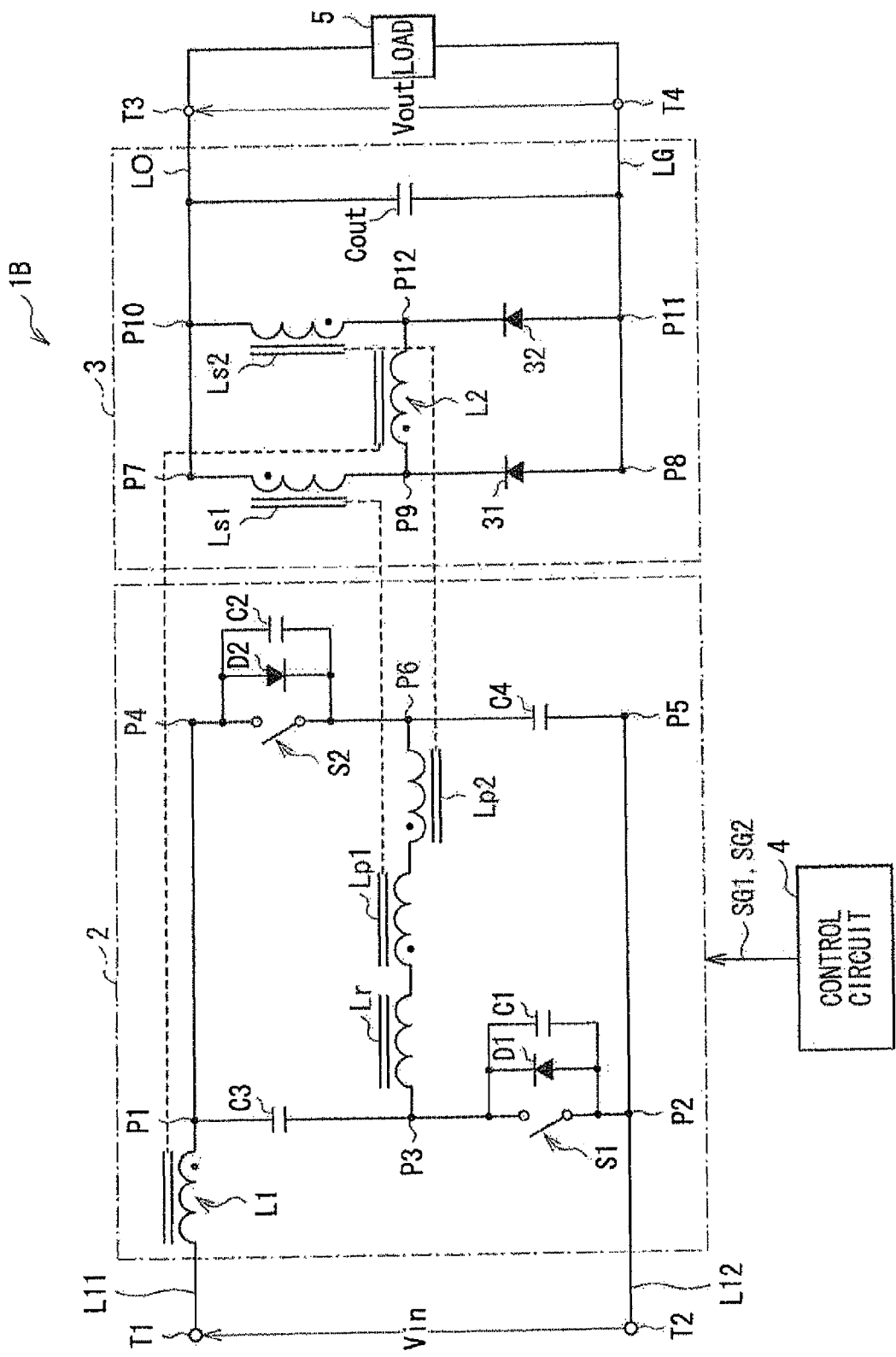
FIG. 20 is a circuit diagram of a switching power supply in another modified example (modified example 2) of the first embodiment, showing the configuration thereof.

FIG. 20 shows the circuit configuration of a switching power supply, i.e., switching power supply 1B, in a modified example 2. The switching power supply 1B in this modified example 2 is configured similarly to the switching power supply 1 in the first embodiment described above except that the winding turns of the inductor L2 are opposite in direction.

Also in the switching power supply 1B of such a configuration, the same effects as the switching power supply 1 of the above first embodiment may be achieved with the advantages similar thereto.

Figure 21:
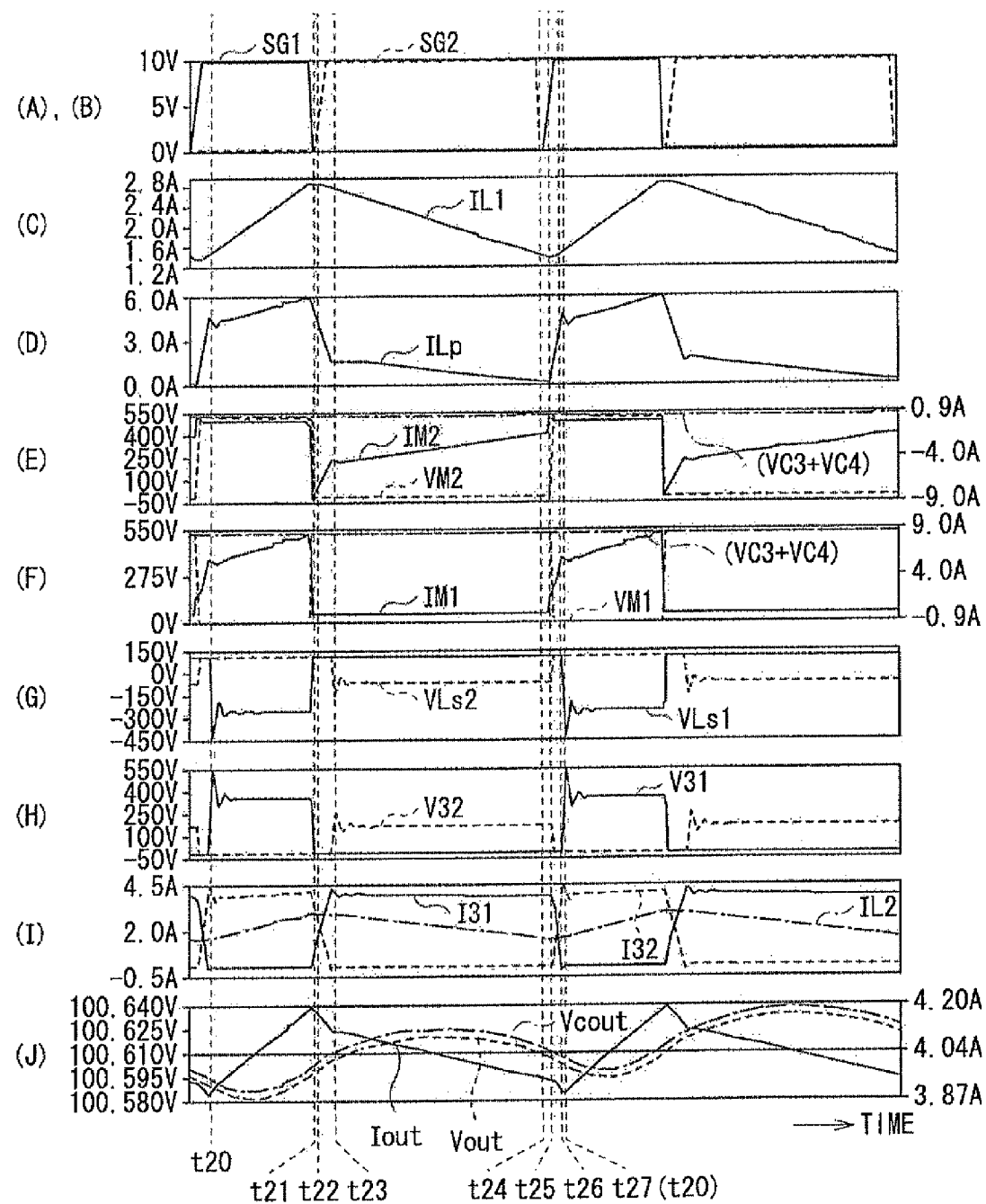
FIG. 21 is a timing diagram of the switching power supply of FIG. 20, showing an exemplary operation thereof, i.e., operation as a DC-DC converter during a positive input.

As an example, as exemplarily shown in A to J in FIG. 21, when operating as a DC-DC converter, i.e., when the input voltage Vin applied between the input terminals T1 and T2 is positive and DC, the switching power supply 1B operates similarly to A to J in FIG. 2 described in the first embodiment above. Although not shown, when operating as an AC-DC converter, the switching power supply 1B operates similarly as described in the first embodiment above.

As such, in this modified example 2, the winding turns of the inductor L2 are opposite, in direction, to the switching power supply 1. Instead of changing the direction of the winding turns of the inductor L2 as such, the winding turns of the secondary windings Ls1 and Ls2 may be both changed to be opposite, in direction, to the switching power supply 1.

Modified Example 3

Figure 22:
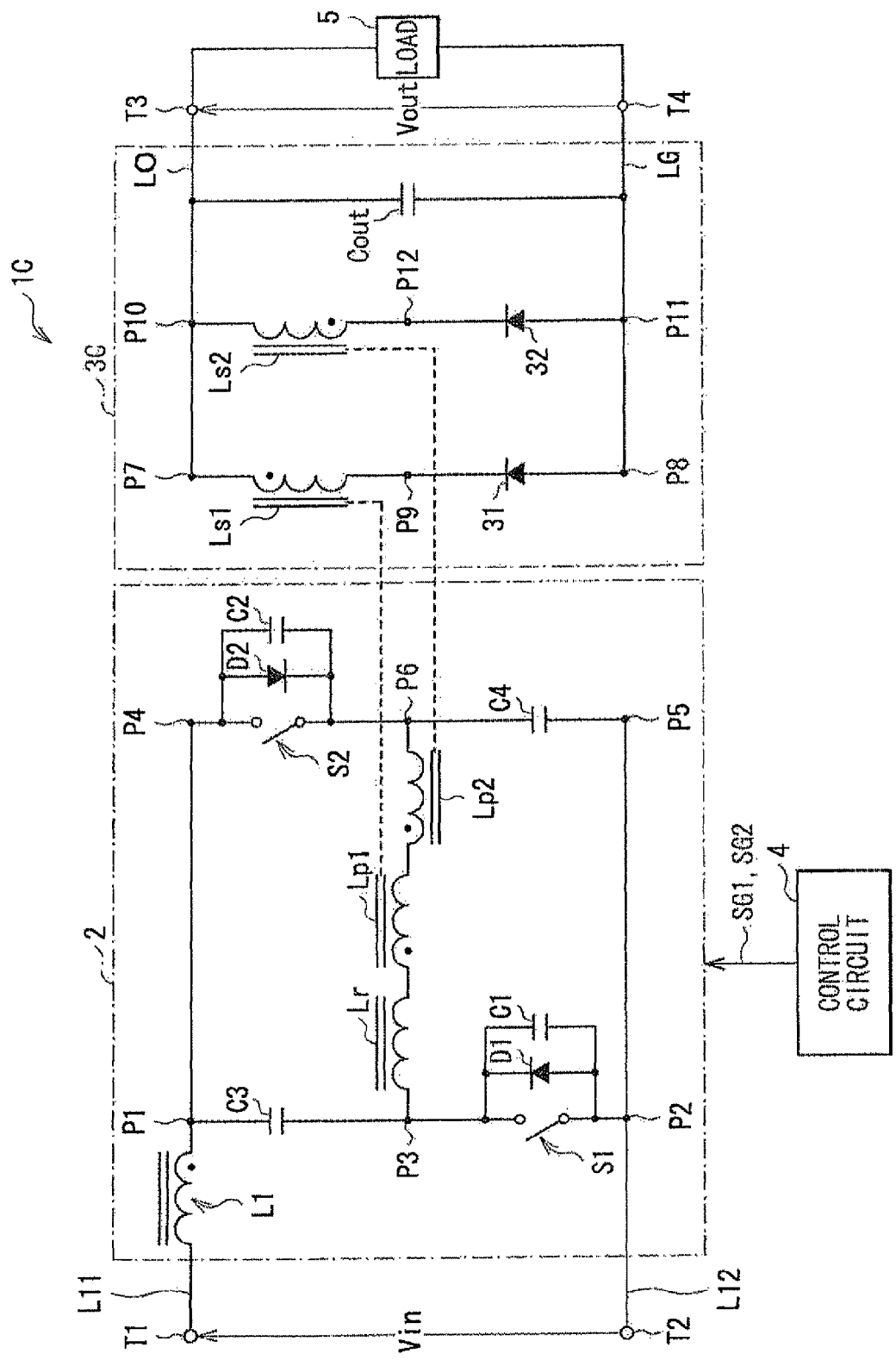
FIG. 22 is a circuit diagram of a switching power supply in still another modified example (modified example 3) of the first embodiment, showing the configuration thereof.

FIG. 22 shows the circuit configuration of a switching power supply, i.e., switching power supply 1C, in a modified example 3. The switching power supply 1C in this modified example 3 is configured similarly to the switching power supply 1 in the first embodiment described above except that the inductor L2 is not provided between the connection points P9 and P12.

Also in the switching power supply 1C of such a configuration, the same effects as the switching power supply 1 of the first embodiment above may be achieved with the advantages similar thereto.

Because the inductor L2 is not provided, the number of the components may be reduced more compared with the switching power supply 1 in the first embodiment described above, thereby leading to the further reduction of the manufacturing cost.

Modified Example 4

Figure 23:
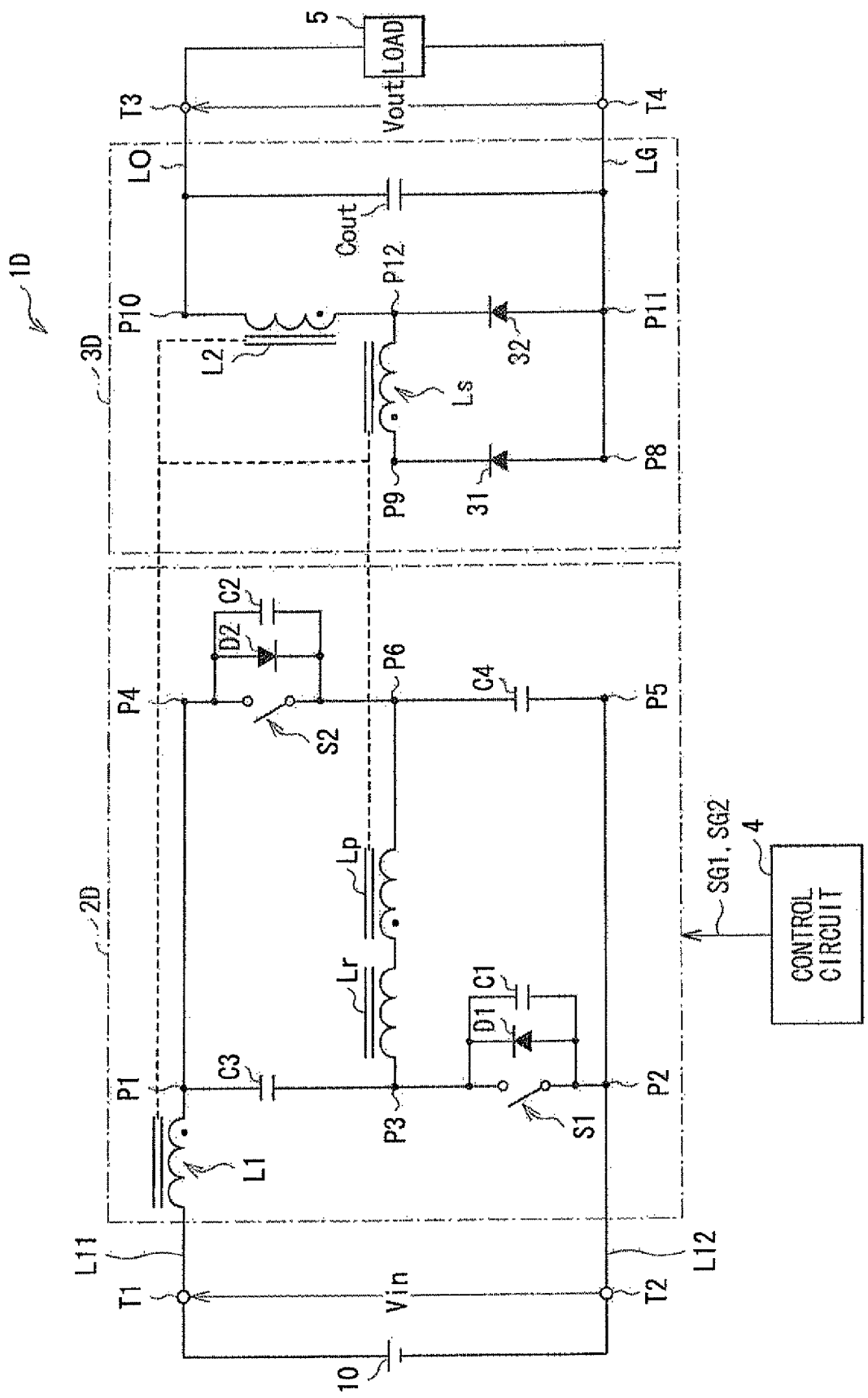
FIG. 23 is a circuit diagram of a switching power supply in still another modified example (modified example 4) of the first embodiment, showing the configuration thereof.

FIG. 23 shows the circuit configuration of a switching power supply, i.e., switching power supply 1D, in a modified example 4. The switching power supply 1D in this modified example 4 is configured differently from the switching power supply 1 in the first embodiment described above in the respect that one primary winding Lp and one secondary winding Ls are provided as alternatives to the two primary windings Lp1 and Lp2 and the two secondary windings Ls1 and Ls2 in the transformer. In other words, the switching power supply 1D is provided with a switching circuit 2D as an alternative to the switching circuit 2, and a rectifying/smoothing circuit 3D as an alternative to the rectifying/smoothing circuit 3.

To be specific, in the switching circuit 2D, the inductor Lr and the primary winding Lp are connected in series between the connection points P3 and P6. The rest of the configuration is similar to that of the switching circuit 2.

In the rectifying/smoothing circuit 3D, the secondary winding Ls is disposed between the connection points P9 and P12, and the inductor L2 is disposed between the connection points P10 and P12. Unlike in the rectifying/smoothing circuit 3, the connection point P7 is not provided. That is, this rectifying/smoothing circuit 3D does not include the second bridge circuit as in the rectifying/smoothing circuit 3. The rest of the configuration is similar to that of the rectifying/smoothing circuit 3.

In the switching power supply 1D of such a configuration, unlike in the switching power supplies 1, and 1A to 1C described above, the rectifying/smoothing circuit 3D is not configured to be point symmetric. The switching power supply 1D thus does not operate as an AC-DC converter but operate only as a DC-DC converter. Herein, when operating as a DC-DC converter, the switching power supply 1D operates basically similar to the switching power supplies 1, and 1A to 1C.

Second Embodiment

Entire Configuration of Switching Power Supply 7

Figure 24:
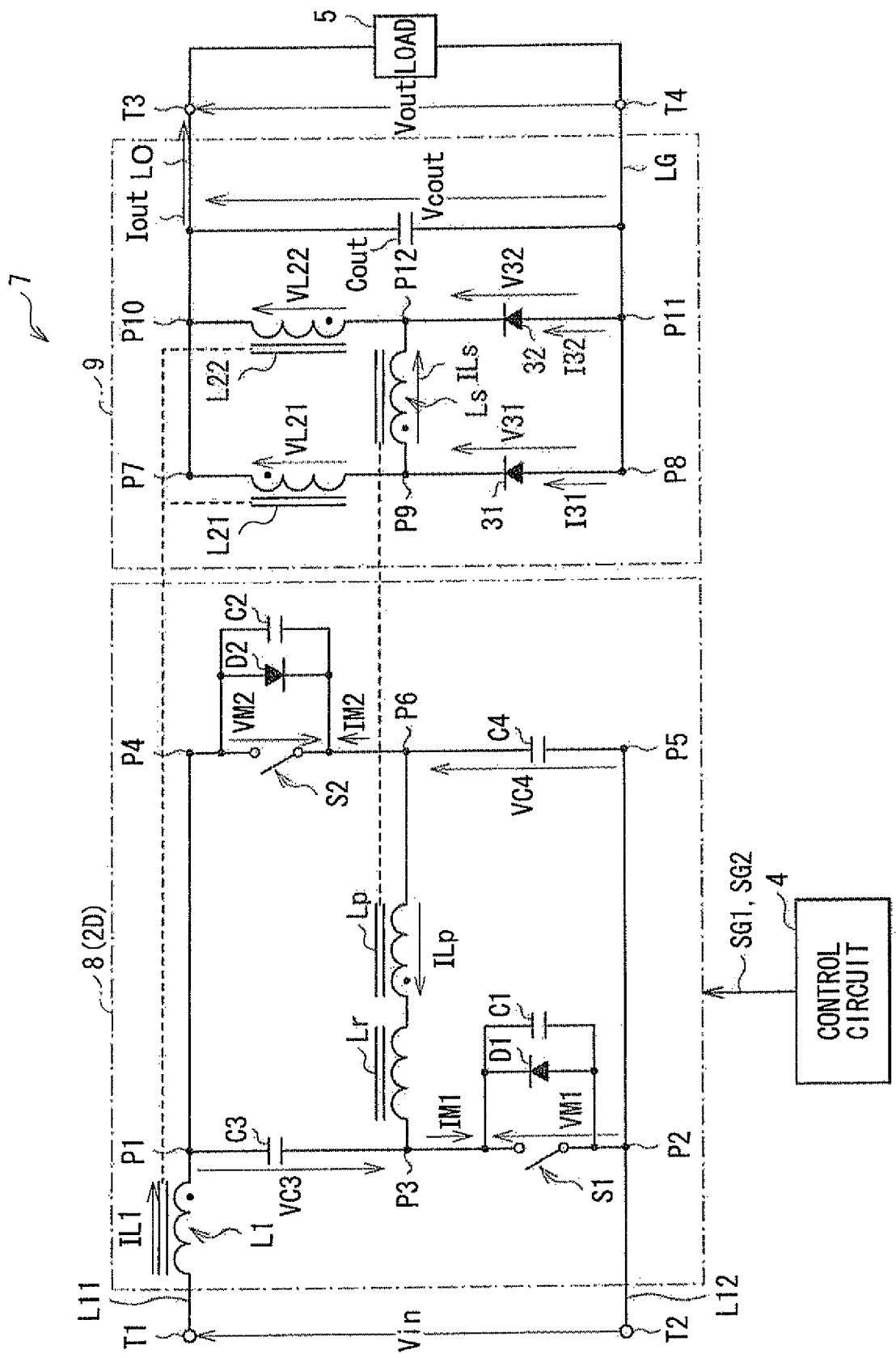
FIG. 24 is a circuit diagram of a switching power supply of a second embodiment, showing the configuration thereof.

FIG. 24 shows the circuit configuration of a switching power supply, i.e., switching power supply 7, in a second embodiment of the invention. This switching power supply 7 generates a DC output voltage Vout by voltage conversion of a DC or AC input voltage Vin coming from the input terminals T1 and T2. The resulting DC output voltage Vout is provided to a battery that is not shown for driving of the load 5. That is, the switching power supply 7 is so configured as to function as a DC-DC converter or an AC-DC converter.

Such a switching power supply 7 is configured to include a transformer, a switching circuit 8 (2D), a rectifying/smoothing circuit 9, and the control circuit 4. The transformer includes a primary winding Lp, and a secondary winding Ls that will be described later.

[Switching Circuit 8]

The switching circuit 8 performs a switching operation with respect to a DC or AC input voltage Vin applied between the input terminals T1 and T2. This switching operation is performed in response to the drive signals SG1 and SG2 coming from the control circuit 4. This switching circuit 8 is configured to include the two switching elements S1 and S2, the capacitors C1 and C2, and the diodes D1 and D2. The switching elements S1 and S2 respectively perform the switching operation in accordance with the drive signals SG1 and SG2. To these switching elements S1 and S2, the capacitors C1 and C2, and the diodes D1 and D2 are respectively connected in parallel. The switching circuit 8 is also provided therein with the two capacitors C3 and C4, and the inductors L1 and Lr.

The inductor L1 is inserted to be positioned between the input terminal T1 and the connection point P1 on the connection line L11 that extends from the input terminal T1 to the output end.

The switching element S1 is disposed between the connection point P2 on the connection line L12 extending from the input terminal T2, and the connection point P3. In the diode D1 connected in parallel to this switching element S1, the anode thereof is located on the side of the connection point P2, and the cathode thereof is located on the side of the connection point P3. On the other hand, the switching element S2 is positioned between the connection point P4 on the connection line L11, and the connection point P6. In the diode D2 connected in parallel to this switching element S2, the anode thereof is located on the side of the connection point P4, and the cathode thereof is located on the side of the connection point P6. That is, the diodes D1 and D2 are so disposed as to face in the opposite direction.

Note that the switching elements S1 and S2 are each exemplified by a MOS-FET, and an IGBT, for example. When the switching elements are each a MOS-FET, the capacitors C1 and C2, and the diodes D1 and D2 may be each configured by the parasitic capacitance of the MOS-PET or by the body diode thereof. Alternatively, the capacitors C1 and C2 may be each configured by the junction capacitance of the diodes D1 and D2. If this is the configuration, there is no more need to provide the capacitors C1 and C2, and the diodes D1 and D2 separately from the switching elements, thereby being able to simplify the circuit configuration.

The capacitor C3 is disposed between the connection point P1 on the connection line L11, and the connection point P3. The capacitor C4 is disposed between the connection point P5 on the connection line L12, and the connection point P6.

The inductor Lr is connected in series between the connection points P3 and P6 to the primary winding Lp of the transformer described above. To be specific, the inductor Lr is located between the connection point P3 and an end of the primary winding Lp, and the remaining end of the primary winding Lp is connected to the connection point P6. Instead of providing the inductor Lr separately as such, the inductor Lr may be configured with the leakage inductance being the result of the magnetic coupling between the primary winding Lp and the secondary winding Ls.

In the switching circuit 8 as such, the switching elements S1 and S2 (including the diodes D1 and D2 and the capacitors C1 and C2) are placed diagonally to the capacitors C3 and C4, thereby configuring a bridge circuit, i.e., first bridge circuit. This first bridge circuit is H-bridge-connected with the inductor Lr and the primary winding Lp. In other words, in the switching circuit 8, the bridge circuit, i.e., first bridge circuit, is configured by the switching elements S1 and S2 (including the diodes D1 and D2 and the capacitors C1 and C2), the capacitors C3 and C4, the inductor Lr, and the primary winding Lp.

[Rectifying/Smoothing Circuit 9]

The rectifying/smoothing circuit 9 is operated to rectify and smooth the voltage being the result after the transformation by the above-described transformer in response to the switching operation in the switching circuit 8. The resulting DC voltage after the operation of rectifying and smoothing as such is output between output terminals T3 and T4 as an output voltage Vout. Such a rectifying/smoothing circuit 9 is configured to include two inductors L21 and L22, the two rectifying diodes 31 and 31, and the output smoothing capacitor Cout.

The inductor L21 is disposed between the connection point P7 on the output line LO, and the connection point P9. The output line LO is the one extending from the output terminal T3 to the input end. The inductor L22 is disposed between the connection point P10 on the output line LO, and the connection point P12. These inductors L21 and 22 are magnetically coupled to the inductor L1 in the switching circuit 8. For such magnetic coupling between the inductors L21, L22, and L1, the leakage inductance (not shown) exists but as an alternative to such leakage inductance, any other inductors may be individually provided.

The rectifying diode 31 is disposed between the connection point P8 on the ground line LG, and the connection point P9. The ground line LG is the one extending from the output terminal T4 to the input end. To be specific, the anode of the rectifying diode 31 is located on the side of the connection point P8, and the cathode thereof is located on the side of the connection point P9. The rectifying diode 32 is disposed between the connection point P11 on the ground line LG, and the connection point P12. To be specific, the anode of the rectifying diode 32 is located on the side of the connection point P11, and the cathode thereof is located on the side of the connection point P12.

Between the connection points P9 and P12, the secondary winding Ls of the transfer described above is provided. Note here that the inductor Lr connected in series to the primary winding Lp may be disposed on the side of the secondary winding Ls, or may be disposed on both sides of the primary and secondary windings Lp and Ls.

As such, in the rectifying/smoothing circuit 9, a bridge circuit, i.e., third bridge circuit, is configured by an arm including inductor L21 and the rectifying diode 31, and by another arm including the inductor L22 and the rectifying diode 32. Such a third bridge circuit is H-bridge-connected with the second winding Ls. In other words, in the rectifying/smoothing circuit 9, the bridge circuit, i.e., third bridge circuit, is configured by the arm, i.e., the inductor L21 and the rectifying diode 31, and the other arm, i.e., the inductor L22 and the rectifying diode 32, and the secondary winding Ls.

The output smoothing capacitor Cout is disposed between the output line LO, i.e., a point between the connection point P10 and the output terminal T3, and the ground line LG (a point between the connection point P11 and the output terminal T4).

[Control Circuit 4]

The control circuit 4 is operated to drive the switching elements S1 and S2 in the switching circuit 8. To be specific, the control circuit 4 provides the above-described drive signals SG1 and SG2 respectively to the switching elements S1 and S2, thereby controlling ON and OFF of these switching elements S1 and S2.

Herein, the input terminals T1 and T2 are specific examples of "a pair of input terminals" in the embodiments of the invention, and the output terminals T3 and T4 are specific examples of "a pair of output terminals" therein. The switching elements S1 and S2 are respectively specific examples of "a first switching element" and "a second switching element" in the embodiments of the invention, the diodes D1 and D2 are respectively specific examples of "a first rectifying element" and "a second rectifying element" therein, and the capacitors C1 and C2 are respectively specific examples of "a first capacitive element" and "a second capacitive element" therein. The inductor L1 is a specific example of "a first inductor" in the embodiments of the invention, and the inductors L21 and L22 are specific examples of "a first element" and "a second element" therein. The rectifying diodes 31 and 32 are respectively specific examples of "a third rectifying element" and "a fourth rectifying element" in the embodiments of the invention, and the output smoothing capacitor Cout is a specific example of "a third capacitive element" therein. The output line LO and the ground line LG are specific examples of "a pair of connection lines" therein.

[Advantages and Effects of Switching Power Supply 7]

Described next are the advantages and effects of the switching power supply 7 in this second embodiment.

[1. Basic Operation]

In this switching power supply 7, the switching circuit 8 generates an AC voltage by a switching of a DC or AC input voltage Vin coming from the input terminals T1 and T2. The resulting AC voltage is transformed by the transformer configured by the primary winding Lp in the switching circuit 8, and the secondary winding Ls in the rectifying/smoothing circuit 3. The AC voltage being the result of the transformation as such is then output from the secondary winding Ls.

The AC voltage being the result after the transformation as above is rectified in the rectifying/smoothing circuit 9 by the rectifying diodes 31 and 32. This accordingly generates a rectified output between the output line LO and the ground line LG. The rectified output is smoothed by the output rectifying capacitor Cout, and then is output from the output terminals T3 and T4 as a DC output voltage Vout. This DC output voltage Vout is then supplied to a battery (not shown) for charging thereof, and the load 5 is driven thereby.

As such, the switching power supply 7 is operated to generate the DC output voltage Vout by DC-DC voltage conversion of the DC input voltage Vin, i.e., functions as a DC-DC converter, or to generate the DC output voltage Vout by AC-DC voltage conversion of the AC input voltage Vin, i.e., functions as an AC-DC converter. The details will be described below.

[2. Operation in Detail]

By referring to FIGS. 25A to 36, the specific operation of the switching power supply 7 is described in detail in comparison with a comparison example.

[2-1. Operation as DC-DC Converter]

First of all, by referring to FIGS. 25A to 35, described is an exemplary operation of the switching power supply 7 of FIG. 24 as a DC-DC converter.

FIGS. 25A to 25J are timing diagrams of the switching power supply 7 of FIG. 24, showing a voltage or current waveform of each component therein. As shown in FIGS. 26 to 34, the timing diagram corresponds to a case that the DC power supply 10 inputs a positive DC input voltage Vin between the input terminals T1 and T2. The positive voltage is the one higher in value on the side of the input terminal T1. In FIG. 25, A shows the voltage waveform of the drive signal SG1, and B shows that of the drive signal SG2. Also in FIG. 25, C shows the current waveform of a current IL1 flowing through the inductor L1 of FIG. 24. D shows the current waveform of a current ILp flowing through the components between the connection points P6 and P3, i.e., the primary wiring Lp, and the inductor Lr. E shows three waveforms, i.e., the current waveform of a current IM2 flowing through an element group M2, the voltage waveform of a voltage VM2 in the element group M2 between both ends, and the voltage waveform of a voltage being the sum of voltages VC3 and VC4 (VC3+VC4). Herein, the element group M2 includes the switching element S2, the diode D2, and the capacitor C2. The voltage VC3 is of a value in the capacitor C3 between both ends, and the voltage VC4 is of a value in the capacitor C4 between both ends. F shows three waveforms, i.e., the current waveform of a current IM1 flowing through an element group M1, the voltage waveform of a voltage VM1 in the element group M1 between both ends, and the voltage waveform as above of the voltage being the sum of the voltages VC3 and VC4 (VC3+VC4). Herein, the element group M1 includes the switching element S1, the diode D1, and the capacitor C1. G shows the voltage waveform of a voltage VL21 in the inductor L21 between both ends, and of a voltage VL22 in the inductor L22 between both ends. H shows the voltage waveform of a voltage V31 in the rectifying diode 31 between both ends, and a voltage V32 in the rectifying diode 32 between both ends. I shows the current waveform of a current I31 flowing through the rectifying diode 31 in the forward direction, of a current I32 flowing through the rectifying diode 32 in the forward direction, and of a current ILs flowing through the inductor Ls, i.e., current waveform of (−ILs) in this example. J shows the current waveform of an output current Iout, and the voltage waveform of an output voltage Vout, and of a voltage Vcout in the output smoothing capacitor Cout between both ends. Note here that the normal directions of such voltages and currents are assumed to be those respectively indicated by arrows in FIG. 24.

Figure 25:
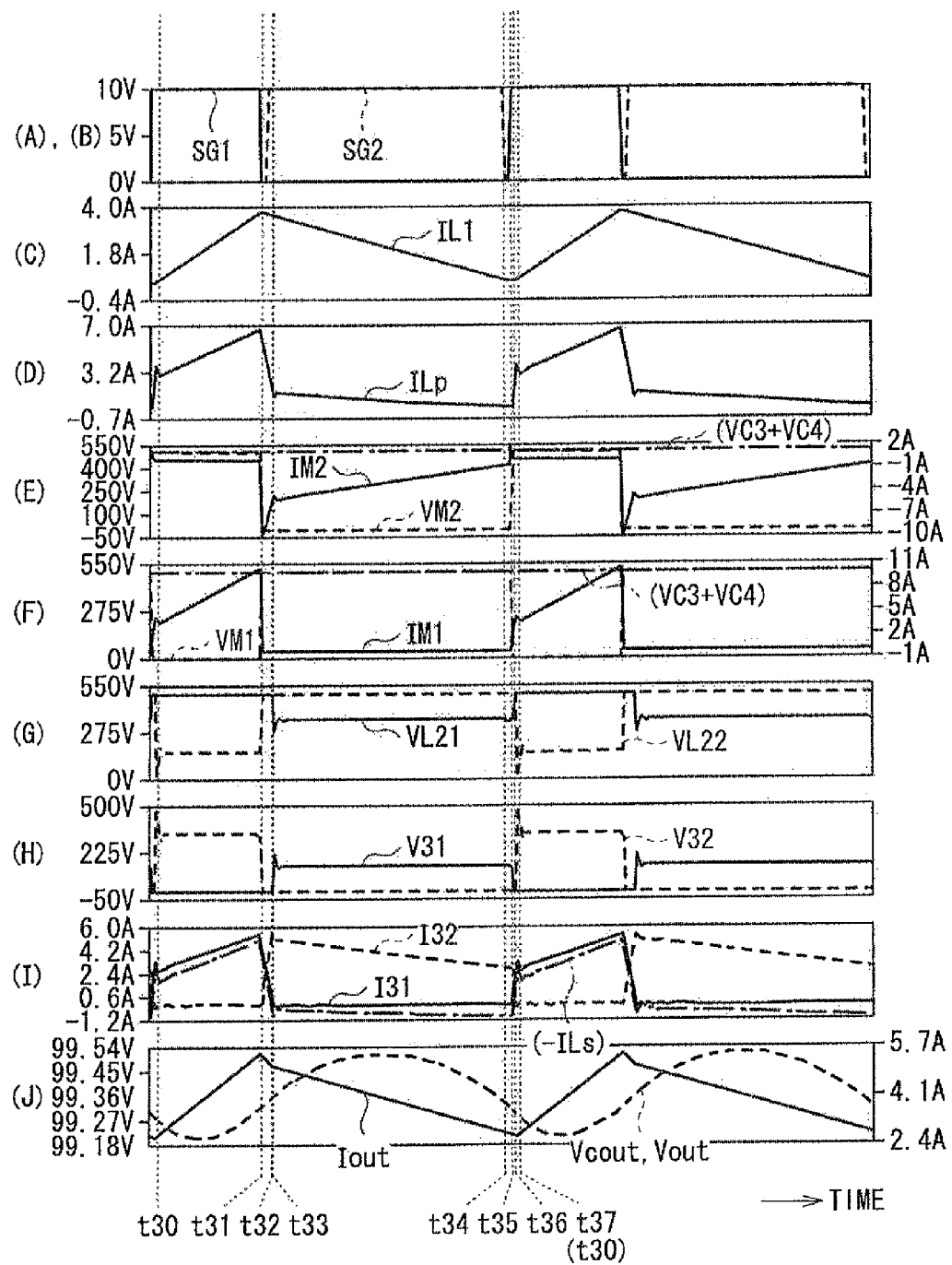
FIGS. 25A to 25J are timing diagrams of the switching power supply of FIG. 24, showing an exemplary operation thereof; i.e., operation as a DC-DC converter during a positive input.

FIGS. 26 to 34 each show the state of operation of the switching power supply 7 at respective timings of t30 to t37 (t30) in an operation cycle in FIG. 25.

Figure 26:
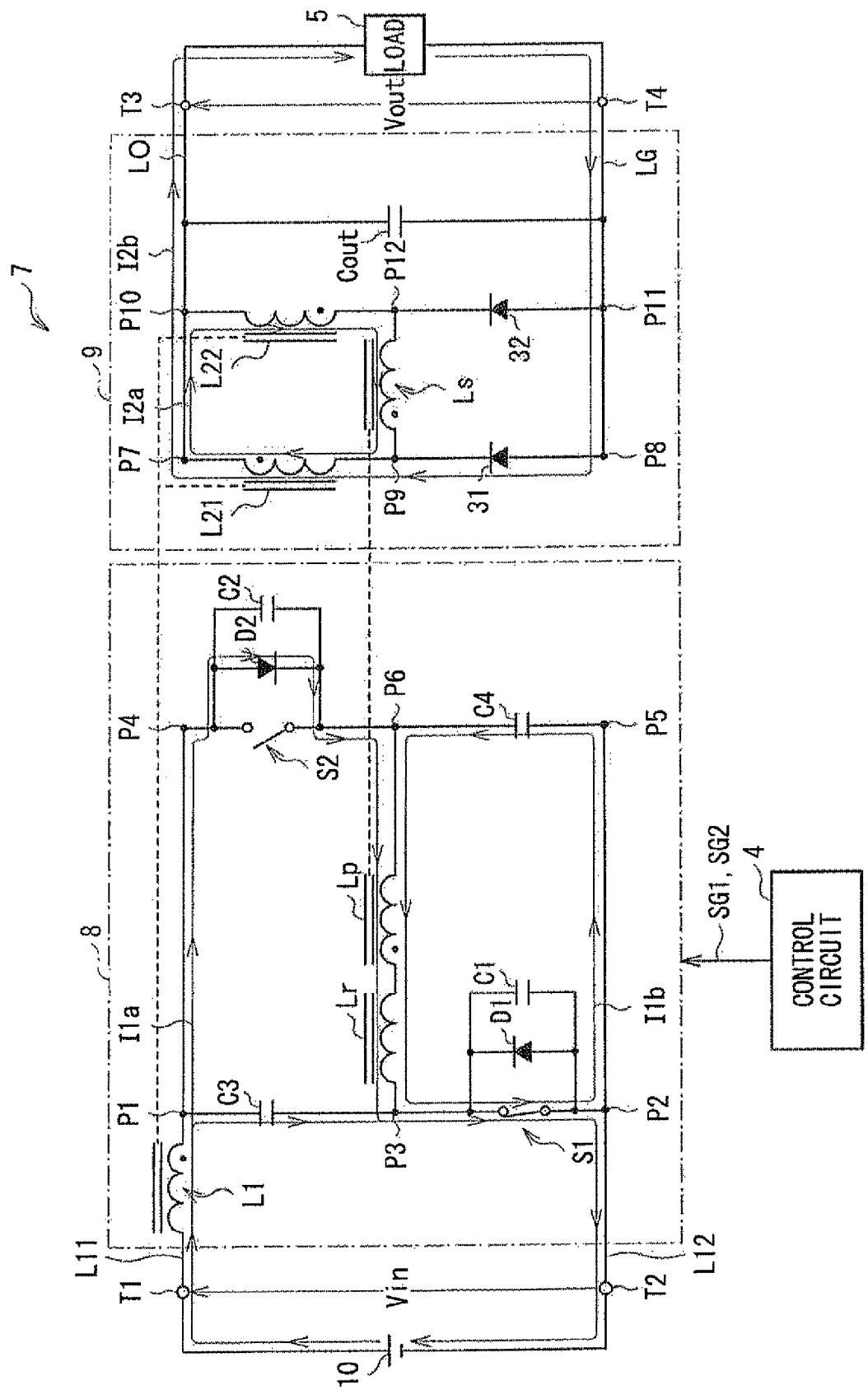
FIG. 26 is a circuit diagram of the switching power supply of FIG. 25, illustrating the operation thereof.

First of all, in a period from the timing t30 to t31 in FIG. 26, the switching element S1 is turned ON (A in FIG. 25), and the switching element S2 is turned OFF (B in FIG. 25). As a result, mesh currents I1a and I1b as shown in the drawing start flowing in the switching circuit 8. To be specific, the flow of the mesh current I1a starts from the DC power supply 10 to go via the input terminal T1 and the inductor L1, and then is directed in two paths, i.e., one is via the diode D2, the primary winding Lp, and the inductor Lr, and the other is through the capacitor C3. After flowing in two paths as such, the mesh current I1a flows via the switching element S1 and the input terminal T2. On the other hand, the flow of the mesh current I1b circulates via the capacitor C4, the primary winding Lp, the inductor Lr, the switching element S1, and the capacitor C4 in this order. Such flows of the mesh currents I1a and I1b energize the inductor Lr, and cause transmission of power in the transformer from the primary side, i.e., primary winding Lp, to the secondary side, i.e., secondary winding Ls. With such energization and power transmission, the mesh currents I2a and I2b as shown in the drawing start flowing on the secondary side of the transformer, i.e., in the rectifying/smoothing circuit 9. To be specific, the flow of the mesh current I2a circulates via the secondary winding Ls, the inductor L21, and the inductor L22 in this order. On the other hand, the flow of the mesh current I2b circulates via the inductor L21, the output terminal T3, the load 5, the output terminal T4, and the rectifying diode 31 in this order, whereby the load 5 is accordingly driven.

Figure 27:
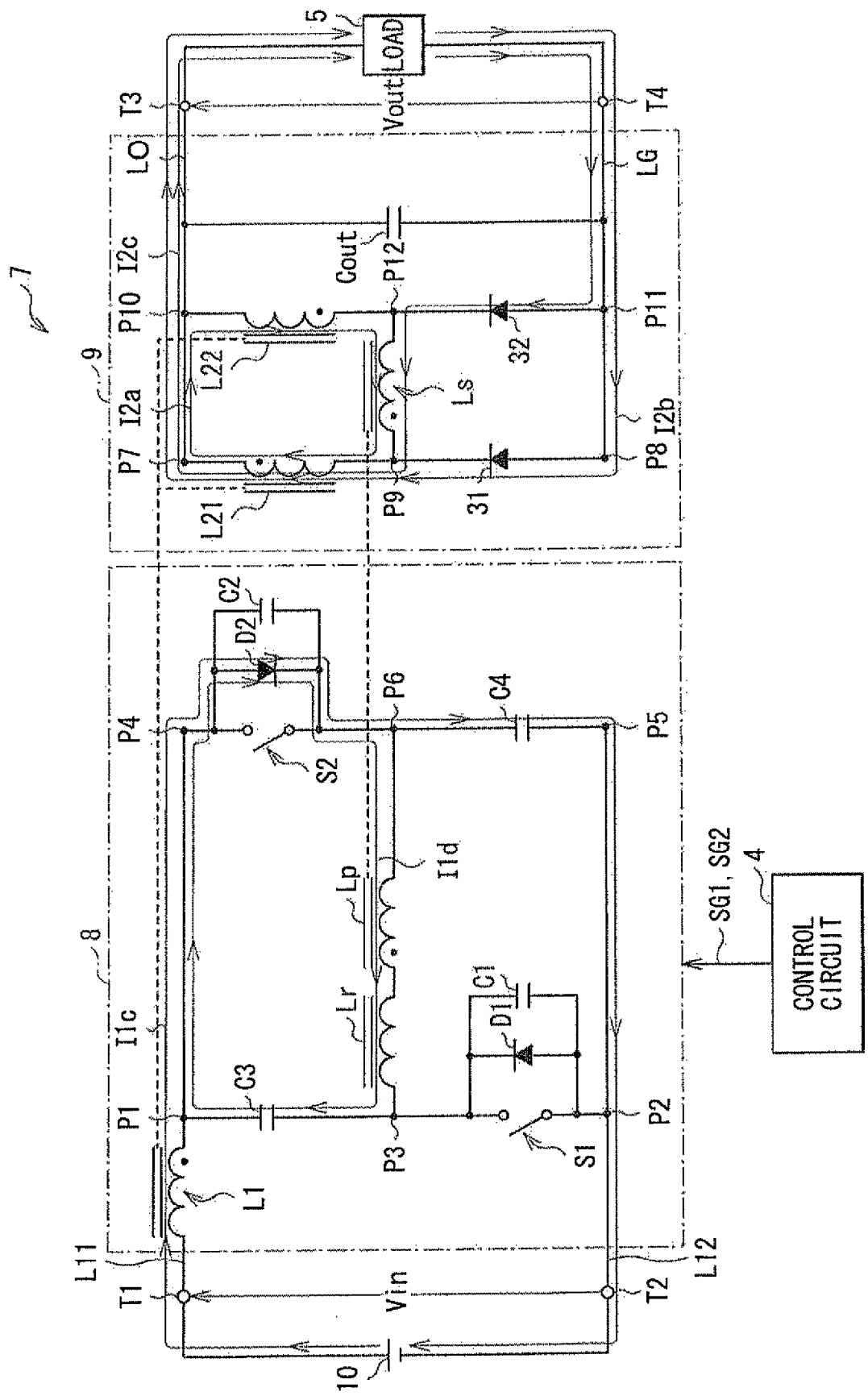
FIG. 27 is a circuit diagram of the switching power supply of FIG. 25, illustrating the operation thereof after the operation of FIG. 26.

Next, in a period from the timing t31 to t32 in FIG. 27, the switching element S1 is turned OFF at the timing t31 (A in FIG. 25). In response thereto, mesh currents I1mayd I1d as shown in the drawing start flowing in the switching circuit 8. To be specific, the flow of the mesh current I1c starts from the DC power supply 10 to go via the input terminal T1, the inductor L1, the diode D2, the capacitor C4, and the input terminal T2. The flow of the mesh current I1d circulates via the inductor Lr, the capacitor C3, the diode D2, the primary winding Lp, and the inductor Lr in this order. On the other hand, on the secondary side of the transformer, i.e., in the rectifying/smoothing circuit 9, the mesh currents I2a, I2b, and I2c as shown in the drawing start flowing. Herein, the flow of the mesh current I2c specifically circulates via the inductor L21, the output terminal T3, the load 5, the output terminal T4, the rectifying diode 32, and the secondary winding Ls in this order. With the flows of such mesh currents I2b and I2c, the load 5 is accordingly driven.

Figure 28:
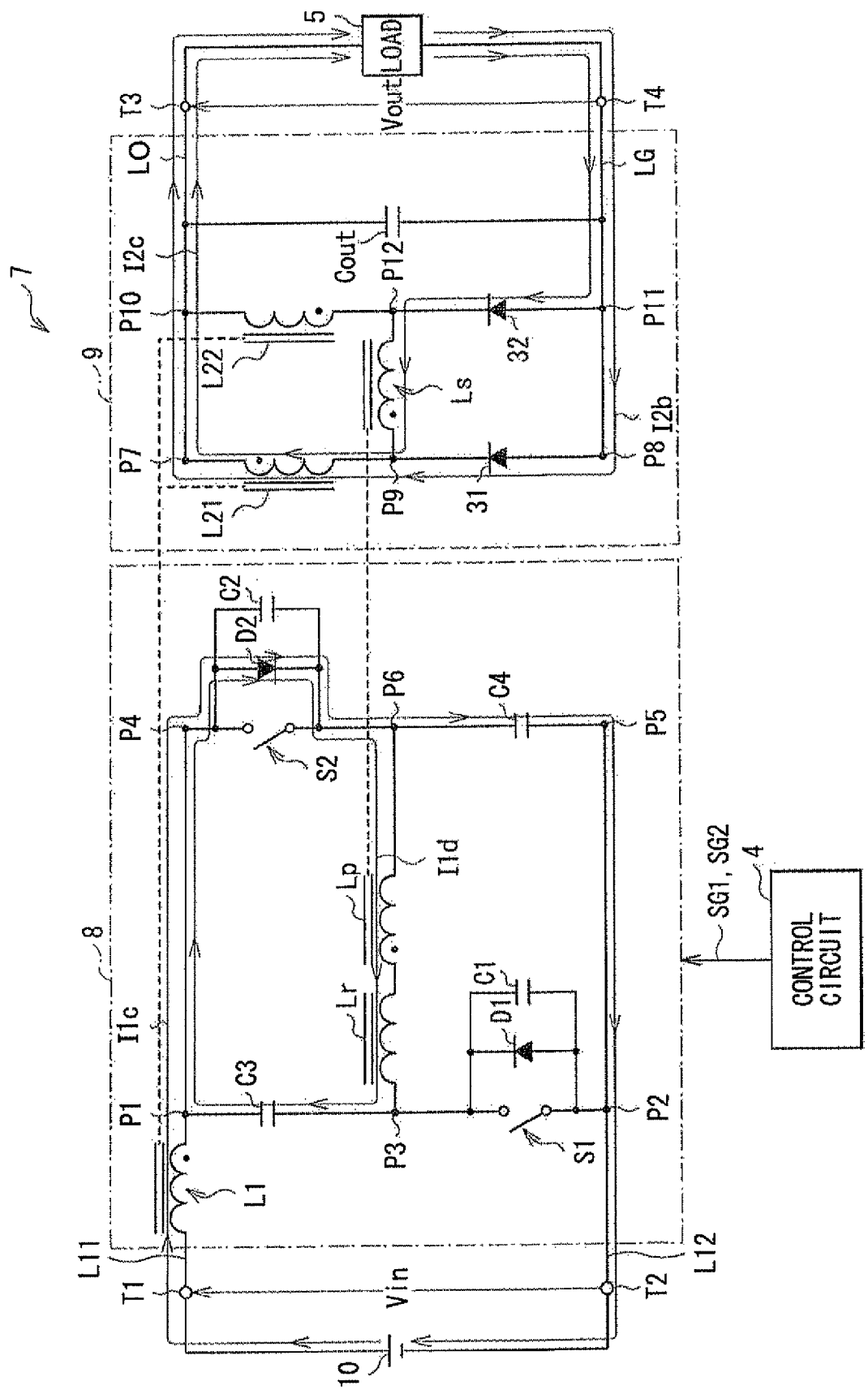
FIG. 28 is a circuit diagram of the switching power supply of FIG. 25, illustrating the operation thereof after the operation of FIG. 27.

Next, at the timing t32 in FIG. 28, the mesh current I2a described above does not flow any more on the secondary side of the transformer, i.e., in the rectifying/smoothing circuit 9. That is, in the rectifying/smoothing circuit 9, only the two flows of the mesh currents I2b and I2c drive the load 5.

Figure 29:
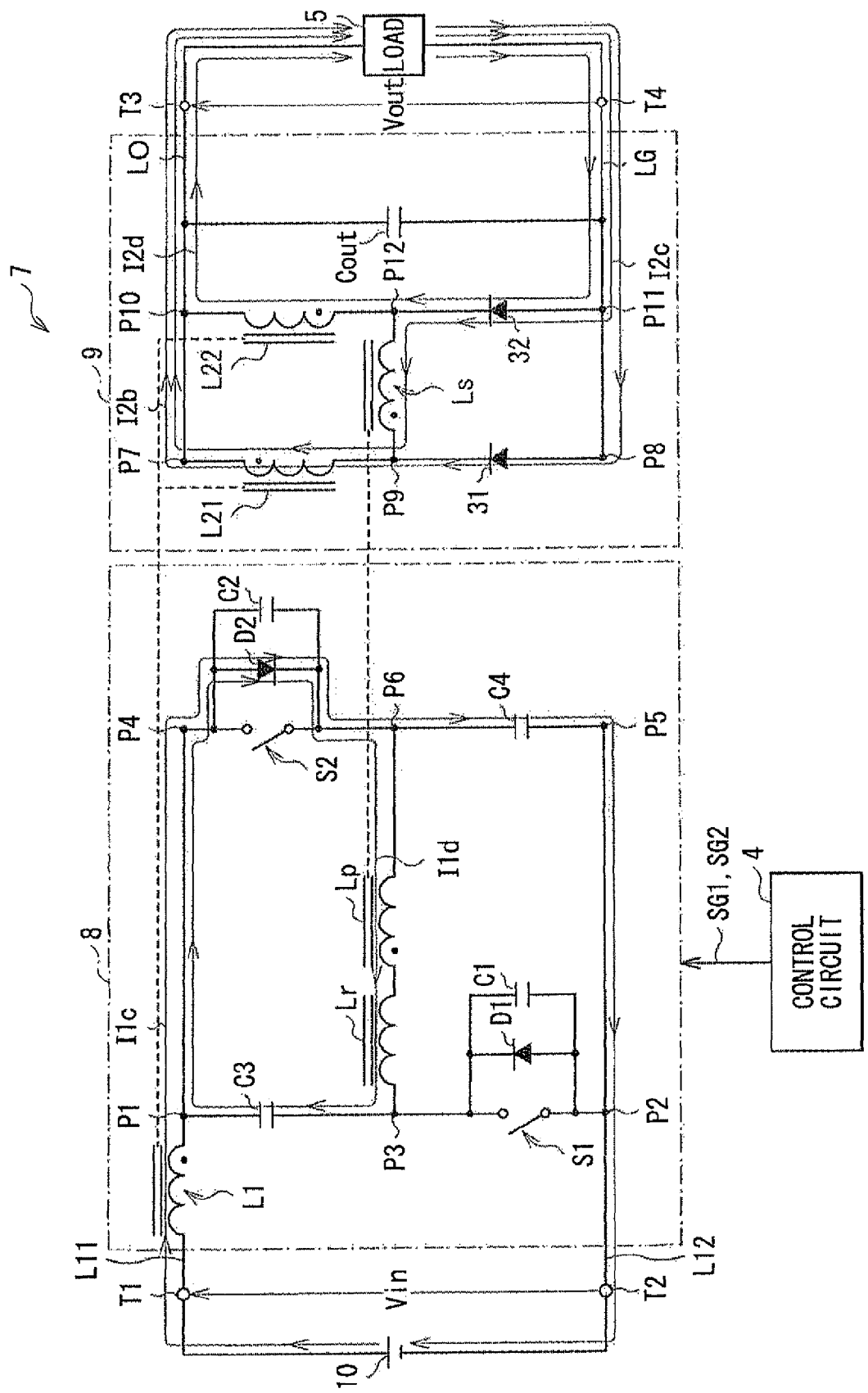
FIG. 29 is a circuit diagram of the switching power supply of FIG. 25, illustrating the operation thereof after the operation of FIG. 28.

Next, in a period from the timing t32 to t33 in FIG. 29, in addition to the mesh currents I2b and I2c described above, a mesh current I2d newly starts flowing on the secondary side of the transformer, i.e., in the rectifying/smoothing circuit 9. To be specific, the flow of the mesh current I2d circulates via the inductor L22, the output terminal T3, the load 5, the output terminal T4, and the rectifying diode 32 in this order. With the flows of such mesh currents I2b, I2mayd I2d, the load 5 is accordingly driven.

Figure 30:
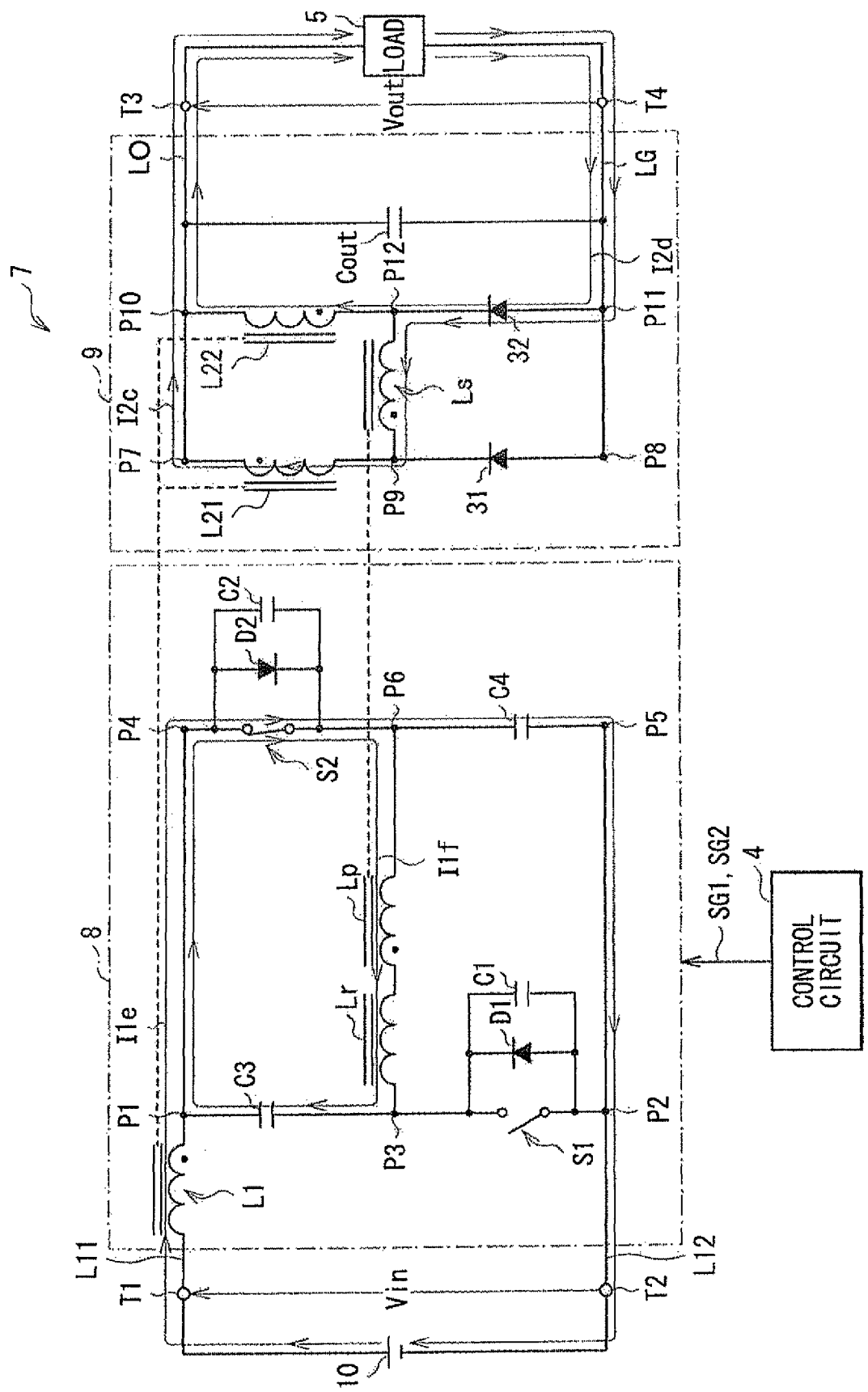
FIG. 30 is a circuit diagram of the switching power supply of FIG. 25, illustrating the operation thereof after the operation of FIG. 29.

Next, in a period from the timing t33 to t34 in FIG. 30, at the timing t33, the switching element S2 is turned ON (B in FIG. 25). In response thereto, mesh currents I1e and I1f as shown in the drawing start flowing in the switching circuit 8. To be specific, the flow of the mesh current I1e starts from the DC power supply 10 to go via the input terminal T1, the inductor L1, the switching element S2, the capacitor C4, and the input terminal T2. The flow of the mesh current I1f circulates via the inductor Lr, the capacitor C3, the switching element S2, the primary winding Lp, and the inductor Lr in this order. On the other hand, on the secondary side of the transformer, i.e., in the rectifying/smoothing circuit 9, the mesh current I2b described above does not flow any more. That is, in the rectifying/smoothing circuit 9, only the two flows of the mesh currents I2mayd I2d drive the load 5.

Figure 31:
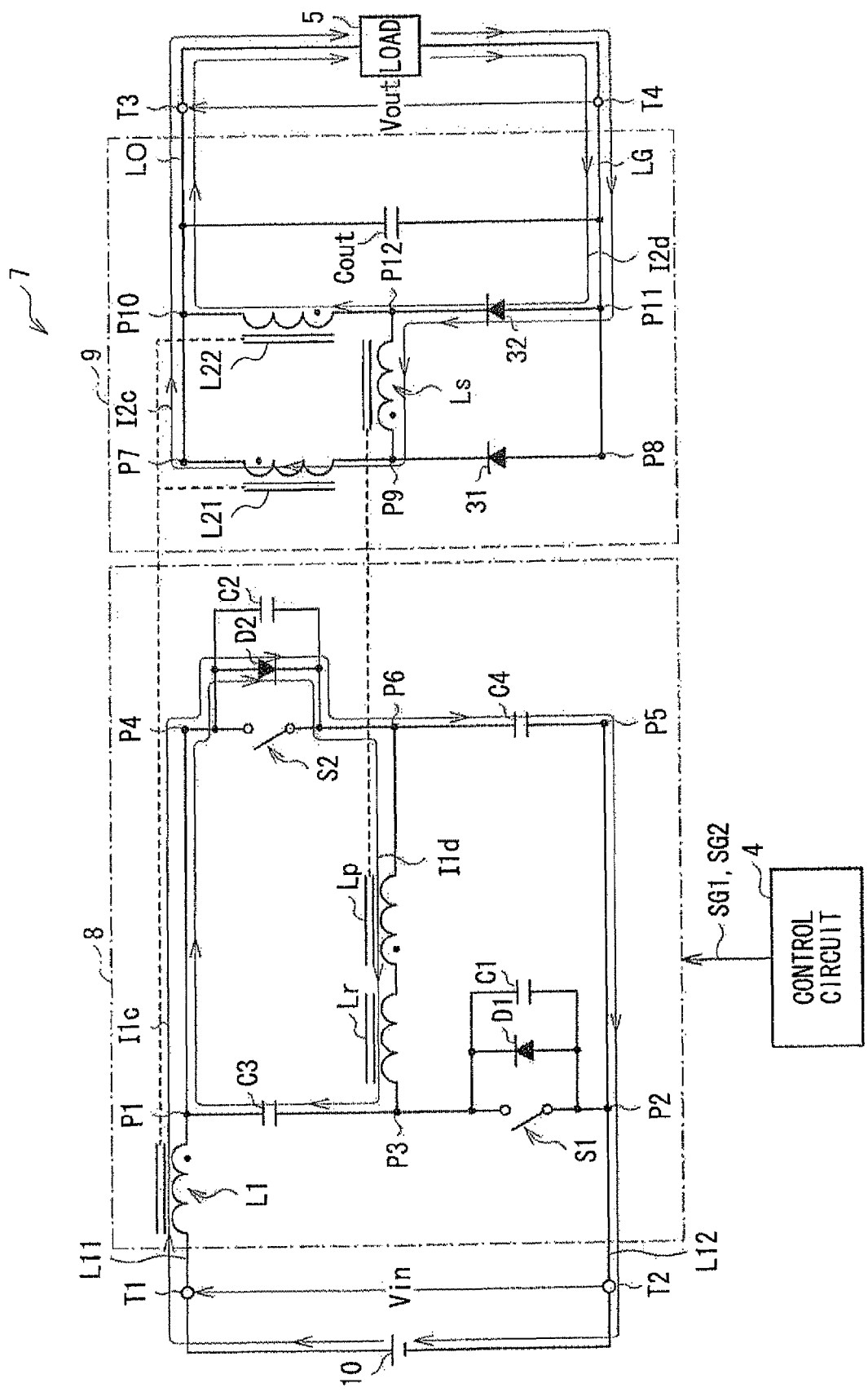
FIG. 31 is a circuit diagram of the switching power supply of FIG. 25, illustrating the operation thereof after the operation of FIG. 30.

Next, in a period from the timing t34 to t35 in FIG. 31, the switching element S2 is turned OFF at the timing t34 (B in FIG. 25). In response thereto, the mesh currents I1mayd I1d described above start flowing in the switching circuit 8 as shown in the drawing. On the other hand, on the secondary side of the transformer, i.e., in the rectifying/smoothing circuit 9, the mesh currents I2mayd I2d continue to flow so that the load 5 is accordingly driven thereby.

Figure 32:
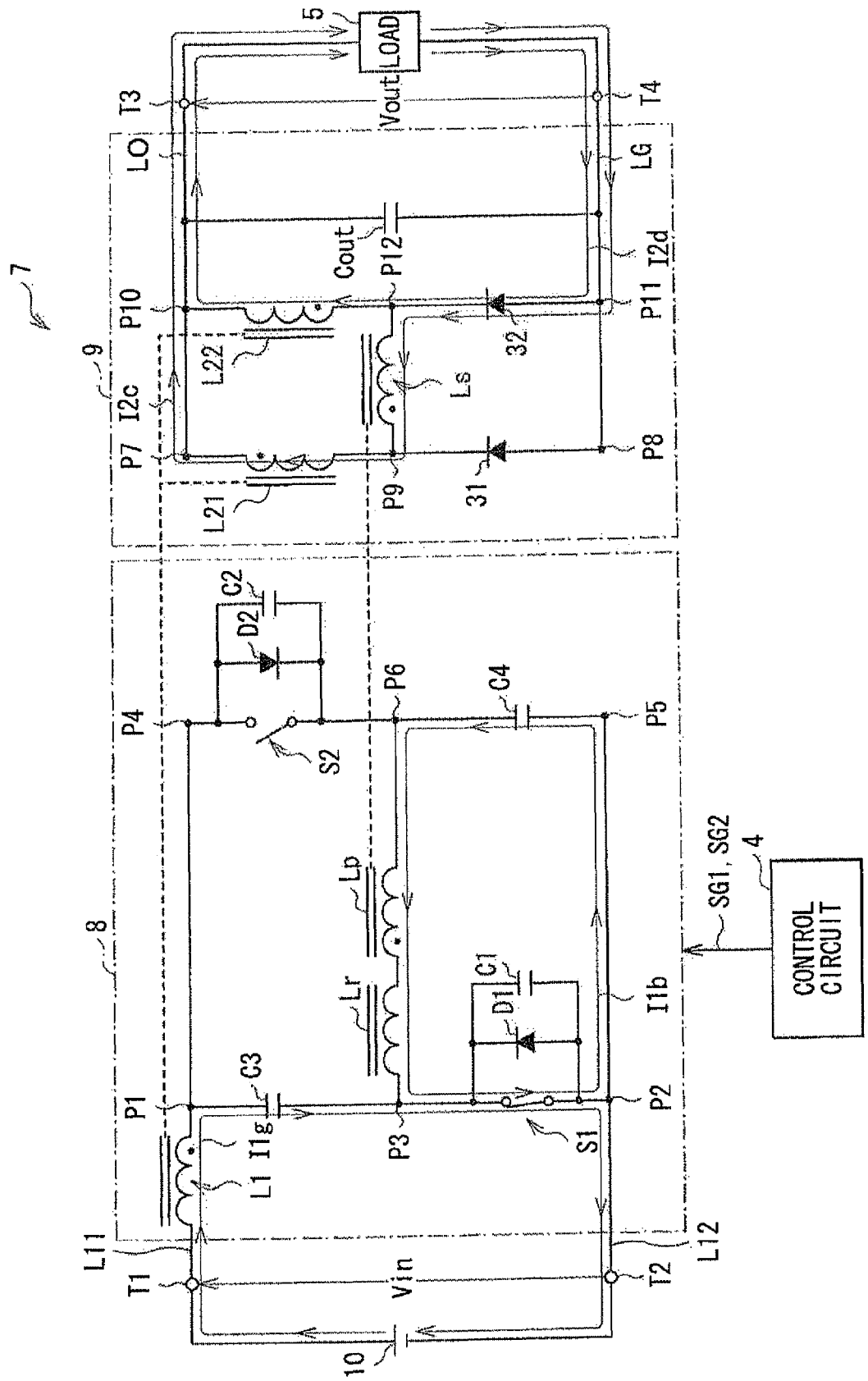
FIG. 32 is a circuit diagram of the switching power supply of FIG. 25, illustrating the operation thereof after the operation of FIG. 31.

Next, at the timing t35 of FIG. 32, the switching element S1 is turned ON (A in FIG. 25). In response thereto, the mesh current I1b and a mesh current I1g as shown in the drawing start flowing in the switching circuit 8. Herein, the flow of the mesh current I1g starts from the DC power supply 10 to go via the input terminal T1, the inductor L1, the capacitor C3, the switching element S1, and the input terminal T2. On the other hand, on the secondary side of the transformer, i.e., in the rectifying/smoothing circuit 9, the mesh currents I2mayd I2d continue to flow so that the load 5 is accordingly driven thereby.

Figure 33:
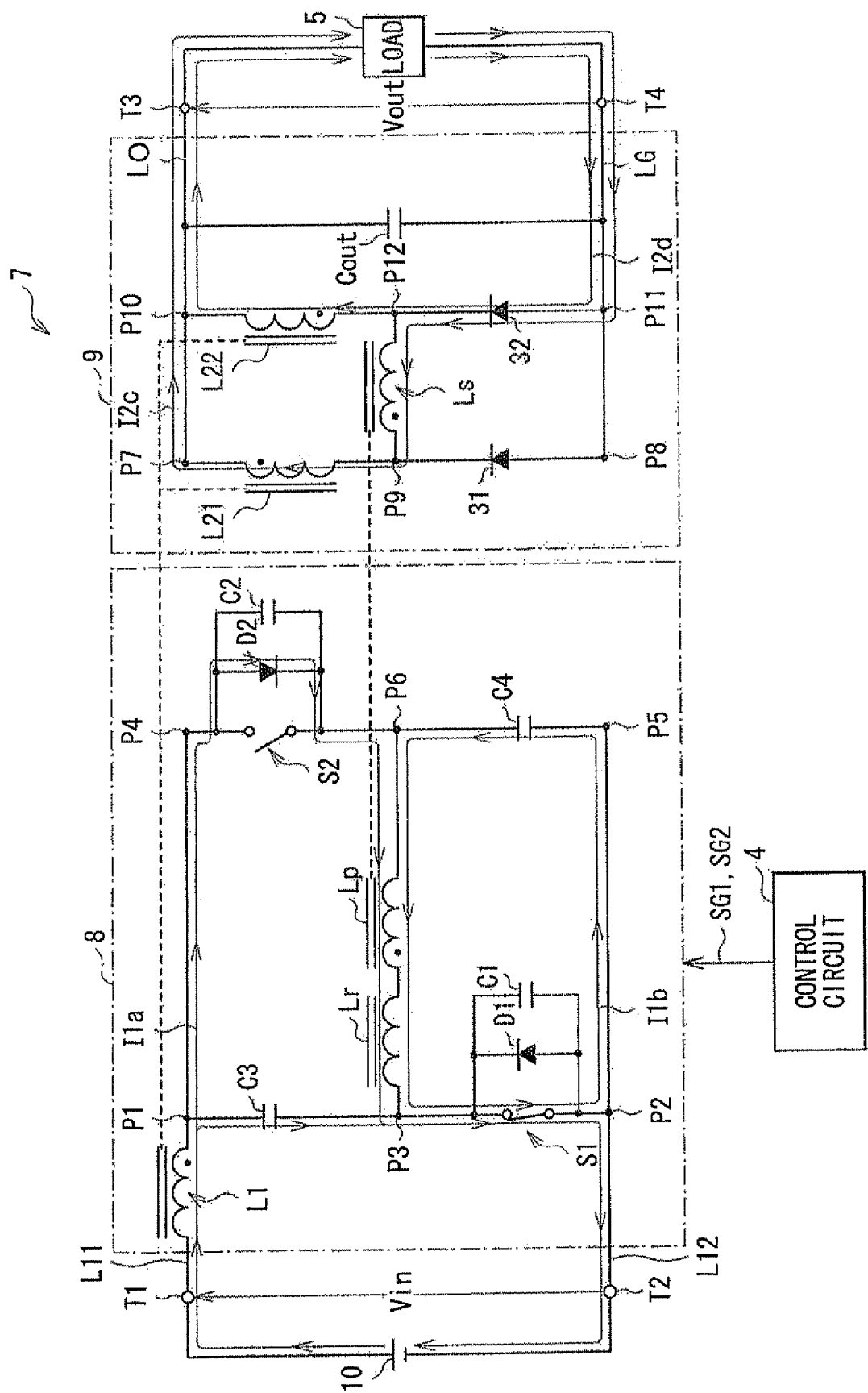
FIG. 33 is a circuit diagram of the switching power supply of FIG. 25, illustrating the operation thereof after the operation of FIG. 32.

Next, in a period from the timing t35 to t36 of FIG. 33, in the switching circuit 8, the mesh currents I1a and I1b described above flow as shown in the drawing. On the other hand, on the secondary side of the transformer, i.e., in the rectifying/smoothing circuit 9, the mesh currents I2mayd I2d continue to flow so that the load 5 is accordingly driven thereby.

Figure 34:
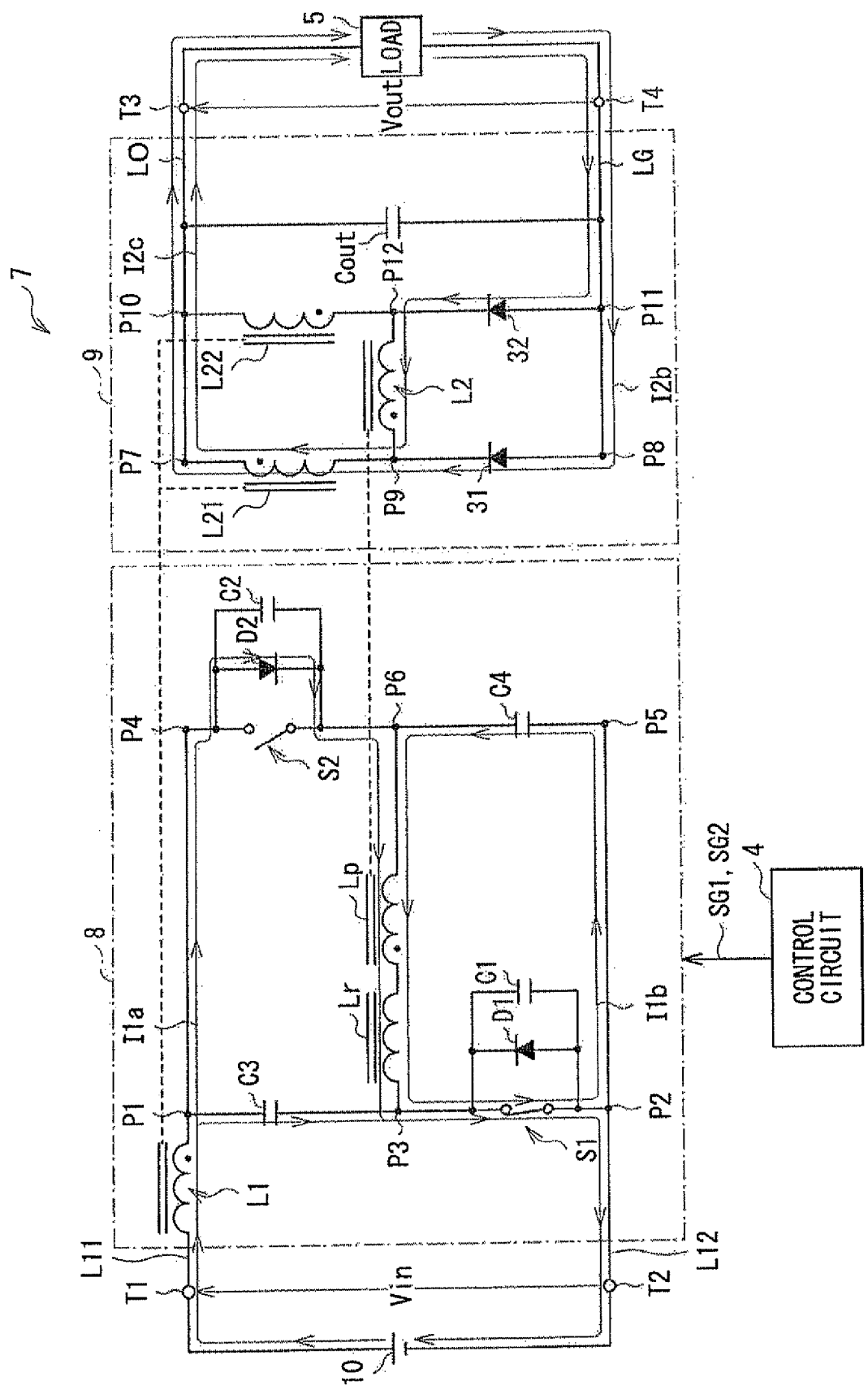
FIG. 34 is a circuit diagram of the switching power supply of FIG. 25, illustrating the operation thereof after the operation of FIG. 33.

Next, at the timing t36 in FIG. 34, the mesh currents I2b and I2c described above flow on the secondary side of the transformer, i.e., in the rectifying/smoothing circuit 9, as shown in the drawing so that the load 5 is accordingly driven thereby. Thereafter, at the timing t37 (t30), as shown in FIG. 26, the mesh currents I2a and I2b described above start flowing on the secondary side of the transformer, i.e., in the rectifying/smoothing circuit 9. This is the end of the operation of the switching power supply 7 as a DC-DC converter for a cycle when the input voltage Vin applied between the input terminals T1 and T2 is positive and DC, and the state thereof becomes equivalent to that at the timing t30 in FIG. 25.

Figure 35:
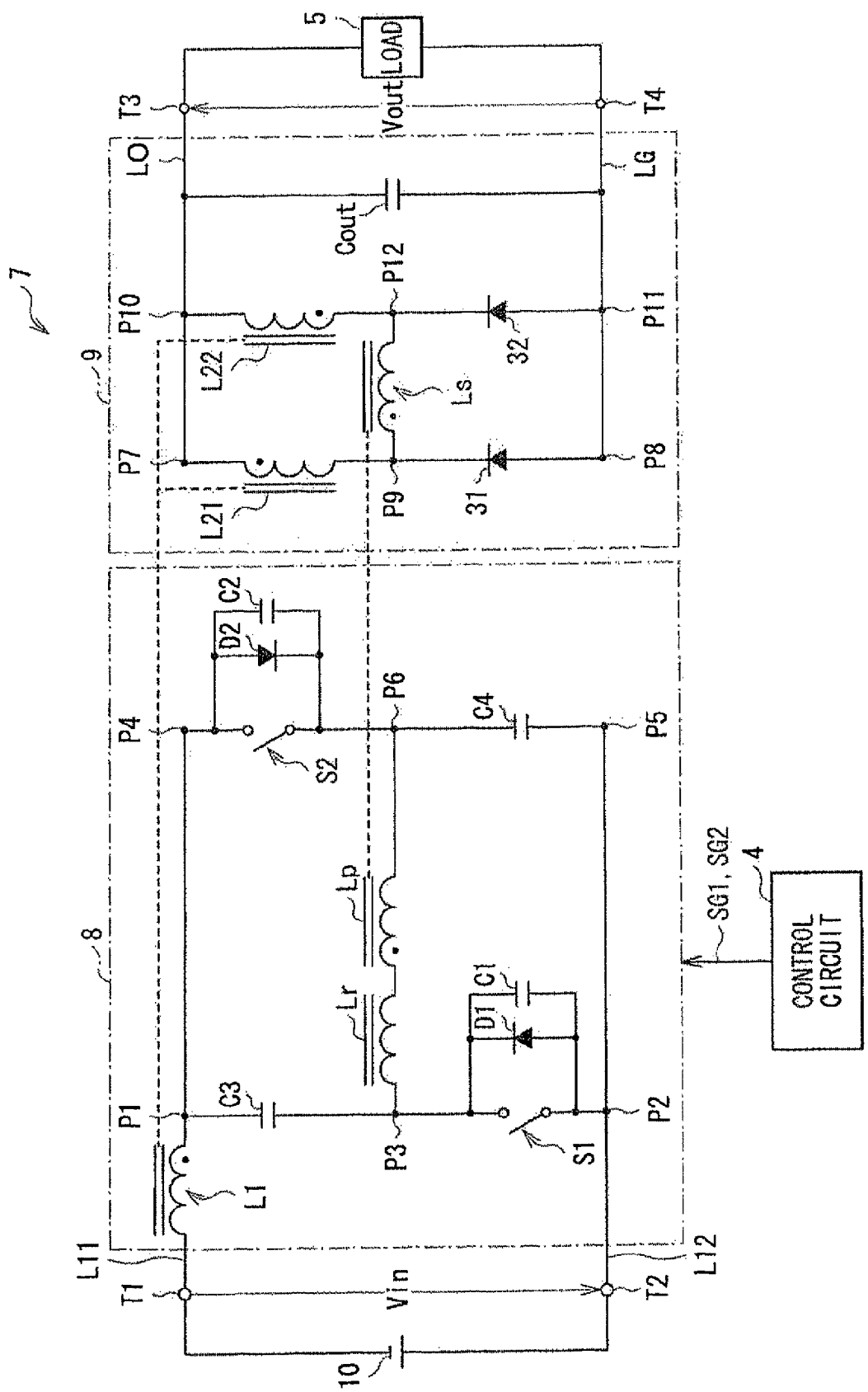
FIG. 35 is a circuit diagram of the switching power supply of FIG. 24, illustrating another exemplary operation thereof, i.e., operation as a DC-DC converter during a negative input.

On the other hand, as shown in FIG. 35, when the input voltage Vin coming from the DC power supply 10 for application between the input terminals T1 and T2 is negative (higher in value on the side of the input terminal T2) and DC, the switching power supply 7 operates as a DC-DC converter as below.

That is, in the switching power supply 7 in this embodiment, the configuration of the first bridge circuit in the switching circuit 8 is point symmetric as shown in FIG. 13A. To be specific, assuming that the first bridge circuit is configured by three element blocks of Aa, Bb, and Cc, the element blocks Aa and Bb are both point symmetric with respect to the element block Cc. The element block Cc includes the components disposed between the connection points P3 and P6, i.e., the inductor Lr and the primary winding Lp in this example. The block Aa includes the component(s) on the arms in the first bridge circuit, i.e., the capacitor C3 or C4 in this example, and the element block Bb includes the switching element S1, the diode D1, and the capacitor C1, or the switching element S2, the diode D2, and the capacitor C2 in this example.

On the other hand, as shown in FIG. 13B, the configuration of the third bridge circuit in the rectifying/smoothing circuit 9 is line symmetric. To be specific, assuming that the third bridge circuit is configured by three element blocks of Dd, Ee, and Ff, the element blocks Dd and Ee are both line symmetric with respect to a virtual line S-S' passing over the element block Ff and two points. The element block Ff includes the component(s) disposed between the connection points P9 and P12, i.e., the secondary winding Ls in this example. The element block Dd includes the components on the arms in the third bridge circuit, i.e., the inductor L21 or L22 in this example, and the element block Ee includes the rectifying diode 31 or 32 in this example. The two points over which the virtual line S-S' passes include a point between the connection points P7 and P10 on the output line LO, and a point between the connection points P8 and P11 on the ground line LG. Note that, in FIG. 13B, on the arms in the third bridge circuit, the element block Dd is located on the side of the output line LO, and the element block Ee is located on the side of the ground line LG. Alternatively, as exemplarily shown in FIG. 13C, such a positional relationship between the element blocks Dd and Ee may be reversed. That is, on the arms in the third bridge circuit, the element block Ee may be disposed on the side of the output line LO, and the element block Dd may be disposed on the side of the ground line LG.

With the first and third bridge circuits configured symmetry as such, also when the input voltage Vin coming from the DC power supply 10 for application between the input terminals T1 and T2 is negative and DC, the switching power supply 7 operates similarly to the DC-DC converter described above by referring to FIGS. 25A to 34, i.e., operation when the input voltage Vin coming from the DC power supply 10 for application between the input terminals T1 and T2 is positive and DC.

[2-2. Operation as AC-DC Converter]

Figure 36:
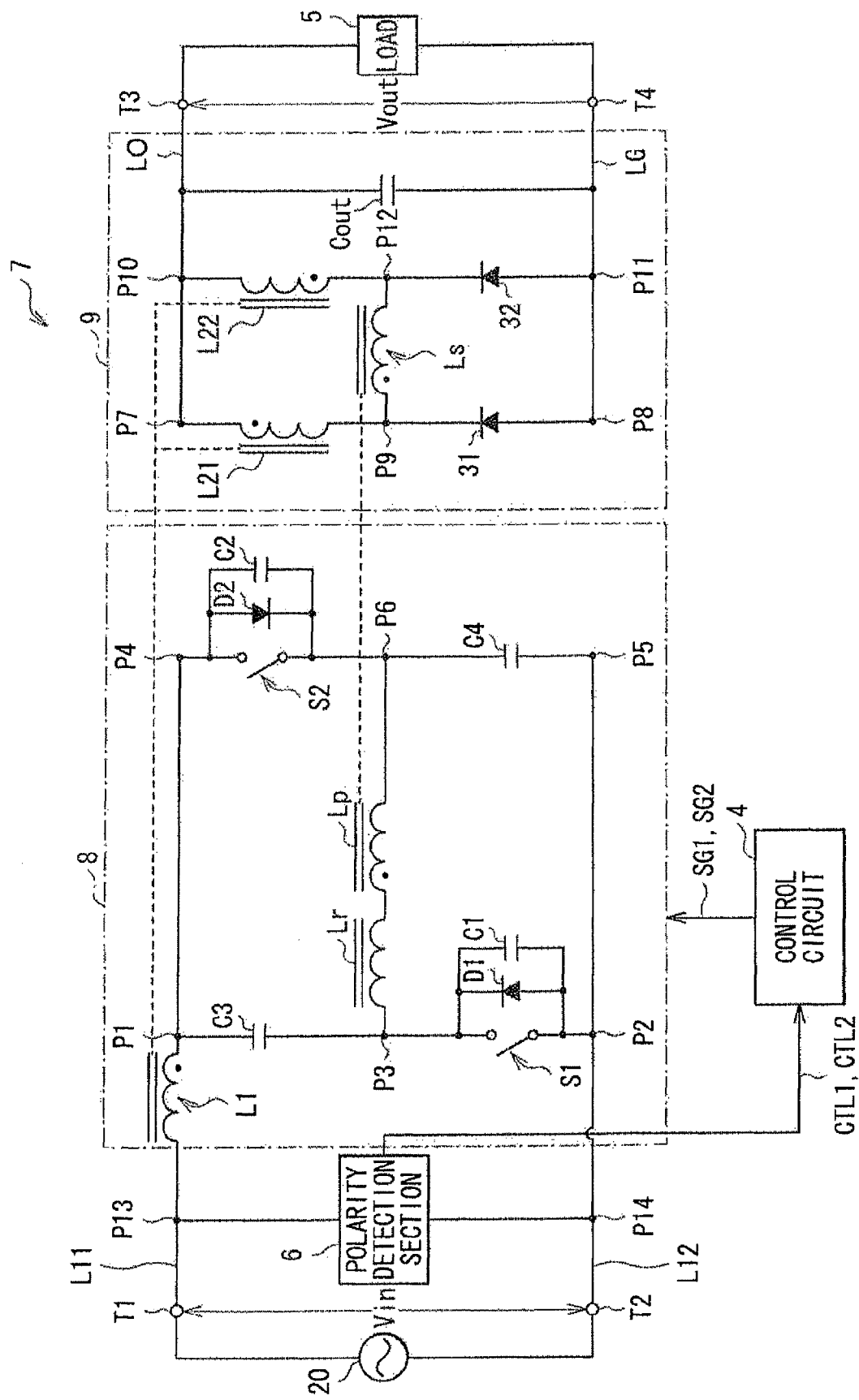
FIG. 36 is a circuit diagram of the switching power supply of FIG. 24, illustrating still another exemplary operation thereof, i.e., operation as an AC-DC converter.

As will be known from the above, if the input voltage Vin coming from the AC power supply 20 for application between the input terminals T1 and T2 is AC as shown in FIG. 36, the switching power supply 7 operates as an AC-DC converter as below. That is, by alternately repeating the operation as a DC-DC converter when the input voltage Vin for application between the input terminals T1 and T2 is positive and DC, and the operation as a DC-DC converter when the input voltage Vin for application between the input terminals T1 and T2 is negative and DC, the switching power supply 7 becomes feasible to operate as an AC-DC converter when the input voltage Vin for application between the input terminals T1 and T2 is AC. As such, the switching power supply 7 in this second embodiment is feasible to operate both as a DC-DC converter and an AC-DC converter with a single circuit.

In such a case, the switching between the above-described operation as a DC-DC converter corresponding to the positive side and the above-described operation as a DC-DC converter corresponding to the negative side may be made in the control circuit 4 in response to the control signals CTL1 and CTL2 similarly to the first embodiment, for example. The control signals CTL1 and CTL2 are those related to the detection results derived by the polarity detection section 6 shown in FIG. 14 and FIGS. 15A and 15B. To be specific, the switching signals SG1 and SG2 may be changed in content in the control circuit 4 depending on whether the operation is on the positive or negative side, thereby changing the operation between the switching elements S1 and S2.

[2-3. Comparison Between Second Embodiment and Comparison Example in Terms of Advantages and Effects]

Figure 37:
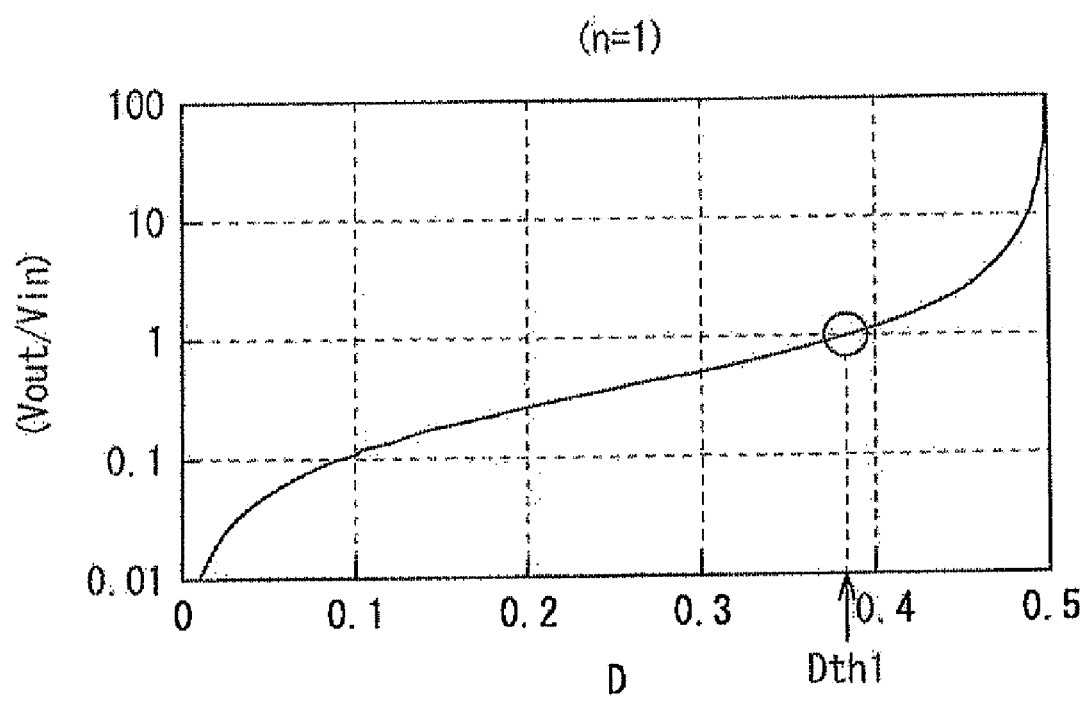
FIG. 37 is a characteristic diagram showing an exemplary relationship between an on-duty ratio and an input/output voltage ratio in the switching power supply of FIG. 24.

By referring also to FIGS. 16 and 37 in addition to FIGS. 24 to 36, the switching power supply 7 in this second embodiment is compared with the previous switching power supply 100 in the comparison example described above (FIG. 16) in terms of advantages, and a detailed description is provided thereabout.

Advantages of Comparison Example

First of all, with the switching power supply 100 in the comparison example of FIG. 16, as described above, the rectifying circuit 101 being a rectifying bridge circuit is provided to make the switching power supply 100 to operate as an AC-DC converter. Moreover, on the primary side of the transformer, three (three-phase) circuits (converters) are provided. The resulting circuit configuration is thus complicated in the switching power supply 100 in its entirety, and the device efficiency is also low.

Advantages of Second Embodiment

On the other hand, the switching power supply 7 in this embodiment is configured to include the switching circuit 8 of the configuration of FIG. 24, the transformer including the primary winding Lp and the secondary winding Ls, and the rectifying/smoothing circuit 9.

Such a configuration favorably eliminates the need for such a rectifying bridge circuit unlike in the comparison example described above, and reduces the number of the circuits needed on the primary side of the transformer, i.e., reduced to one (one-phase) circuit (the switching circuit 8). Accordingly, compared with the comparison example described above, the resulting switching power supply 7 of this embodiment is feasible to operate as an AC-DC converter with a simple configuration, i.e., with a reduced number of components.

Moreover, with the inductors L21 and L22 provided in the rectifying/smoothing circuit 9, compared with a configuration not including such inductors L21 and L22 but any other types of elements, i.e., a configuration including any other types of elements for use as "the first element" and "the second element" in the embodiments of the invention, the input current, i.e., current IL1 flowing through the inductor L1, is reduced in ripple.

Note that, in this second embodiment, the switching circuit 8 is preferably capable of the voltage boosting of the input voltage Vin through control over the duty ratio between the switching elements S1 and S2.

To be specific, in the steady state, the inductances of the inductors L1, L21, and L22 may be expressed by the following equations 10 to 12, where the number of winding turns of the primary winding Lp in the transformer is Np, the number of winding turns of the secondary winding Ls is Ns, the ratio between the primary winding Lp and the secondary winding Ls in terms of winding turns is n (=Np/Ns), the ON-time and OFF-time of the switching element S1 are respectively ton and toff, the switching cycle is T (=ton+toff), and the on-duty ratio of the switching element S1 is D (=ton/T). Moreover, in the equations, Vin denotes the input voltage, the Vout denotes the output voltage, VC3 denotes the voltage in the capacitor C3 between both ends, and the VC4 denotes the voltage in the capacitor C4 between both ends. In this example, these equations are derived with no consideration of the magnetic coupling between the inductors L1, L21, and L22.

Equation 4

$$\begin{cases} \dfrac{V_{in} + VC3}{L1} t_{on} = \dfrac{VC4 - V_{in}}{L1} t_{off} & (10) \\ \dfrac{V_{out}}{L21} t_{on} = \dfrac{\frac{1}{n} \cdot VC3 - V_{out}}{L21} t_{off} & (11) \\ \dfrac{\frac{1}{n} \cdot VC4 - V_{out}}{L22} t_{on} = \dfrac{V_{out}}{L22} t_{off} & (12) \end{cases}$$

Through rearrangement of these equations 10 to 12, the following equations 13 to 15 are to be derived with which the input/output voltage ratio (Vout/Vin) and the voltages VC3 and VC4 are defined. With the equation 13, if the on-duty ratio D of the switching element S1 is so set as to satisfy (Vout/Vin)>1, it is known that the input voltage Vin is to be boosted as described above. That is, satisfying D×(1−D)>n×(1−2D) will do in this example. Also assuming that the ratio of winding turns satisfies n1=1, it is known that the on-duty ratio D of the switching element S1 becomes larger than 0.5, i.e., D<0.5, with the equation 13.

Equation 5

$$\begin{cases} \dfrac{V_{out}}{V_{in}} = \dfrac{1}{n} \cdot \dfrac{D(1-D)}{1-2D} & (13) \\ VC3 = \dfrac{D}{1-2D} V_{in} & (14) \\ VC4 = \dfrac{1-D}{1-2D} V_{in} & (15) \end{cases}$$

As such, as shown in FIG. 37, for example, by setting the on-duty ratio D of the switching element S1 to be larger than a duty threshold value Dth1, i.e., a value corresponding to the on-duty ratio D when (Vout/Vin)=1 is satisfied, the input voltage Vin is to be actually boosted.

Because the switching power supply 1 is capable of such voltage boosting, compared with the previous DC-DC converter, the range for the input voltage may be wider while the switching power supply 7 is operating as a DC-DC converter.

As described above, in the second embodiment, the switching power supply 7 is provided with the switching circuit 8 of the configuration of FIG. 24, the transformer including the primary winding Lp and the secondary winding Ls, and the rectifying/smoothing circuit 9. This configuration favorably allows the switching power supply 7 to operate both as a DC-DC converter and an AC-DC converter with a single circuit, thereby being able to increase the operation flexibility therein.

Further, because the rectifying/smoothing circuit 9 is provided therein with the inductors L21 and L22, compared with the configuration not including such inductors L21 and L22 but any other types of elements, i.e., a configuration including any other types of elements for use as "the first element" and the "second element" in the embodiments of the invention, the input current, i.e., current IL1 flowing through the inductor L1, may be reduced in ripple. Accordingly, when the switching power supply 7 operates as a DC-DC converter, for example, this accordingly leads to the reduction of noise in the input current, and to the possible improvement of a power factor when the first switching power supply 7 operates as an AC-DC converter, for example.

Still further, as described above, with the switching power supply 7 in this second embodiment, the operation flexibility therein may be favorably increased, and the higher operation flexibility as such accordingly allows the design sharing between these two converters, i.e., the DC-DC converter and the AC-DC converter, thereby implementing the reduction of time for device development and the design cost. Considering the operation as an AC-DC converter, unlike in the previous AC-DC converter, there is no need for the bridge circuit or others in the rectifying diode so that the resulting switching power supply 7 may operate as an AC-DC converter with a simple configuration, i.e., with a reduced number of components, and may have the better efficiency in its entirety.

What is more, when the switching circuit 8 is capable of the voltage boosting of the input voltage Vin through control over the duty ratio between the switching elements S1 and S2, the change of voltage, i.e., voltage bucking or boosting, may be smoothly made. In consideration thereof, for the switching power supply 7 to operate as an AC-DC converter, for example, due to the fact that the switching circuit is capable of the voltage boosting, i.e., PFC operation, the voltage conversion may be performed with a higher flexibility, and the power factor may be favorably improved.

Furthermore, the primary and secondary windings in the transformer are each reduced in number to one, i.e., primary winding Lp and secondary winding Ls. Accordingly, compared with the configuration including two of each of the primary and secondary windings, the transformer may be smaller in size with a simple configuration.

Described next are modified examples (modified examples 5 to 7) of the second embodiment described above. In the below, any component same as that in the second embodiment is provided with the same reference numeral, and is not described again if appropriate.

Modified Example 5

Figure 38:
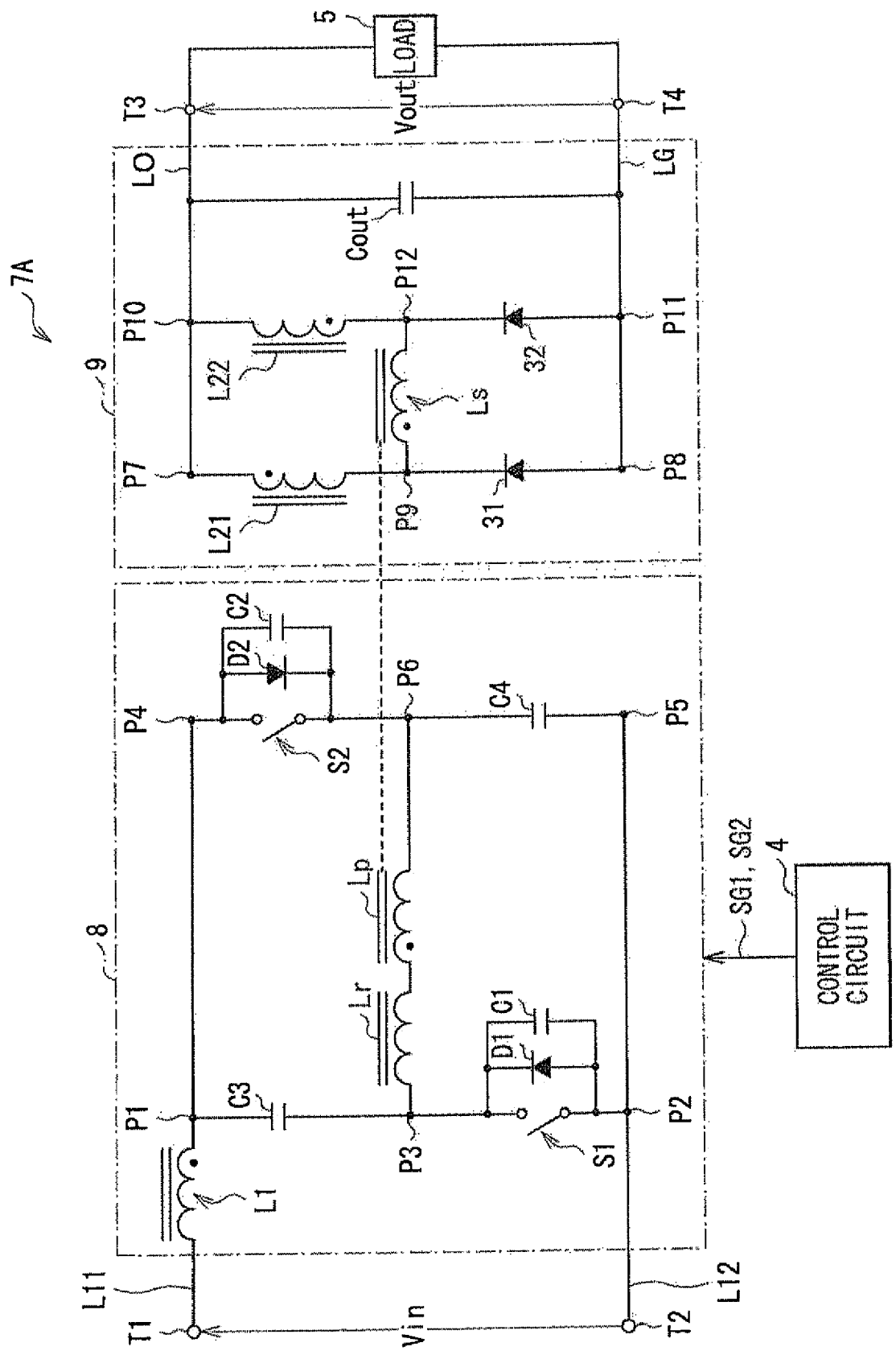
FIG. 38 is a circuit diagram of a switching power supply in a modified example (modified example 5) of the second embodiment, showing the configuration thereof.

FIG. 38 shows the circuit configuration of a switching power supply, i.e., switching power supply 7A, in a modified example 5. The switching power supply 7A in this modified example 5 is configured similarly to the switching power supply 7 in the second embodiment except that the inductors L1, L21 and L22 are not magnetically coupled together. That is, a coupling coefficient k for these inductors L1, L21, and L22 may be so set arbitrarily as to take any value between 0 to 1, i.e., $0 \leq k \leq 1$.

Also with the switching power supply 7A of such a configuration, the same effects as the switching power supply 7 of the second embodiment above may be achieved with the advantages similar thereto. That is, although not shown, the switching power supply 7A operates similarly as described in the second embodiment above no matter for which type of converter, i.e., a DC-DC converter or an AC-DC converter.

Modified Example 6

Figure 39:
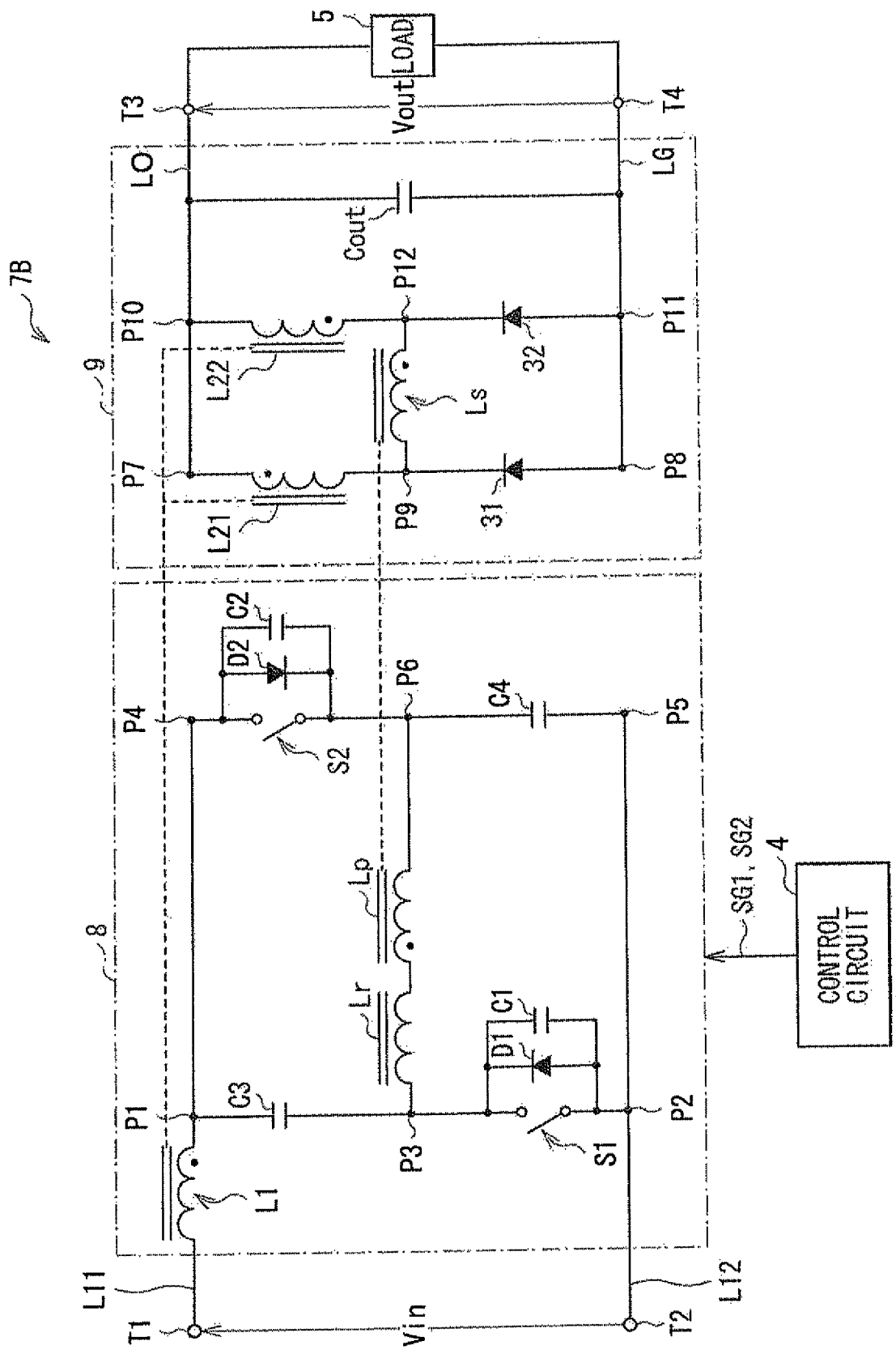
FIG. 39 is a circuit diagram of a switching power supply in another modified example (modified embodiment 6) of the second embodiment, showing the configuration thereof.

FIG. 39 shows the circuit configuration of a switching power supply, i.e., switching power supply 7B, in a modified example 6. The switching power supply 7B in this modified example 6 is configured similarly to the switching power supply 7 in the second embodiment except that the winding turns of the secondary winding Ls are opposite in direction.

Also with the switching power supply 7B of such a configuration, the same effects as the switching power supply 7 of the second embodiment above may be achieved with the advantages similar thereto.

Figure 40:
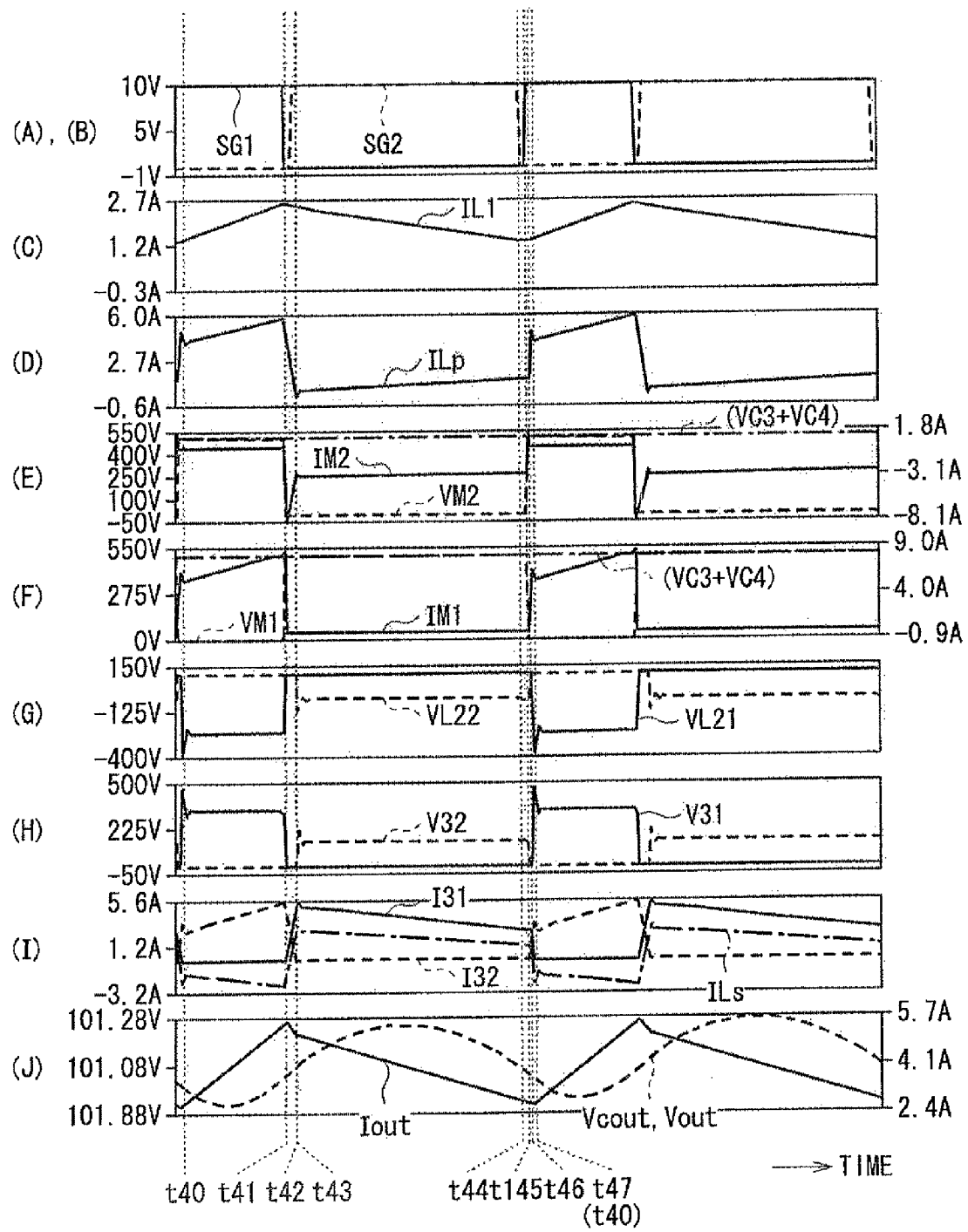
FIGS. 40A to 40J are timing diagrams of the switching power supply of FIG. 39, showing an exemplary operation thereof, i.e., operation as a DC-DC converter during a positive input.

As an example, as exemplarily shown in A to J in FIG. 40, when operating as a DC-DC converter, i.e., when the input voltage Vin applied between the input terminals T1 and T2 is positive and DC: timings t40 to t47, the switching power supply 7B operates similarly to A to J in FIG. 25 (timings t30 to t37) described in the second embodiment above. Although not shown, when operating as an AC-DC converter, the switching power supply 7B operates similarly as described in the second embodiment above.

Note that, in this modified example 6, the winding turns of the secondary winding Ls are opposite in direction. Instead of changing the direction of the winding turns of the secondary winding Ls as such, the winding turns of the inductors L21 and L22 may be both changed to be opposite, in direction, to the switching power supply 7.

Modified Example 7

Figure 41:
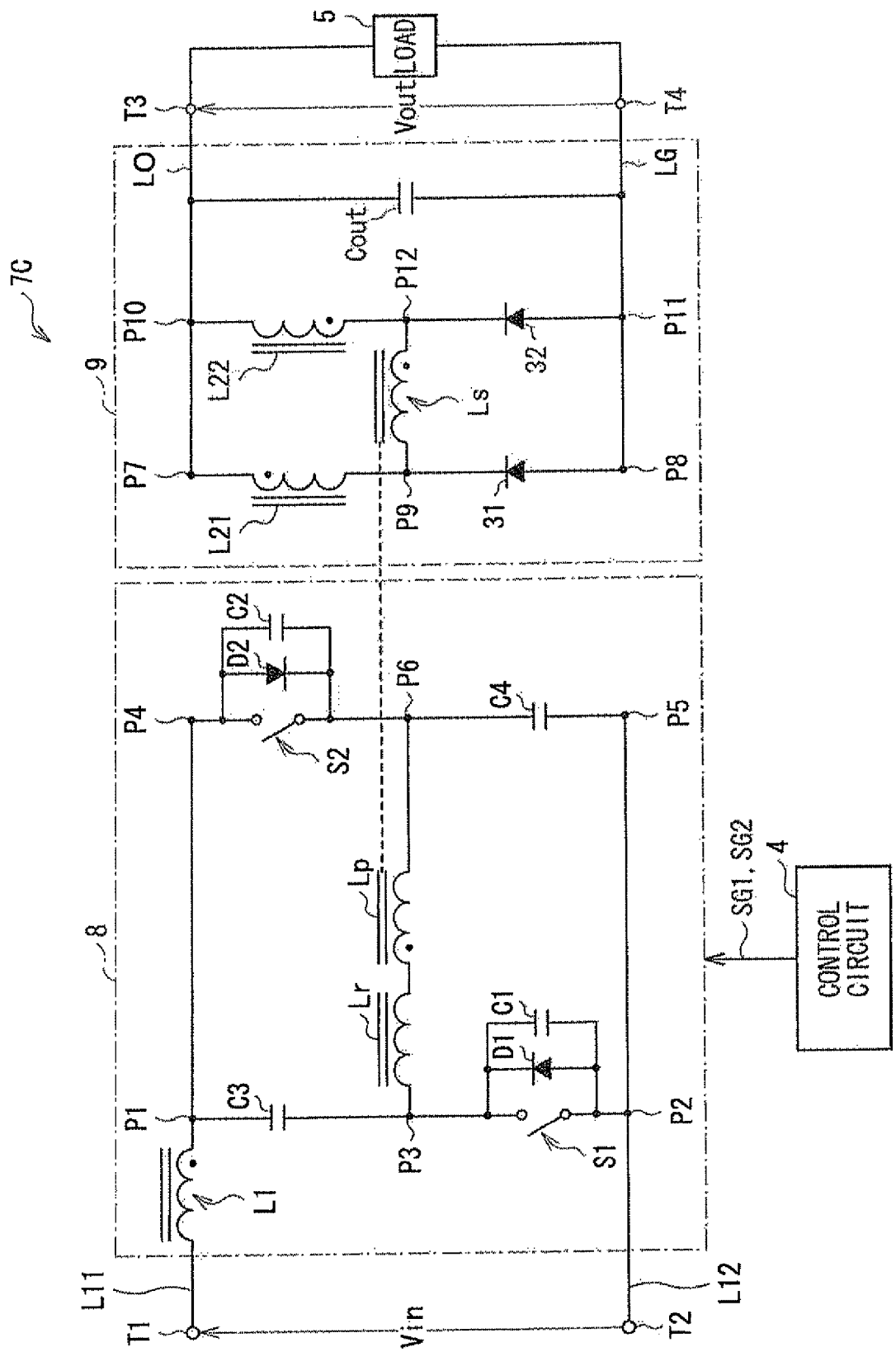
FIG. 41 is a circuit diagram of a switching power supply in still another modified example (modified embodiment 7) of the second embodiment, showing the configuration thereof.

FIG. 41 shows the circuit configuration of a switching power supply, i.e., switching power supply 7C, in a modified example 7. The switching power supply 7C in this modified example 7 is a combination of the circuit configurations of the modified examples 5 and 6 described above. That is, the switching power supply 7C is configured similarly to the switching power supply 7 in the second embodiment except that the inductors L1, L21, and L22 are not magnetically coupled together, and the winding turns of the secondary winding Ls are opposite in direction.

Also with the switching power supply 7C of such a configuration, the same effects as the switching power supply 7 of the second embodiment above may be achieved with the advantages similar thereto. That is, although not shown, the switching power supply 7C operates similarly as described in the second embodiment above no matter for which type of converter, i.e., a DC-DC converter or an AC-DC converter.

Third Embodiment

Described next is a third embodiment of the invention. In the below, any component same as that in the second embodiment described above is provided with the same reference numeral, and is not described again if appropriate.

[Entire Configuration of Switching Power Supply 7D]

Figure 42:
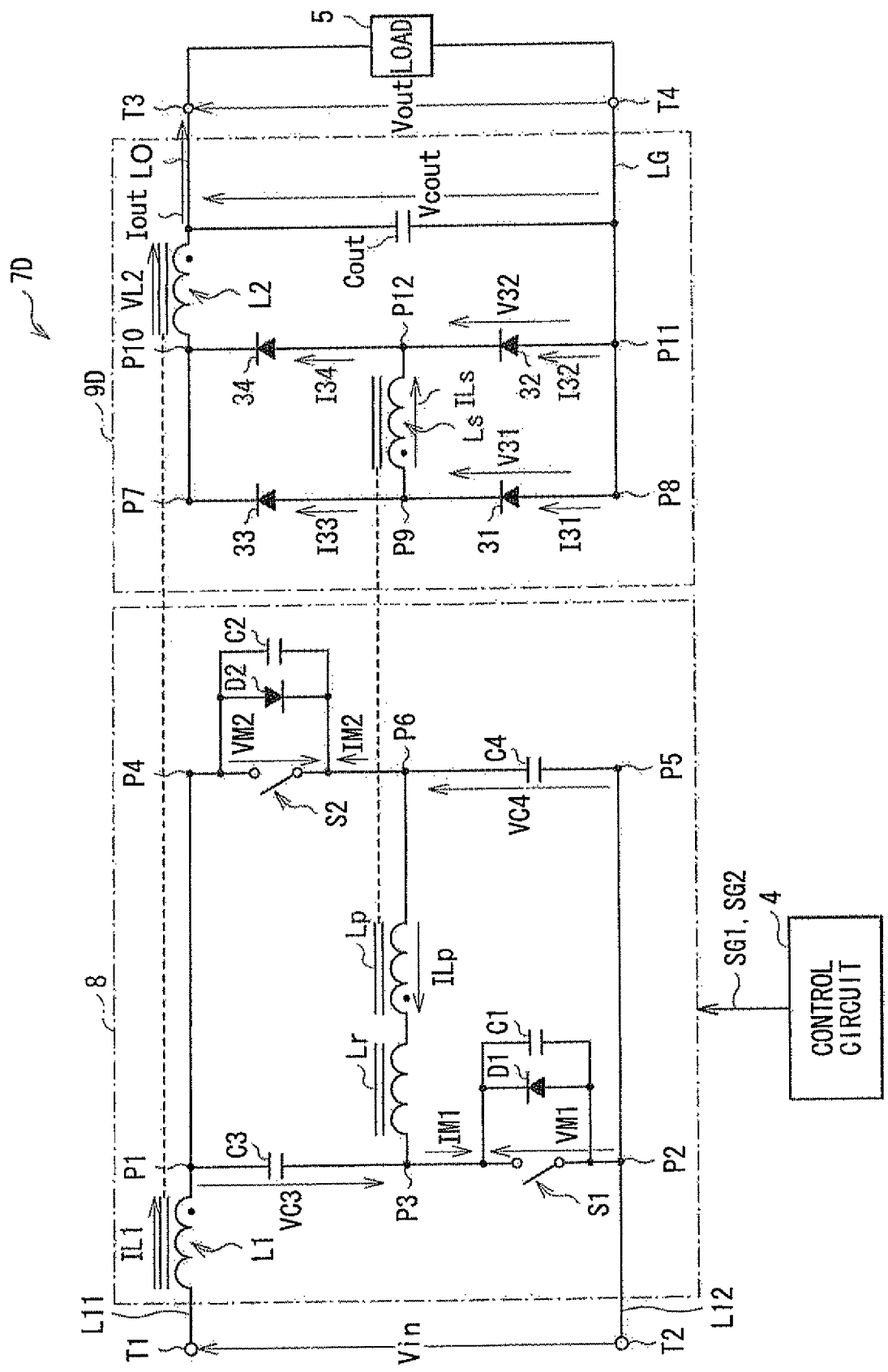
FIG. 42 is a circuit diagram of a switching power supply of a third embodiment, showing the configuration thereof.

FIG. 42 shows the circuit configuration of a switching power supply, i.e., switching power supply 7D, in the third embodiment. The switching power supply 7D in this embodiment is configured similarly to the switching power supply 7 in the second embodiment except that a rectifying/smoothing circuit 9D (that will be described later) is provided as an alternative to the rectifying/smoothing circuit 9.

Compared with the rectifying/smoothing circuit 9 in the second embodiment, the rectifying/smoothing circuit 9D includes two rectifying diodes 33 and 34 as alternatives to the two inductors L21 and L22, and additionally includes an inductor L2. In this configuration, the inductor L2 in the rectifying/smoothing circuit 9D is magnetically coupled with the inductor L1 in the switching circuit 8. For such magnetic coupling between the inductors L2 and L1, the leakage inductance (not shown) exists but as an alternative to such leakage inductance, any other inductors may be individually provided.

The rectifying diode 33 is disposed between the connection points P7 and P9, and the rectifying diode 34 is disposed between the connection points P10 and P12. To be specific, the anode of the rectifying diode 33 is located on the side of the connection point P9, and the cathode thereof is located on the side of the connection point P7. The anode of the rectifying diode 34 is located on the side of the connection point P12, and the cathode thereof is located on the side of the connection point P10. Note here that these rectifying diodes 33 and 34 are respectively specific examples of the "first and second elements" in the embodiments of the invention.

The inductor L2 is inserted to be positioned between the connection point P10 and an end of the output smoothing capacitor Cout on the output line LO, and is magnetically coupled to the inductor L1 in the switching circuit 8. Note that, in this example, this inductor L2 is a specific example of the "third inductor" in the embodiments of the invention.

Figures 43A, 43B:
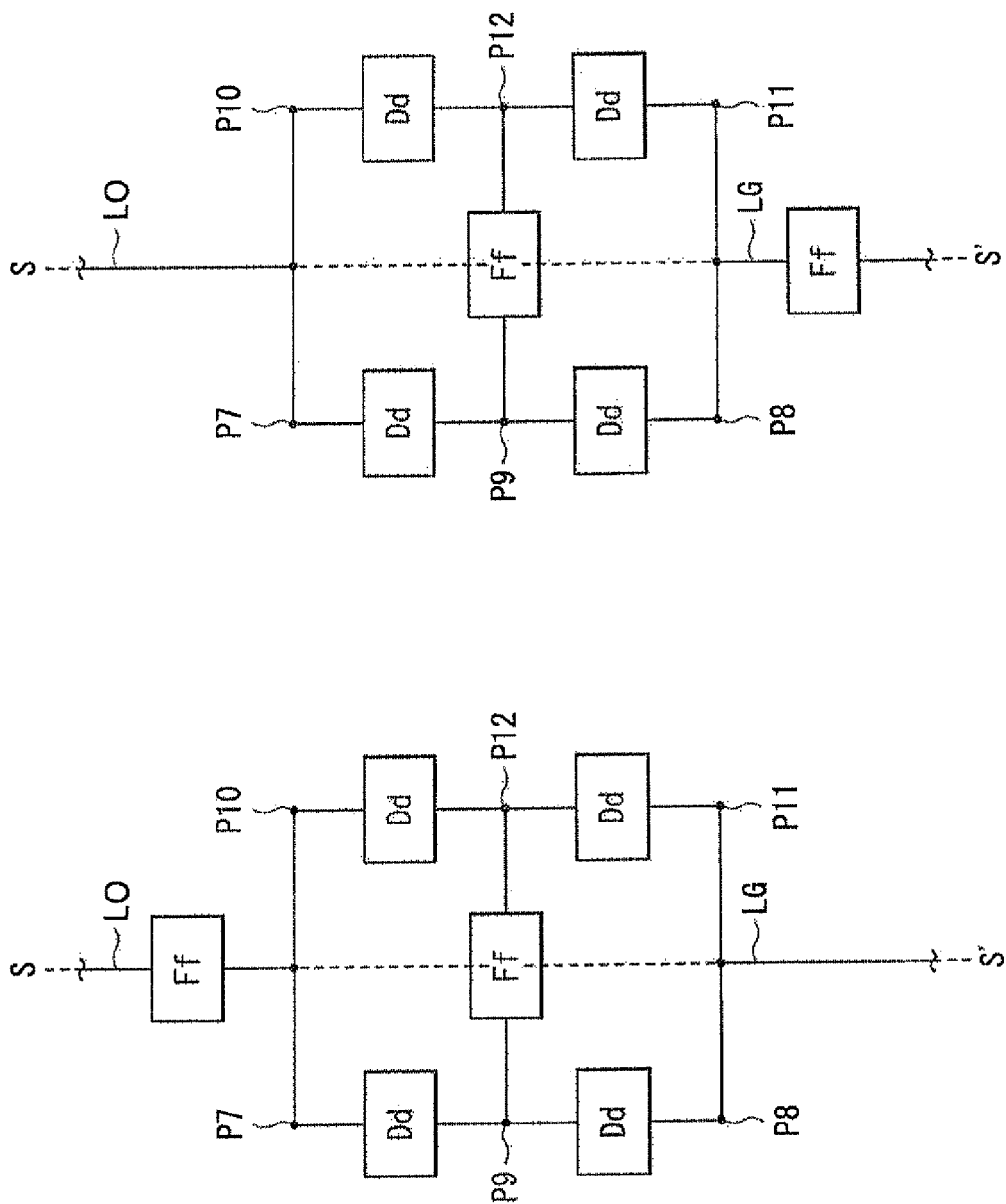
FIGS. 43A and 43B are each a circuit diagram of a second bridge circuit in the switching power supply of FIG. 42, illustrating the symmetry of the configuration thereof.

In this example, as shown in FIG. 43A, the configuration of the third bridge circuit in the rectifying/smoothing circuit 9D is line symmetric similarly to the rectifying/smoothing circuit 9. To be specific, assuming that the third bridge circuit is configured by three element blocks of Dd, Ee, and Ff, the element blocks Dd and Ee are both line symmetric with respect to a virtual line S-S' passing over the element block Ff and two points. The element block Ff includes the component(s) disposed between the connection points P9 and P12 and on the output line LO, i.e., the secondary winding Ls or the inductor L2 in this example. The element block Dd includes the component(s) on the arms in the third bridge circuit, i.e., the rectifying diode 33 or 34 in this example, and the element block Ee includes the rectifying diode 31 or 32 in this example. The two points over which the virtual line S-S' passes include a point between the connection points P7 and P10 on the output line LO, and a point between the connection points P8 and P11 on the ground line LG. Note that, in FIG. 43A, the element block Ff is disposed in the rectifying/smoothing circuit 9D between the connection points P9 and 12, and on the output line LO. Alternatively, as exemplarily shown in FIG. 43B, the element block Ff may be disposed between the connection points P9 and P12, and on the ground line LG

[Advantages and Effects of Switching Power Supply 7D]

Described next are the advantages and effects of the switching power supply 7D of the third embodiment. This switching power supply 7D operates basically similar to the switching power supply 7 in the second embodiment except that the four rectifying diodes 31 to 34 are in charge of the rectifying operation, and thus is not described again.

[1. Operation as DC-DC Converter]

First of all, referring to FIGS. 44A to 51, a detailed description is provided about an exemplary operation of the switching power supply 7D as a DC-DC converter.

Figure 44:
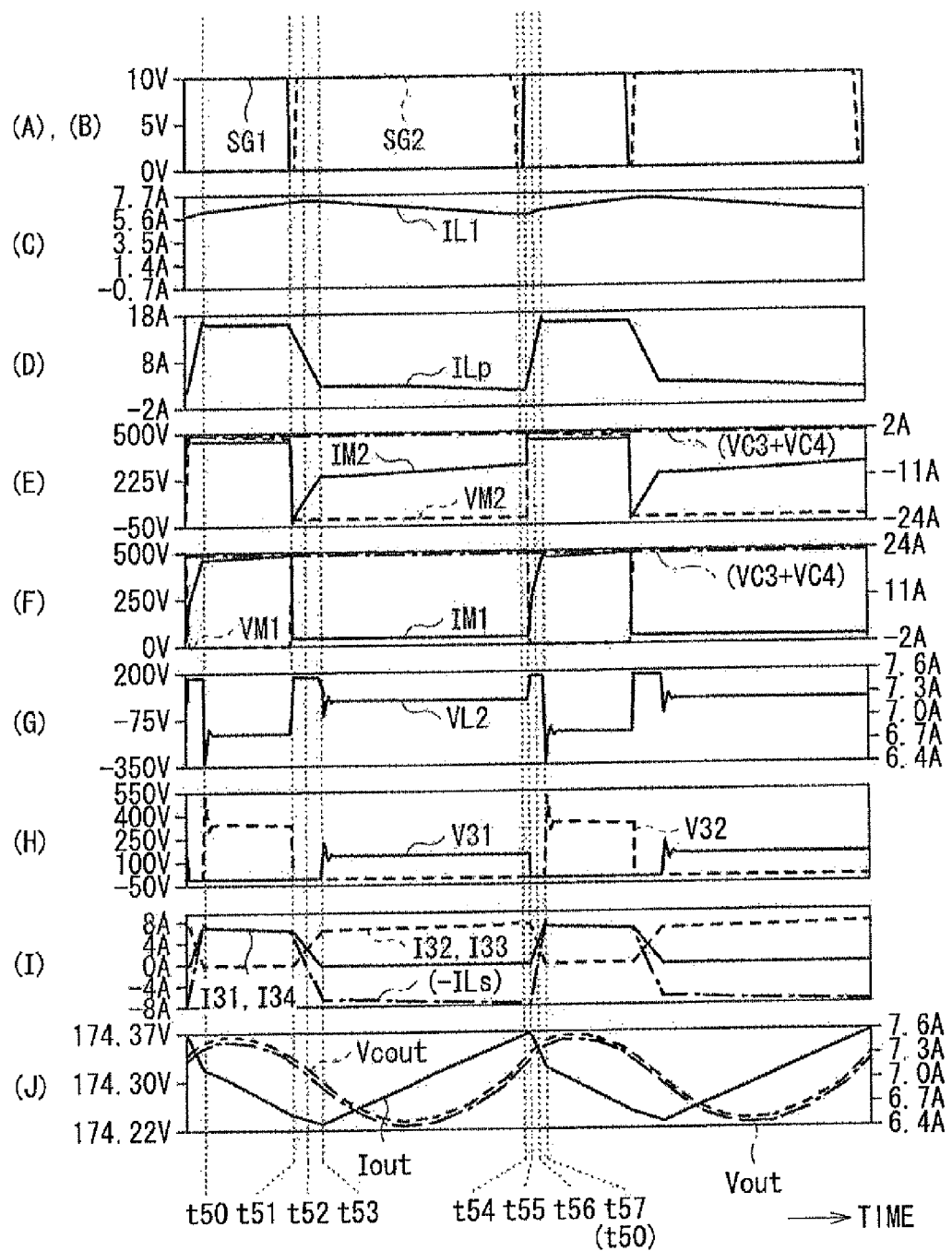
FIGS. 44A to 44J are timing diagrams of the switching power supply of FIG. 42, showing an exemplary operation thereof, i.e., operation as a DC-DC converter during a positive input.

FIG. 44 is a timing diagram of the switching power supply 7D, showing a voltage or current waveform of each component therein. As shown in FIGS. 45 to 51, the timing diagram corresponds to a case that the DC power supply 10 inputs a positive DC input voltage Vin between the input terminals T1 and T2. The positive voltage is the one higher in value on the side of the input terminal T1. In FIG. 44, A shows the voltage waveform of the drive signal SG1, and B shows that of the drive signal SG2. Also in FIG. 44, C shows the current waveform of a current IL1 flowing through the inductor L1 of FIG. 42. D shows the current waveform of a current ILp flowing through the components between the connection points P6 and P3, i.e., the primary wiring Lp, and the inductor Lr. E shows three waveforms, i.e., the current waveform of a current IM2 flowing through the element group M2 described above, the voltage waveform of a voltage VM2 in the element group M2 between both ends, and the voltage waveform as above of the voltage being the sum of the voltages VC3 and VC4 (VC3+VC4). F shows three waveforms, i.e., the current waveform of a current IM1 flowing through the element group M1 described above, the voltage waveform of a voltage VM1 in the element group M1 between both ends, and the voltage waveform as above of the voltage being the sum of the voltages VC3 and VC4 (VC3+VC4). G shows the voltage waveform of a voltage VL2 in the inductor L2 between both ends. H shows the voltage waveform of a voltage V31 in the rectifying diode 31 between both ends, and of a voltage V32 in the rectifying diode 32 between both ends. I shows the current waveform of currents I31 to I34 flowing through the rectifying diodes 31 to 34 in the forward direction, and of a current ILs flowing through the secondary winding Ls, i.e., the current waveform of (–ILs) in this example. J shows the current waveform of an output current Iout, and the voltage waveform of an output voltage Vout, and of a voltage Vcout in the output smoothing capacitor Cout between both ends. Note here that the normal directions of such voltages and currents are assumed to be those respectively indicated by arrows in FIG. 42.

FIGS. 45 to 51 each show the state of operation of the switching power supply 7D at respective timings of t50 to t57 (t50) in an operation cycle in FIG. 44.

Figure 45:
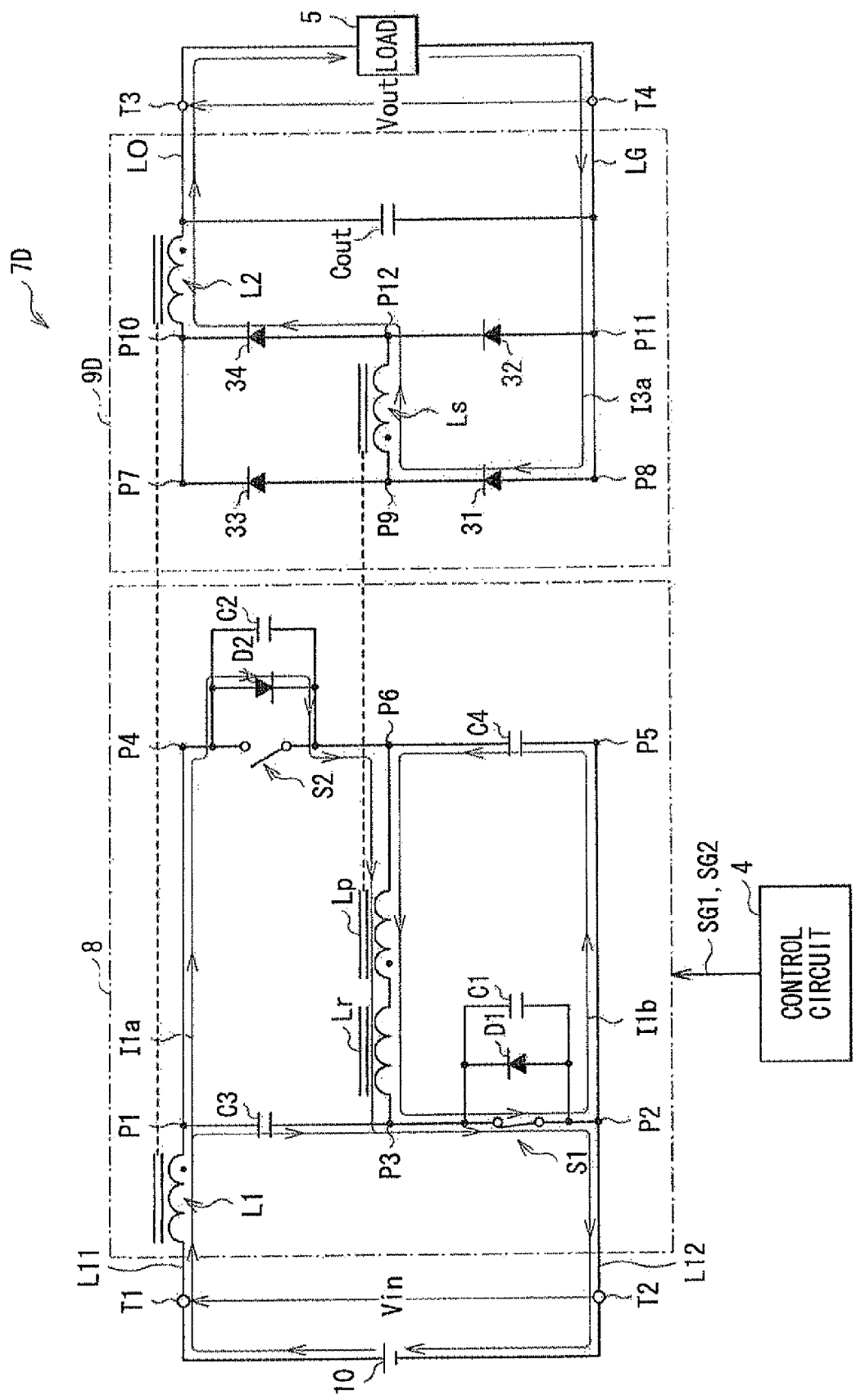
FIG. 45 is a circuit diagram of the switching power supply of FIG. 44, illustrating the operation thereof.

First of all, in a period from the timing t50 to t51 in FIG. 45, the switching element S1 is turned ON (A in FIG. 44), and the switching element S2 is turned OFF (B in FIG. 44). As a result, similarly to the second embodiment, the mesh currents I1a and I1b as shown in the drawing start flowing in the switching circuit 8. Such flows of the mesh currents I1a and I1b energize the inductor Lr, and cause transmission of power in the transformer from the primary side, i.e., primary winding Lp, to the secondary side, i.e., secondary winding Ls. With such energization and power transmission, a mesh current I3a as shown in the drawing starts flowing on the secondary side of the transformer, i.e., in the rectifying/smoothing circuit 9D. To be specific, the flow of the mesh current I3a circulates via the secondary winding Ls, the rectifying diode 34, the inductor L2, the output terminal T3, the load 5, the output terminal T4, and the rectifying diode 31 in this order, whereby the load 5 is accordingly driven.

Figure 46:
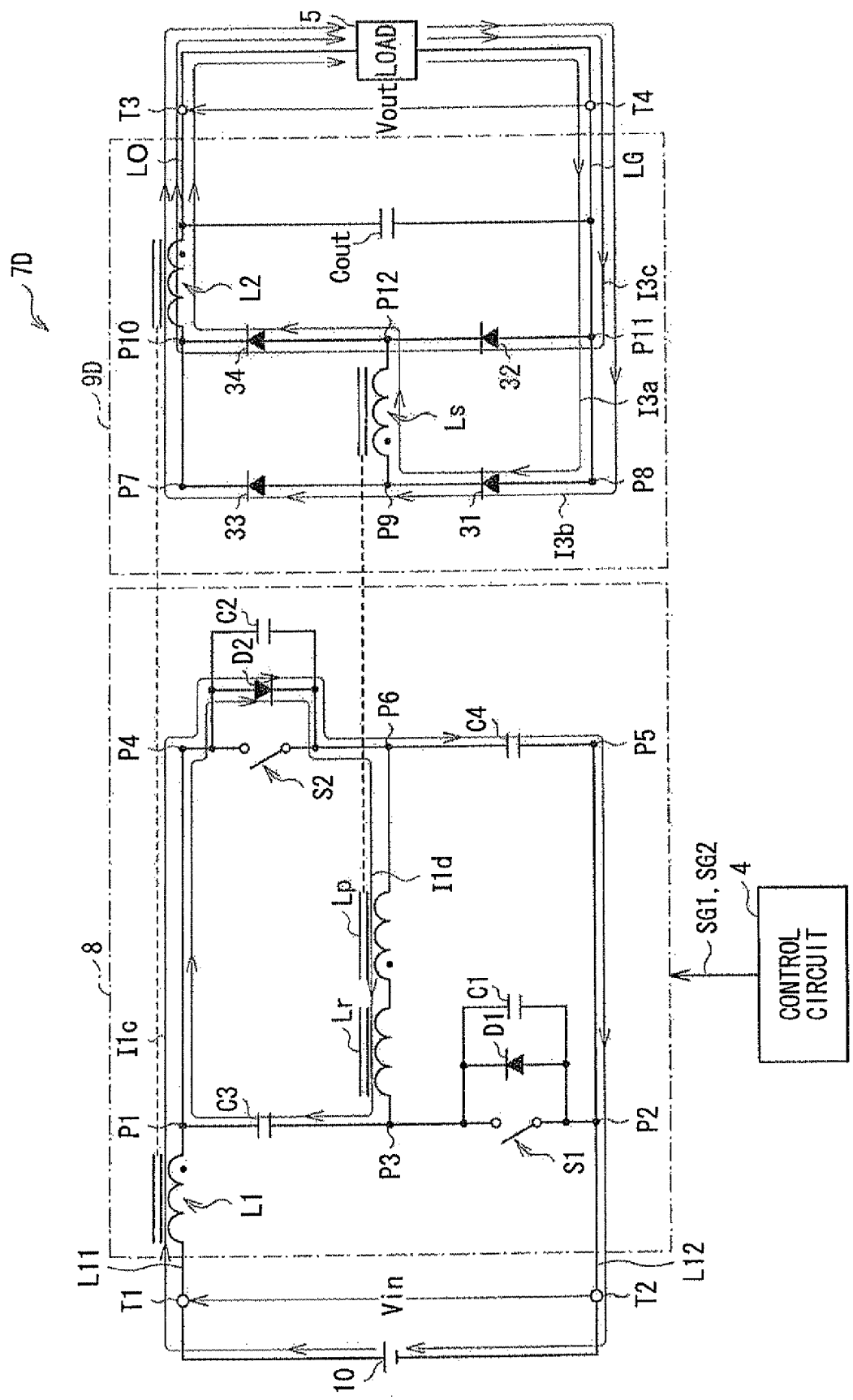
FIG. 46 is a circuit diagram of the switching power supply of FIG. 44, illustrating the operation thereof after the operation of FIG. 45.

Next, in a period from the timing t51 to t52 in FIG. 46, the switching element S1 is turned OFF at the timing t51 (A in FIG. 44). In response thereto, similarly to the second embodiment, the mesh currents I1mayd I1d as shown in the drawing start flowing in the switching circuit 8. On the other hand, on the secondary side of the transformer, i.e., in the rectifying/smoothing circuit 9D, the mesh currents I3a, I3b, and I3c as shown in the drawing start flowing. Herein, the flow of the mesh current I3b specifically circulates via the rectifying diode 33, the inductor L2, the output terminal T3, the load 5, the output terminal T4, and the rectifying diode 31 in this order. The flow of the mesh current I3c specifically circulates via the secondary winding Ls, the rectifying diode 34, the inductor L2, the output terminal T3, the load 5, the output terminal T4, and the rectifying diode 31 in this order. With the flows of such mesh currents I31, I3b and I3c, the load 5 is accordingly driven.

Figure 47:
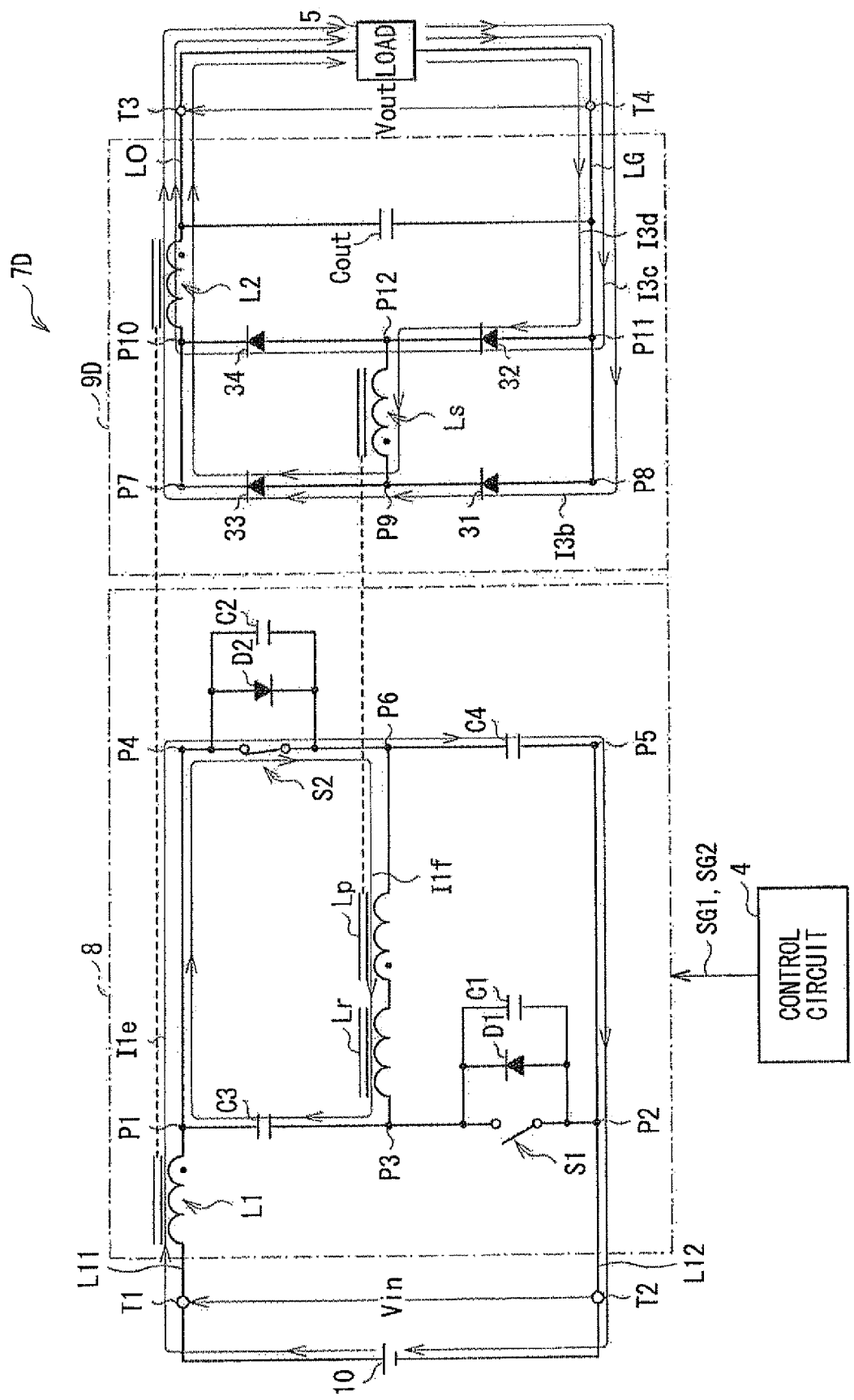
FIG. 47 is a circuit diagram of the switching power supply of FIG. 44, illustrating the operation thereof after the operation of FIG. 46.

Next, in a period from the timing t52 to t53 in FIG. 47, the switching element S2 is turned on at the timing t52 (B in FIG. 44). In response thereto, similarly to the second embodiment, the mesh currents I1e and I1f as shown in the drawing start flowing in the switching circuit 8. On the other hand, on the secondary side of the transformer, i.e., in the rectifying/smoothing circuit 9D, in addition to the mesh currents I3b and I3c described above, the mesh current I3d newly starts flowing. To be specific, the flow of the mesh current I3d circulates via the secondary winding Ls, the rectifying diode 33, the inductor L2, the output terminal T3, the load 5, the output terminal T4, and the rectifying diode 32 in this order. With the flows of such mesh currents I31, I3b and I3c, the load 5 is accordingly driven.

Figure 48:
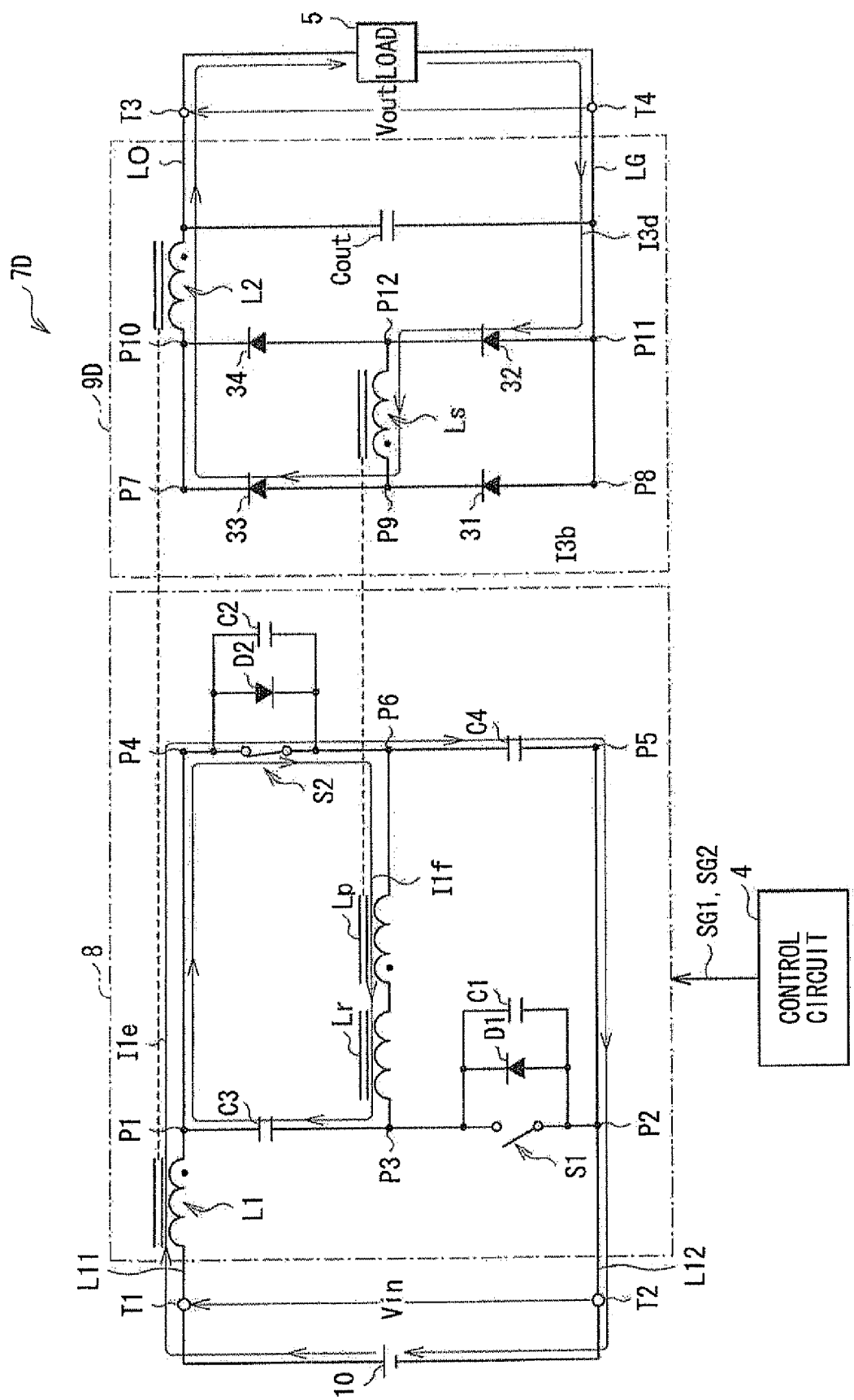
FIG. 48 is a circuit diagram of the switching power supply of FIG. 44, illustrating the operation thereof after the operation of FIG. 47.

Next, in a period from the timing t53 to t54 in FIG. 48, the mesh currents I1e and I1f continue to flow in the switching circuit 8. On the other hand, on the secondary side of the transformer, i.e., in the rectifying/smoothing circuit 9D, the mesh currents I3b and I3c described above do not flow any more. That is, in the rectifying/smoothing circuit 9D, only the flow of the mesh current I3d drives the load 5.

Figure 49:
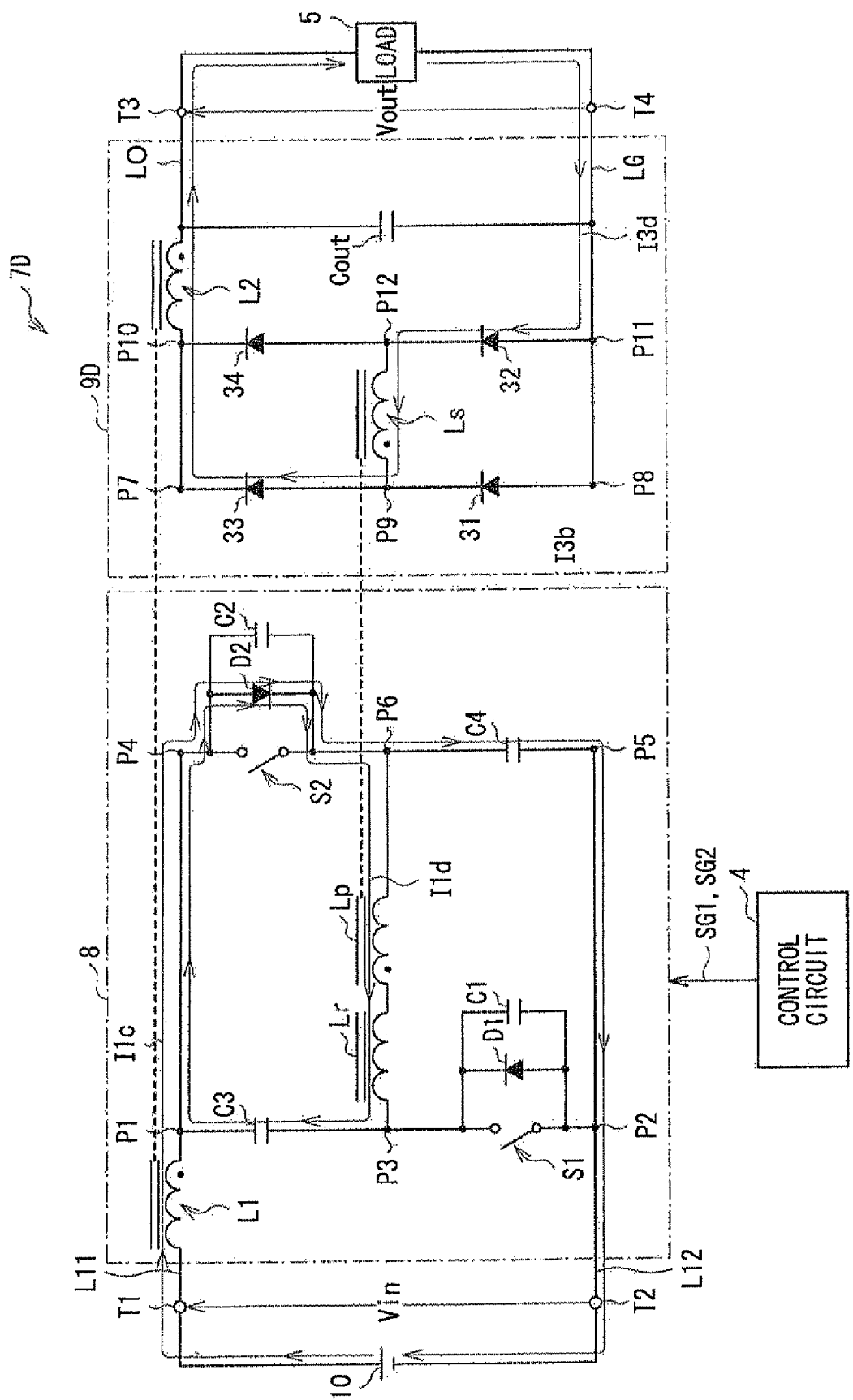
FIG. 49 is a circuit diagram of the switching power supply of FIG. 44, illustrating the operation thereof after the operation of FIG. 48.

Next, in a period from timing t54 to t55 in FIG. 49, the switching element S2 is turned OFF at the timing t54 (B in FIG. 44). In response thereto, the mesh currents I1mayd I1d described above start flowing in the switching circuit 8 as shown in the drawing. On the other hand, on the secondary side of the transformer, i.e., in the rectifying/smoothing circuit 9D, the mesh current I3d continues to flow so that the load 5 is accordingly driven thereby.

Figure 50:
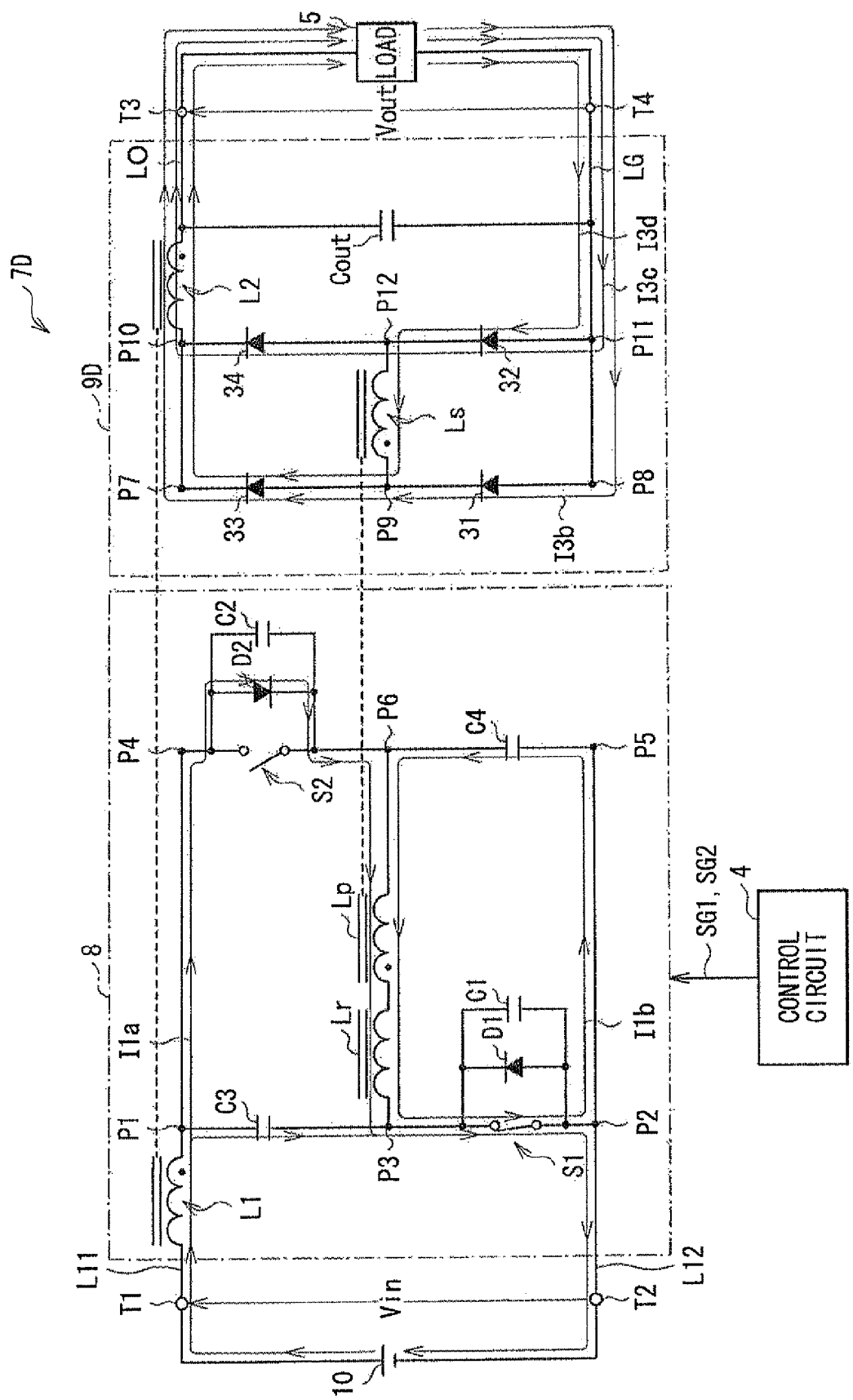
FIG. 50 is a circuit diagram of the switching power supply of FIG. 44, illustrating the operation thereof after the operation of FIG. 49.

Next, in a period from the timing t55 to t56 of FIG. 50, the switching element S1 is turned ON at the timing t55 (A in FIG. 44). In response thereto, the mesh currents I1a and I1b described above start flowing in the switching circuit 8 as shown in the drawing. On the other hand, on the secondary side of the transformer, i.e., in the rectifying/smoothing circuit 9D, the mesh currents I3b, I3mayd I3d described above start flowing as shown in the drawing so that the load 5 is accordingly driven thereby.

Figure 51:
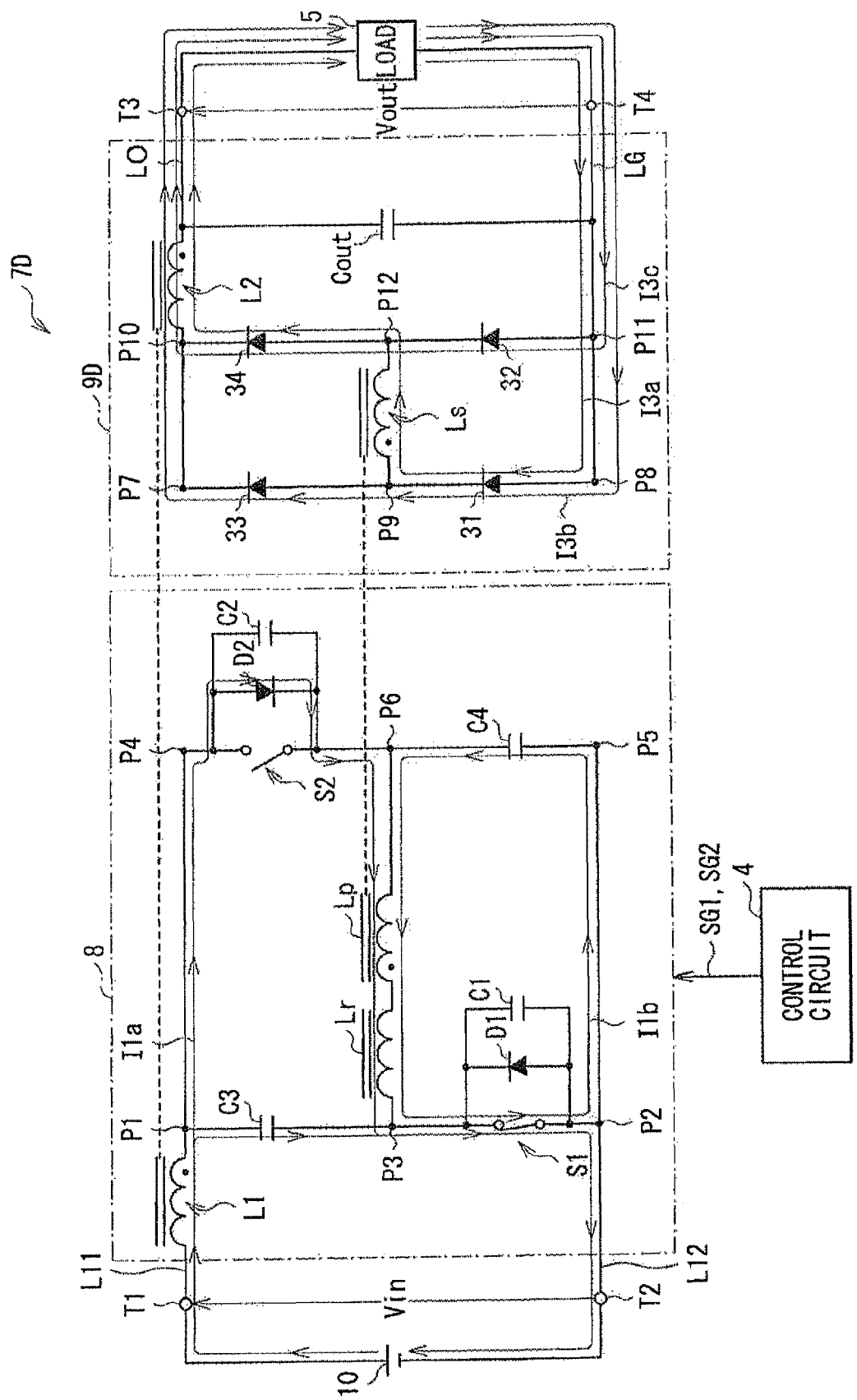
FIG. 51 is a circuit diagram of the switching power supply of FIG. 44, illustrating the operation thereof after the operation of FIG. 50.

Next, in a period from the timing t56 to t57 in FIG. 51, first of all, at the timing t56, the mesh currents I3a, I3b, and I3c described above start flowing on the secondary side of the transformer, i.e., in the rectifying/smoothing circuit 9D, as shown in the drawing so that the load 5 is accordingly driven thereby. Thereafter, at the timing t57 (t50), as shown in FIG. 45, the mesh current I3a described above starts flowing on the secondary side of the transformer, i.e., in the rectifying/smoothing circuit 9D. This is the end of the operation of the switching power supply 7D as a DC-DC converter for a cycle when the input voltage Vin applied between the input terminals T1 and T2 is positive and DC, and the state thereof becomes equivalent to that at the timing t50 in FIG. 44.

On the other hand, when the input voltage Vin coming from the DC power supply 10 for application between the input terminals T1 and T2 is negative (higher in value on the side of the input terminal T2) and DC, the switching power supply 7D operates as a DC-DC converter as below.

That is, also in the switching power supply 7D in this third embodiment, the configuration of the first bridge circuit in the switching circuit 8 is point symmetric. The configuration of the third bridge circuit in the rectifying/smoothing circuit 9D is line symmetric as shown in FIG. 43 described above similarly to the rectifying/smoothing circuit 9 in the second embodiment.

With the first and third bridge circuits configured symmetry as such, also when the input voltage Vin coming from the DC power supply 10 for application between the input terminals T1 and T2 is negative and DC, the switching power supply 7D operates similarly to the DC-DC converter described above by referring to FIGS. 44A to 51, i.e., operation when the input voltage Vin coming from the DC power supply 10 for application between the input terminals T1 and T2 is positive and DC.

[2. Operation as AC-DC Converter]

As will be known from the above, if the input voltage Vin coming from the AC power supply 20 for application between the input terminals T1 and T2 is AC, the switching power supply 7D operates as an AC-DC converter as below. That is, by alternately repeating the above-described operation as the DC-DC converter when the input voltage Vin for application between the input terminals T1 and T2 is positive and DC, and the above-described operation as the DC-DC converter when the input voltage Vin for application between the input terminals T1 and T2 is negative and DC, the switching power supply 7D becomes feasible to operate as an AC-DC converter when the input voltage Vin is AC for application between the input terminals T1 and T2. As such, the switching power supply 7D in this embodiment is also feasible to operate both as a DC-DC converter and an AC-DC converter with a single circuit similarly to the switching power supply 7 in the second embodiment.

Such a configuration also favorably eliminates the need for such a rectifying bridge circuit unlike in the comparison example described above, and reduces the number of the circuits needed on the primary side of the transformer, i.e., reduced to one (one-phase) circuit (switching circuit 2). Accordingly, compared with the comparison example described above, the resulting switching power supply 7D of this embodiment is feasible to operate as an AC-DC converter with a simple configuration, i.e., with a reduced number of components.

Further, because the rectifying/smoothing circuit 9D is provided therein with the inductor L2, compared with the configuration not including such an inductor L2, not only the output current Iout may be reduced in ripple but also the input current, i.e., current IL1 flowing through the inductor L1, may be also reduced in ripple.

[3. Voltage Boosting]

Note that, also in this third embodiment, similarly to the second embodiment, the switching circuit 2 is preferably capable of the voltage boosting of the input voltage Vin through control over the duty ratio between the switching elements S1 and S2.

To be specific, in the steady state, the inductances of the inductors L1 and L2, and that of the primary winding Lp may be expressed by the following equations 16 to 18, where the number of winding turns of the primary winding Lp in the transformer is Np, the number of winding turns of the secondary winding Ls is Ns, the ratio between the primary winding Lp and the secondary winding Ls in terms of winding turns is n (=Np/Ns), the number of winding turns of the inductor L1 is Np1, the number of winding turns of the inductor L2 is Ns1, the ratio between the inductors L1 and L2 in terms of the winding turns is n1 (=Np1/Ns1), the coupling coefficient between the inductors L1 and L2 is k (0<k≦1), the ON-time and OFF-time of the switching element S1 are respectively ton and toff, the switching cycle is T (=ton+toff), and the on-duty ratio of the switching element S1 is D (=ton/T). Also in the equations, Vin denotes the input voltage, the Vout denotes the output voltage, VC3 denotes the voltage in the capacitor C3 between both ends, and the VC4 denotes the voltage in the capacitor C4 between both ends.

D of the switching element S1 is so set as to satisfy (Vout/Vin)>1, the input voltage Vin is to be boosted as described above. That is, satisfying 2D×(1−D)>n×(1−2D) will do in this example. Also assuming that the ratio of winding turns satisfies n=1, it is known that the on-duty ratio D of the switching element S1 becomes larger than 0.5, i.e., D<0.5, with the equation 19.

Equation 7

$$\begin{cases} \dfrac{V_{out}}{V_{in}} = \dfrac{2}{n} \cdot \dfrac{D(1-D)}{1-2D} & (19) \\[6pt] VC3 = \dfrac{D}{1-2D} V_{in} & (20) \\[6pt] VC4 = \dfrac{1-D}{1-2D} V_{in} & (21) \end{cases}$$

Figure 52:
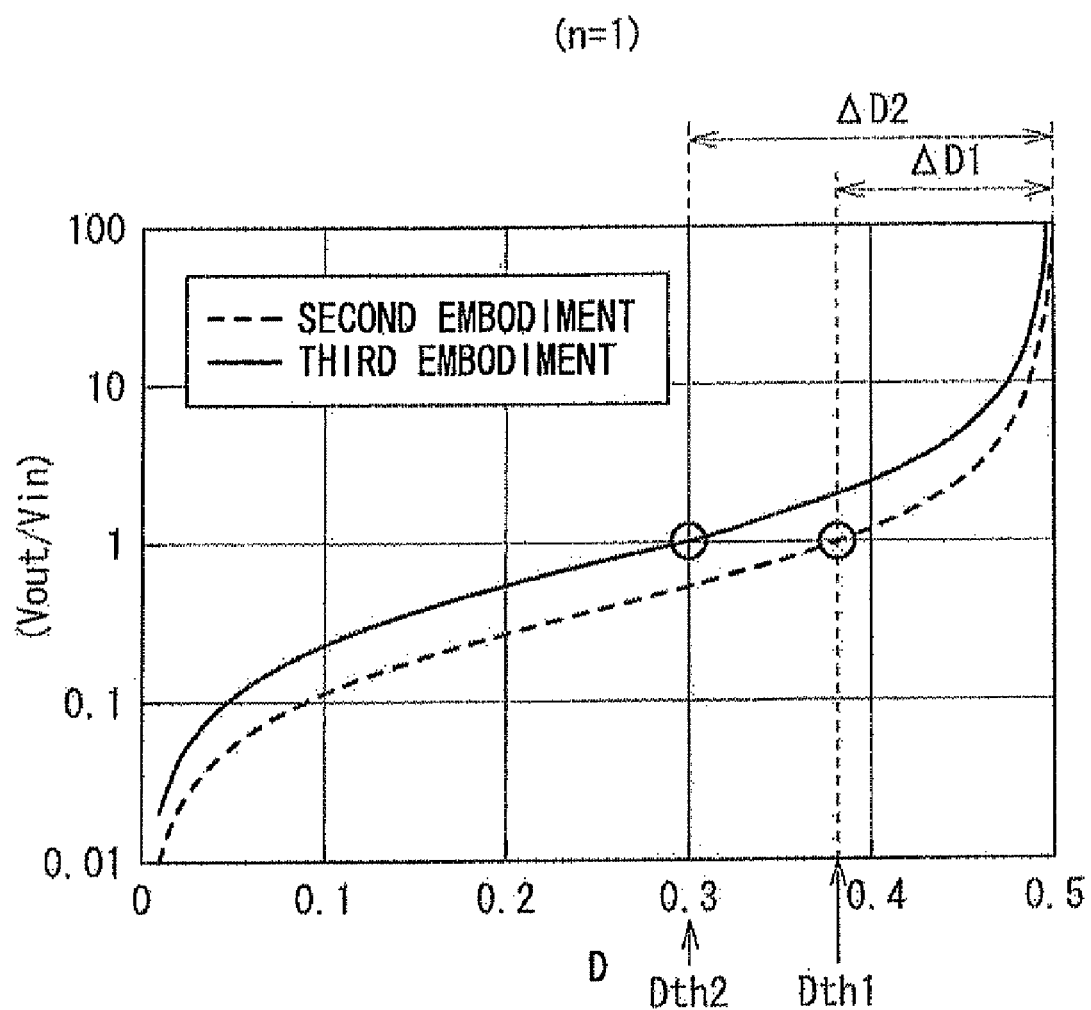
FIG. 52 is a characteristic diagram showing an exemplary relationship between an on-duty ratio and an input/output voltage ratio in the switching power supplies of FIGS. 24 and 42.

As such, as shown in FIG. 52, for example, by setting the on-duty ratio D of the switching element S1 to be larger than a duty threshold value Dth2, i.e., a value corresponding to the on-duty ratio D when (Vout/Vin)=1 is satisfied, it is known that the input voltage Vin is to be actually boosted.

With a comparison between the equation 13 in the second embodiment and the equation 19 in the third embodiment, with the equation 19, the ratio between the output voltage Vout and the input voltage Vin (Vout/Vin) takes a value twice as large as that with the equation 13. Therefore, as is known from FIG. 52, the duty threshold value Dth2 in the third embodiment becomes larger than the duty threshold value Dth1 in the second embodiment. As a result, the voltage boosting period ΔD2 in this third embodiment, i.e., the on-duty ratio D ready for the voltage boosting, becomes longer than the voltage boosting period ΔD1 in the second embodiment so that the resulting voltage boosting may be implemented with more ease.

As described above, in this third embodiment, the switching power supply 7D is provided with the switching circuit 8 of the configuration of FIG. 42, the transformer including the primary winding Lp and the secondary winding Ls, and the rectifying/smoothing circuit 9D. This configuration favorably leads to the same effects as the switching power supply 7 of the second embodiment above with the advantages similar thereto. That is, the switching power supply 7D becomes feasible to operate both as a DC-DC converter and an AC-DC converter with a single circuit, thereby being able to increase the operation flexibility therein.

Equation 6

$$\begin{cases} \dfrac{\dfrac{k}{1+k}(VC3 + V_{in} + n1(V_{out} - VC4))}{kL1} t_{on} = \dfrac{\dfrac{k}{1+k}\left(\begin{array}{c} VC4 - V_{in} + \\ n1(V_{C1} - V_{out}) \end{array}\right)}{kL1} t_{off} & (16) \\[10pt] \dfrac{VC4}{Lp} t_{on} = \dfrac{VC3}{Lp} t_{off} & (17) \\[10pt] \dfrac{\dfrac{VC4}{n} - V_{out} + \dfrac{k}{1+k}\left(\begin{array}{c} \dfrac{VC3 + V_{in}}{n1} + \\ V_{out} - VC4 \end{array}\right)}{(1-k)L2} t_{on} = \dfrac{V_{out} - \dfrac{VC3}{n} - \dfrac{k}{1+k}\left(\begin{array}{c} \dfrac{VC4 - V_{in}}{n1} + \\ VC3 - V_{out} \end{array}\right)}{(1-k)L2} t_{off} & (18) \end{cases}$$

Through rearrangement of these equations 16 to 18, the following equations 19 to 21 are to be derived with which the input/output voltage ratio (Vout/Vin) and the voltages VC3 and VC4 are defined. With the equation 19, if the on-duty ratio Further, because the rectifying/smoothing circuit 9D is provided therein with the inductor L2, compared with the configuration not including such an inductor L2, not only the output current Iout may be reduced in ripple but also the input current, i.e., current IL1 flowing through the inductor L1, may be also reduced in ripple. As such, for the switching power supply 7D to operate as a DC-DC converter, for example, this accordingly leads to the reduction of noise in the input current, and to the possible improvement of a power factor when the switching power supply 7D operates as an AC-DC converter, for example.

Described next are modified examples (modified examples 8 and 9) of the third embodiment described above. In the below, any component same as that in the third embodiment is provided with the same reference numeral, and is not described again if appropriate.

Modified Example 8

Figure 53:
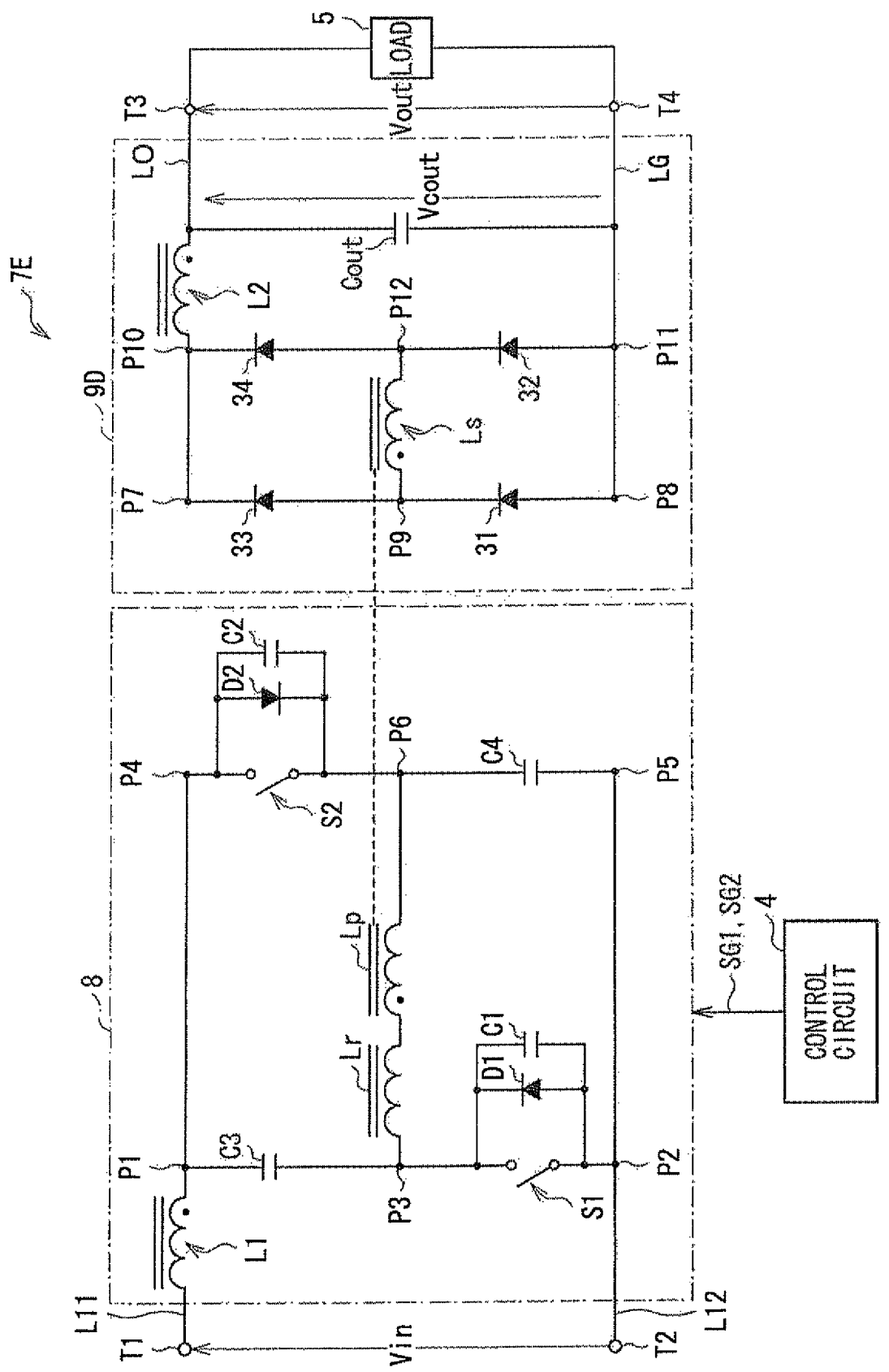
FIG. 53 is a circuit diagram of a switching power supply in a modified example (modified example 8) of the third embodiment, showing the configuration thereof.

FIG. 53 shows the circuit configuration of a switching power supply, i.e., switching power supply 7E, in a modified example 8. The switching power supply 7E in this modified example 8 is configured similarly to the switching power supply 7D in the third embodiment described above except that the inductors L1 and L2 are not magnetically coupled to each other. That is, the coupling coefficient k between the inductors L1 and L2 may be so set arbitrarily as to take any value between 0 and 1, i.e., $0 \leq k \leq 1$.

Also in the switching power supply 7E of such a configuration, the same effects as the switching power supply 7D of the third embodiment above may be achieved with the advantages similar thereto.

Figure 54:
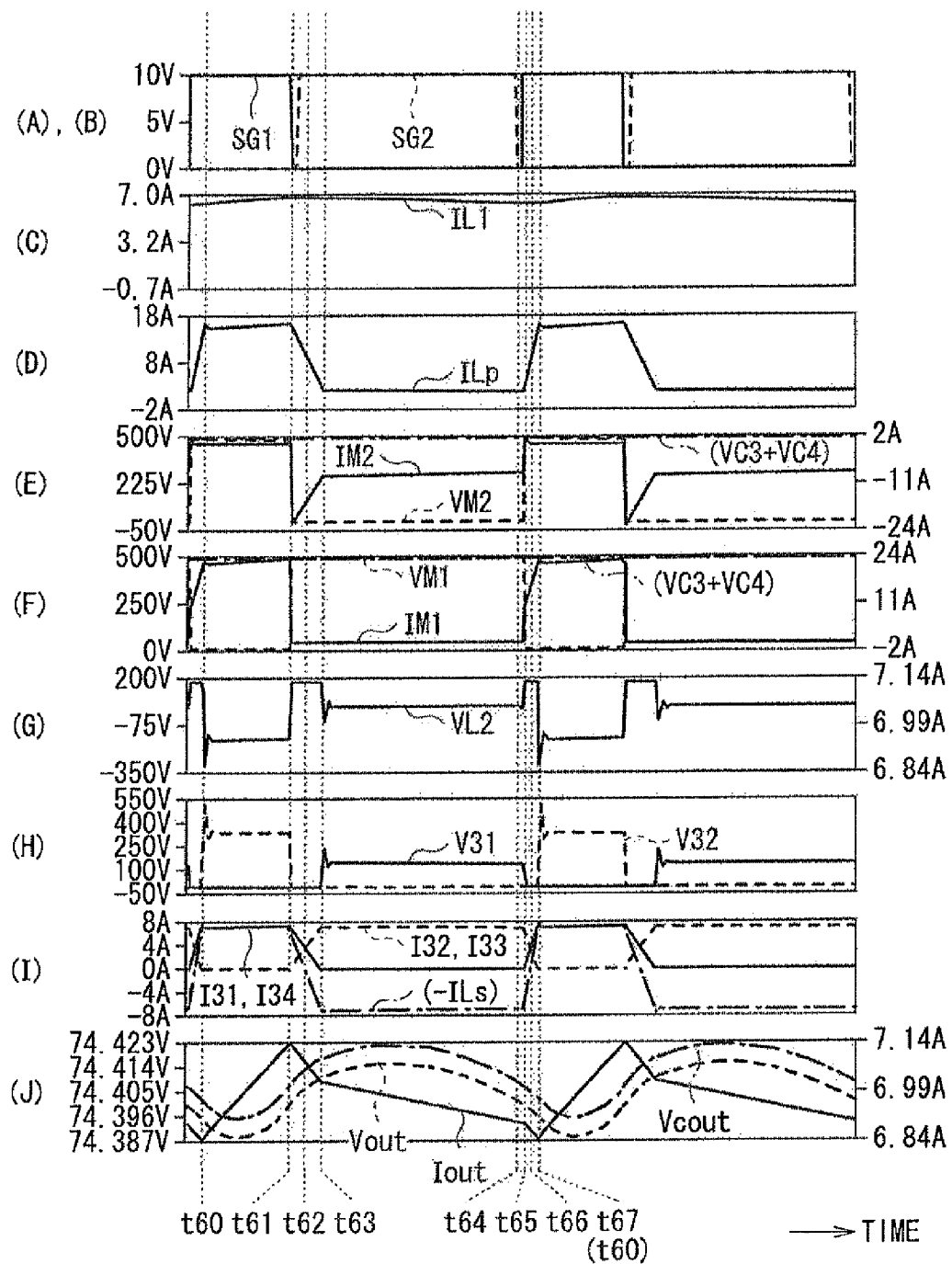
FIGS. 54A to 54J are timing diagrams of the switching power supply of FIG. 53, showing an exemplary operation thereof, i.e., operation as a DC-DC converter during a positive input.

As an example, as exemplarily shown in A to J in FIG. 54, when operating as a DC-DC converter, i.e., when the input voltage Vin applied between the input terminals T1 and T2 is positive and DC: timings t60 to t67, the switching power supply 7E operates similarly to A to J in FIG. 44 described in the third embodiment above (timings t50 to t57). Although not shown, also when operating as an AC-DC converter, the switching power supply 7E operates similarly as described in the third embodiment above.

With the switching power supply 7E in this modified example 8, in the steady state, the inductances of the inductors L1 and L2, and that of the primary winding Lp may be expressed by the following equation 22 to 24. Through rearrangement of these equations 22 to 24, similarly to the third embodiment, the foregoing equations 19 to 21 are to be derived with which the input/output voltage ratio (Vout/Vin) and the voltages VC3 and VC4 are defined.

Equation 6

Equation 8

$$\begin{cases} \dfrac{V_{in} + VC3}{L1} t_{on} = \dfrac{VC4 - V_{in}}{L1} t_{off} & (22) \\[2mm] \dfrac{VC4}{Lp} t_{on} = \dfrac{VC3}{Lp} t_{off} & (23) \\[2mm] \dfrac{\frac{1}{n} \cdot VC4 - V_{out}}{L2} t_{on} = \dfrac{V_{out} - \frac{1}{n} \cdot VC3}{L2} t_{off} & (24) \end{cases}$$

Modified Example 9

Figure 55:
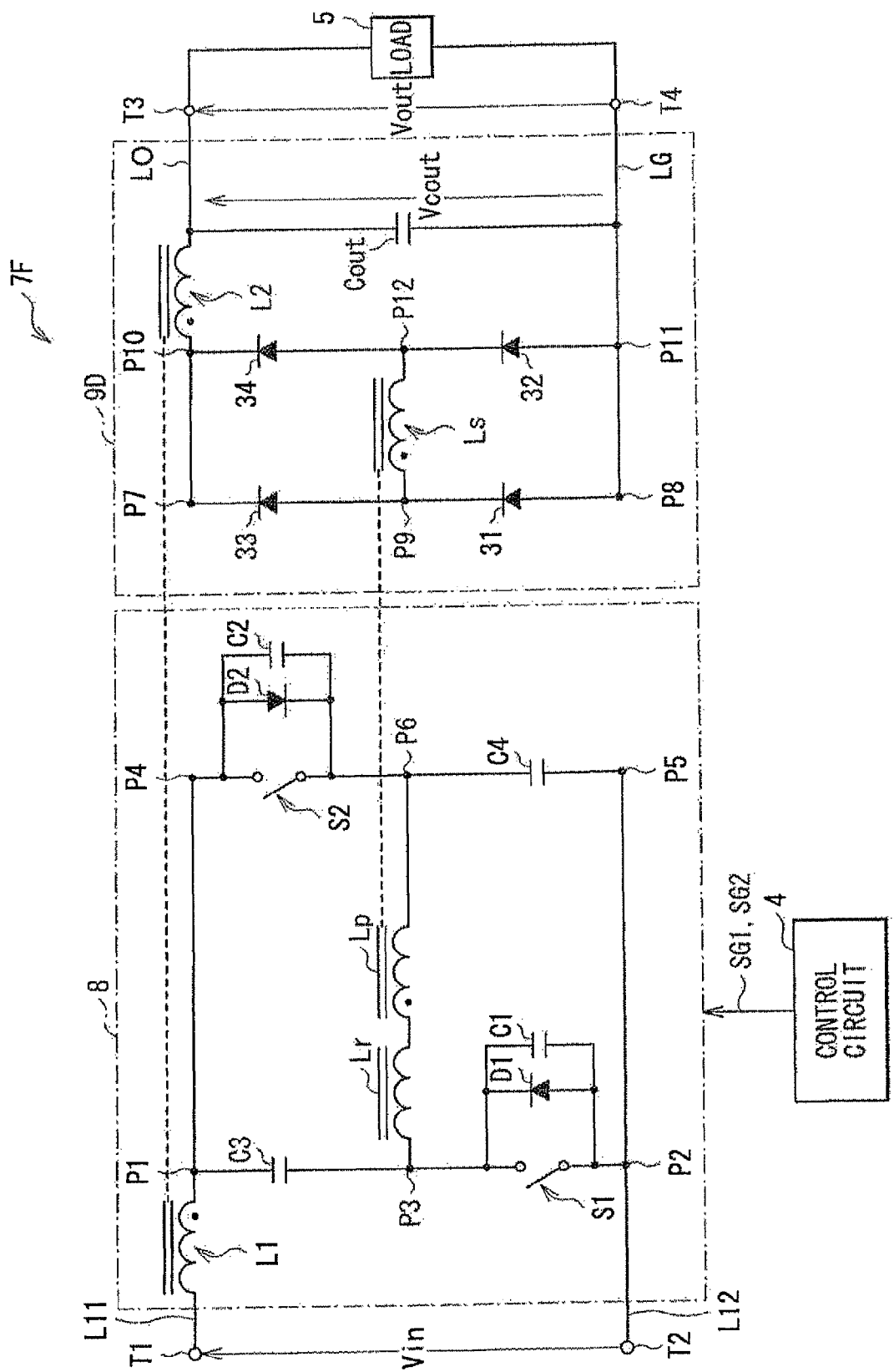
FIG. 55 is a circuit diagram of a switching power supply in another modified example (modified example 9) of the third embodiment, showing the configuration thereof.

FIG. 55 shows the circuit configuration of a switching power supply, i.e., switching power supply 7F, in a modified example 9. The switching power supply 7F in this modified example 9 is configured similarly to the switching power supply 7D in the third embodiment described above except that the winding turns of the inductor L2 are opposite in direction.

Also in the switching power supply 7F of such a configuration, the same effects as the switching power supply 7D of the third embodiment above may be achieved with the advantages similar thereto.

Figure 56:
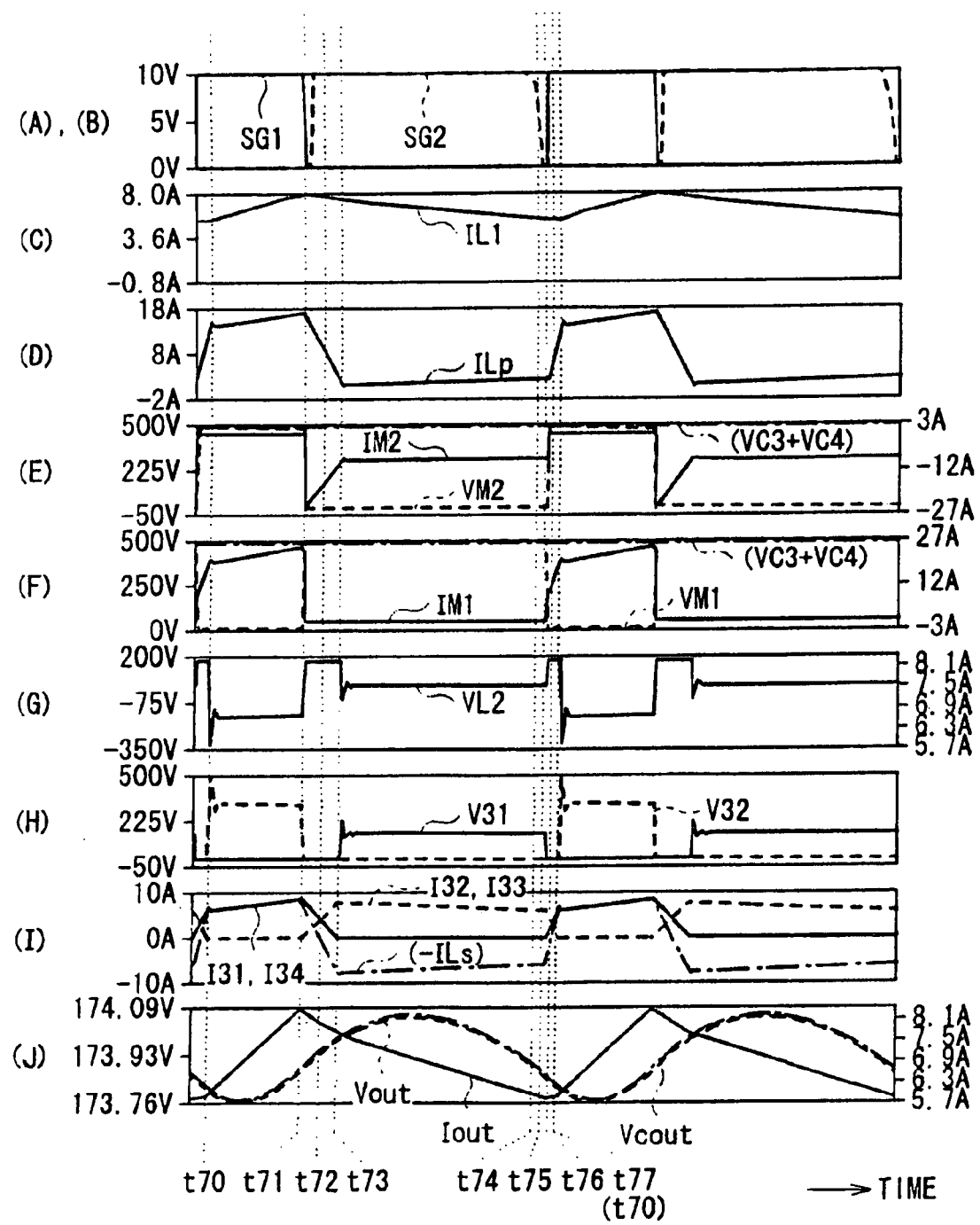
FIGS. 56A to 56J are timing diagrams of the switching power supply of FIG. 55, showing an exemplary operation thereof, i.e., operation as a DC-DC converter during a positive input.

As an example, as exemplarily shown in A to J in FIG. 56, when operating as a DC-DC converter, i.e., when the input voltage Vin applied between the input terminals T1 and T2 is positive and DC: timings t70 to t77, the switching power supply 7F operates similarly to A to J in FIG. 44 described in the third embodiment above (timings t50 to t57). Although not shown, also when operating as an AC-DC converter, the switching power supply 7F operates similarly as described in the third embodiment above.

Also with the switching power supply 7F in this modified example 9, in the steady state, the inductances of the inductors L1 and L2, and that of the primary winding Lp may be expressed by the following equation 25 to 27. Through rearrangement of these equations 25 to 27, similarly to the third embodiment, the foregoing equations 19 to 21 are to be derived with which the input/output voltage ratio (Vout/Vin) and the voltages VC3 and VC4 are defined.

$$\begin{cases} \dfrac{\frac{k}{1+k}\left(\begin{array}{c}VC3 + V_{in} + \\ n1(VC4 - V_{out})\end{array}\right)}{kL1} t_{on} = \dfrac{\frac{k}{1+k}\left(\begin{array}{c}VC4 - V_{in} + \\ n1(V_{out} - VC3)\end{array}\right)}{kL1} t_{off} & (25) \\[4mm] \dfrac{VC4}{Lp} t_{on} = \dfrac{VC3}{Lp} t_{off} & (26) \\[4mm] \dfrac{\dfrac{VC4}{n} - V_{out} + \dfrac{k}{1+k}\left(\begin{array}{c}\frac{VC3+V_{in}}{n1} + \\ VC4 - V_{out}\end{array}\right)}{(1-k)L2} t_{on} = \dfrac{V_{out} - \dfrac{VC3}{n} - \dfrac{k}{1+k}\left(\begin{array}{c}\frac{VC4-V_{in}}{n1} + \\ V_{out} - VC3\end{array}\right)}{(1-k)L2} t_{off} & (27) \end{cases}$$

Note that, in this modified example 9 or the modified example 8 described above, similarly to the modified example 6 of the second embodiment described above, the winding turns of the secondary winding Ls may be opposite in direction.

Other Modified Examples

While the invention has been described in detail with several embodiments and modified examples, the foregoing description is in all aspects illustrative and not restrictive. It is understood that numerous other modifications and variations may be devised.

Described in the above embodiments and others is the case that the switching elements S1 and S2 both perform the switching operation by PWM as indicated by the drive signals SG1 and SG2 in FIG. 57A, for example. The switching elements S1 and S2 are not restricted to perform the switching operation as such, and alternatively, either the switching element S1 or S2 may perform the switching operation by PWM, and the remaining switching element may remain turned OFF as indicated by the drive signals SG1 and SG2 in FIGS. 57B and 57C. To be specific, FIG. 57B example shows a case where the switching element S1 performs the switching operation by PWM, and the switching element S2 remains turned OFF, i.e., corresponding to the case described above when the switching power supply operates as a DC-DC converter during a positive input. On the other hand, FIG. 57C example shows a case where the switching element S2 performs the switching operation by PWM, and the switching element S1 remains turned OFF, i.e., corresponding to the case described above when the switching power supply operates as a DC-DC converter during a negative input. With such configurations, the circuit in charge of controlling the switching operation in the switching circuit, i.e., drive circuit, may be simplified in configuration, thereby favorably leading to the reduction of the number of components and the cost. Herein, for the switching operation by the switching elements S1 and S2 of FIGS. 57A to 57C as such, as described above, the switching signals SG1 and SG2 may be changed in content depending on the polarity, i.e., whether the operation is on the positive or negative side, thereby changing the operation between the switching elements S1 and S2.

Figure 58A:
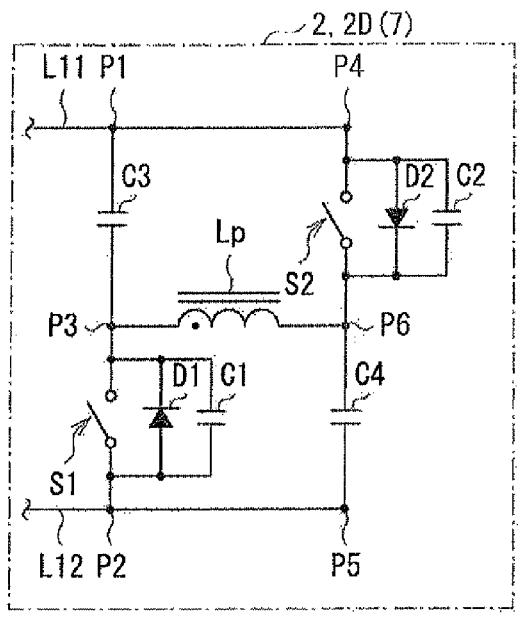
FIGS. 58A to 58D are each a timing circuit of a switching circuit in another modified example applicable to the first to third embodiments, showing the configuration thereof.
Figure 58B:
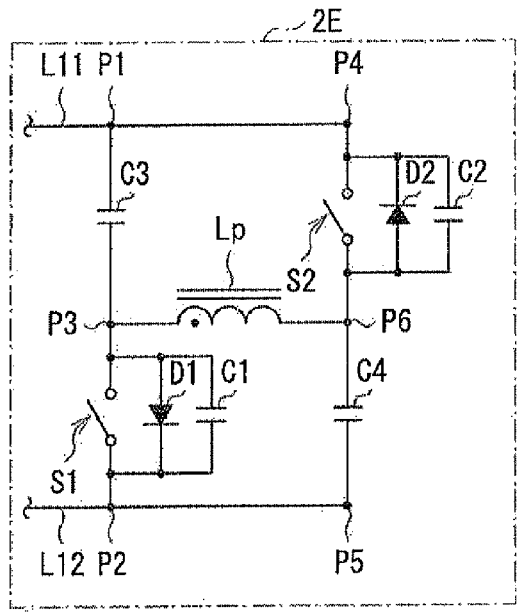
Figure 58C:
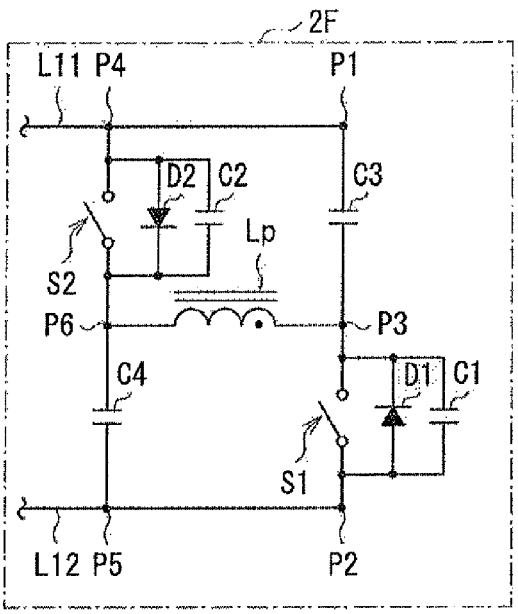
Figure 58D:
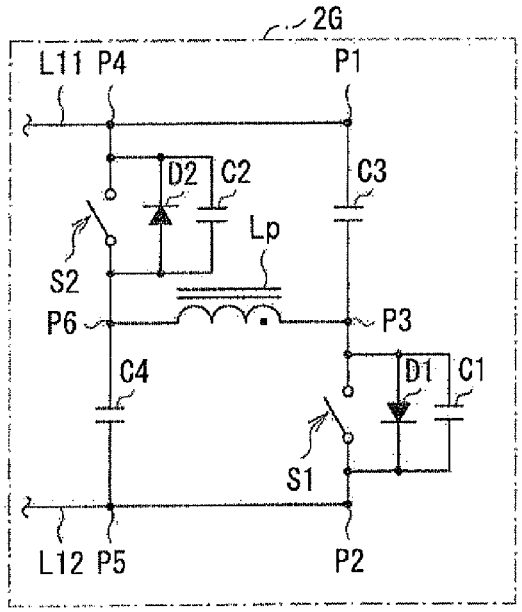
Figure 59A:
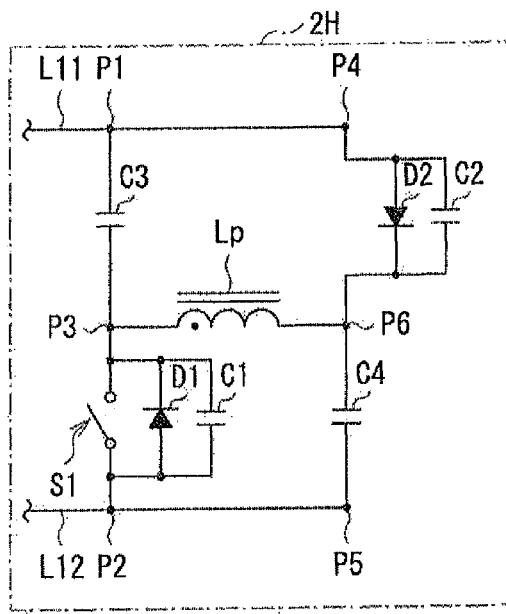
FIGS. 59A to 59D are each a timing circuit of a switching circuit in still another modified example applicable to the first to third embodiments, showing the configuration thereof.
Figure 59B:
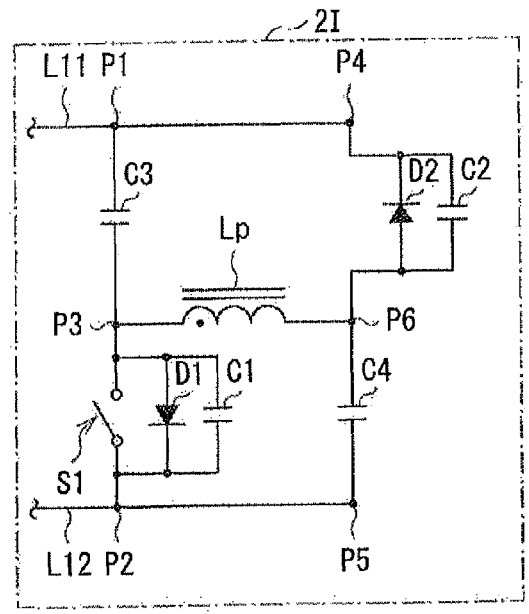
Figure 59C:
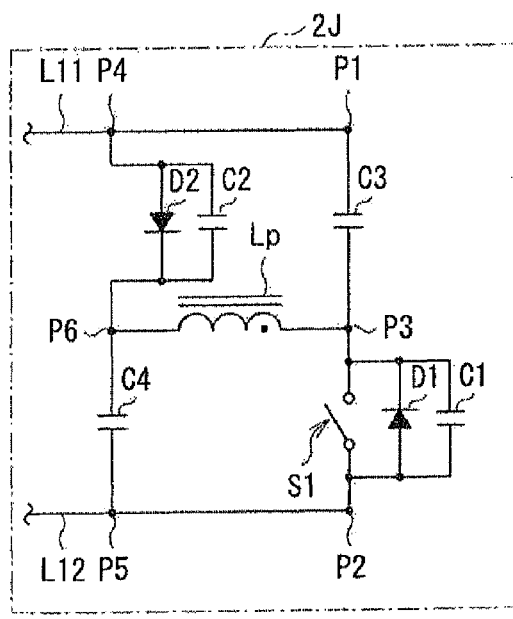
Figure 59D:
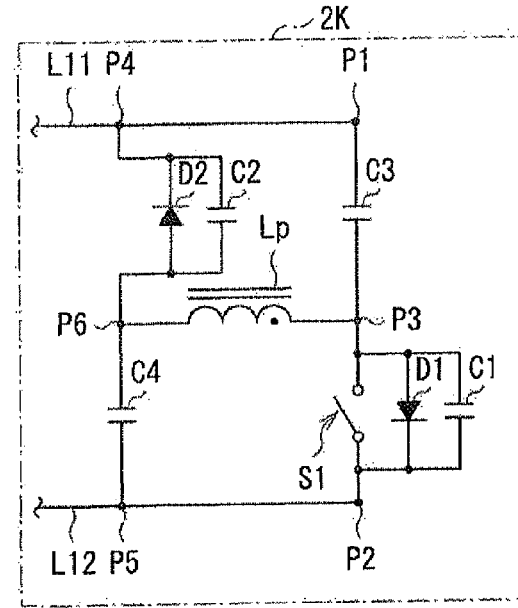
Figure 60A:
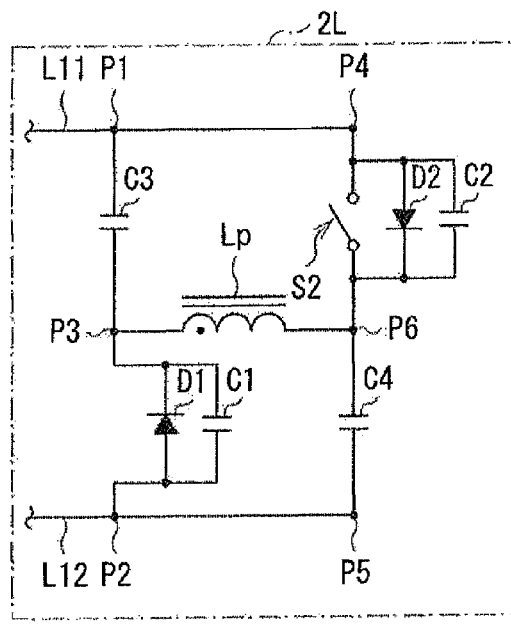
FIGS. 60A to 60D are each a timing circuit of a switching circuit in still another modified example applicable to the first to third embodiments, showing the configuration thereof.
Figure 60B:
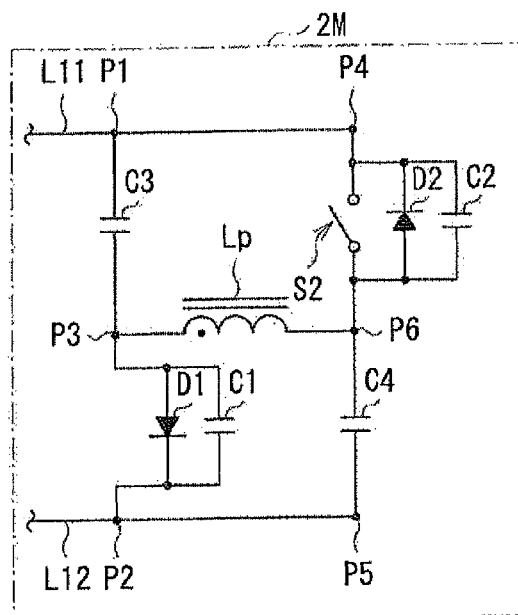
Figure 60C:
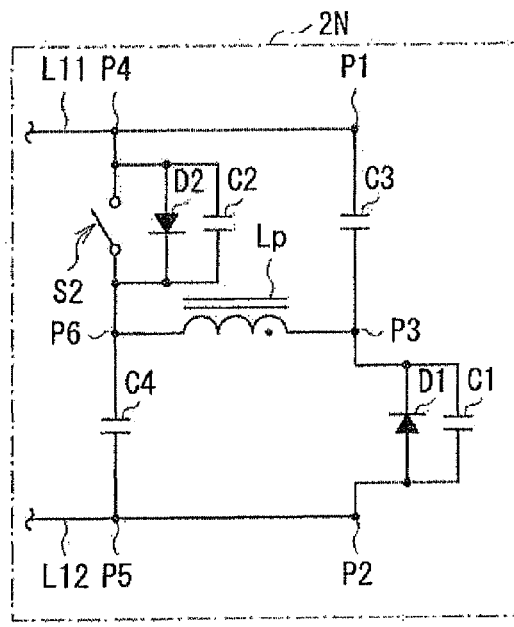
Figure 60D:
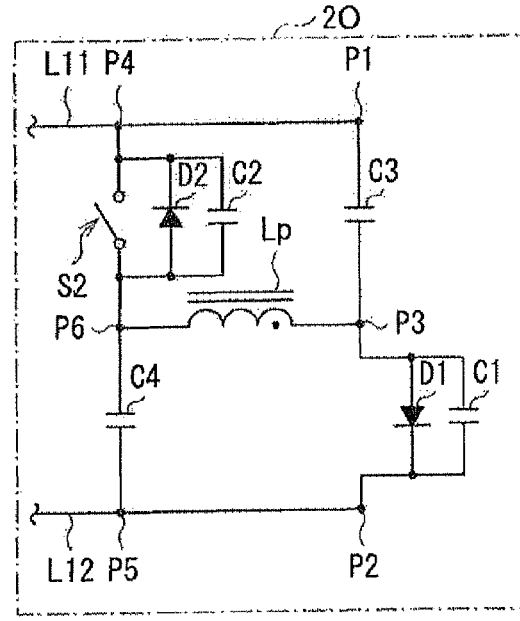

Exemplified in the above embodiments and others is the switching circuits 2 and 2D (7), i.e., the switching circuit 2 and others, each including the first bridge circuit configured as shown in FIG. 58A. The first bridge circuit in the switching circuit is surely not restrictive to the configuration as such. Alternatively, specifically like a switching circuit 2E of FIG. 58B, for example, in the bridge circuit in the switching circuit 2 and others, the diodes D1 and D2 may face in the opposite direction. That is, in the diode D1, the anode thereof may be disposed on the side of the connection point P3, and the cathode thereof may be disposed on the side of the connection point P2. In the diode D2, the anode thereof may be disposed on the side of the connection point P6, and the cathode thereof may be disposed on the side of the connection point P4. Still alternatively, like switching circuits 2F and 2G in FIGS. 58M and 58D, for example, their bridge circuits may be so configured that the arms are located opposite to those in the switching circuits 2 and others, and 2E. In the switching circuit 2F in FIG. 58C, the diodes D1 and D2 are so disposed as to be oriented similarly to those in the switching circuit 2 and others. In the switching circuit 2G in FIG. 58D, on the other hand, the diodes D1 and D2 are so disposed as to be oriented similarly to those in the switching circuit 2E. Note that, in FIGS. 58A to 58D, the inductor Lr is not shown, and therein, primary windings are collectively shown as one primary winding Lp.

Also in the embodiments above and others, as shown in FIGS. 58A to 58D described above, exemplified is the case that the switching circuit is provided therein with the two switching elements S1 and S2. The configuration of the switching circuit is surely not restrictive thereto. That is, like switching circuits 2H to 2K of FIGS. 59A to 59D, and like the switching circuits 2L to 2O shown in FIGS. 60A to 60D, only either the switching element S1 or S2 may be provided. To be specific, in each of the switching circuits 2H to 2K in FIGS. 59A to 59D, only the switching element S1 is provided. On the other hand, in each of the switching circuits 2L to 2O in FIGS. 60A to 60D, only the switching element S2 is provided. More in detail, in these switching circuits 2H to 2O, the diodes D1 and D2 are in a diagonal arrangement, and the capacitors C3 and C4 are also in a diagonal arrangement, thereby configuring the first bridge circuit. Also in the configuration, either the diode D1 or D2 is connected in parallel with the switching element S1 or S2, and the diodes D1 and D2 are so disposed as to face in the opposite direction. As such, compared with the above embodiments and others in which both of the drive signals SG1 and SG2 are provided to the switching circuit as exemplarily shown in FIG. 61A, the switching circuits 2H to 2K are each provided with only the drive signal SG1 as exemplarily shown in FIG. 61B, and the switching circuits 2L to 2O are each provided with only the drive signal SG2 as exemplarily shown in FIG. 61C. The resulting switching power supply provided with the switching circuits 2H to 2O configured as such operates as a DC-DC converter. Also in such switching circuits 2H to 2O, because either the diode D1 or D2 is connected in parallel with the switching element S1 or S2, the number of the switching elements, i.e., the number of elements, may be reduced in the switching circuit compared with the configuration in which the diodes D1 and D2 are each connected with the switching elements S1 and S2 in parallel. Accordingly, the resulting switching power supply may operate as a DC-DC converter with a reduced number of elements in the switching circuit, thereby implementing the operation as a DC-DC converter with a simple configuration. Also in these cases, similarly to the above embodiments and others, the switching elements S1 and S2 are each exemplified by a MOS-FET, an IGBT, and others. When the switching elements are each a MOS-FET, the capacitors C1 and C2, and the diodes D1 and D2 may be each configured by the parasitic capacitance of the MOS-FET or by the body diode thereof. Alternatively, the capacitors C1 and C2 may be each configured by the junction capacitance of the diodes D1 and D2. If this is the configuration, there is no more need to provide the capacitors C1 and C2, and the diodes D1 and D2 separately from the switching elements, thereby being able to simplify the circuit configuration.

Also in the above embodiments and others, mainly described is the case that the switching power supply operates both as a DC-DC converter and an AC-DC converter, but this is surely not restrictive. Also in the above embodiments and others, described is the case that the switching circuit is capable of the voltage boosting. This is also not restrictive, and the switching circuit may not necessarily perform such voltage boosting, or may be capable of any of the operations of voltage boosting, voltage bucking, and voltage boosting-bucking.

Still alternatively, the modified examples or others described in the above embodiments and others may be combined together.

The present application contains subject matter related to that disclosed in Japanese Priority Patent Application JP 2010-124610 filed in the Japan Patent Office on May 31, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply that generates a DC output voltage by conversion of an input voltage coming from a pair of input terminals, and outputs the resulting DC output voltage from a pair of output terminals, the switching power supply comprising:
 a transformer including a primary winding disposed on a side of the pair of input terminals, and a secondary winding disposed on a side of the pair of output terminals;
 a switching circuit disposed on the side of the pair of input terminals, and including first and second switching elements, first and second rectifying elements, first and second capacitive elements, and a first inductor; and
 a rectifying/smoothing circuit disposed on the side of the pair of output terminals, wherein
 a first bridge circuit is configured, in the switching circuit, by the first and second switching elements located in a diagonal arrangement, and the first and second capacitive elements also located in a diagonal arrangement,
 the first rectifying element is connected in parallel to the first switching element, the second rectifying element is connected in parallel to the second switching element, and one of the first and second rectifying elements is connected in forward direction and other is connected in inverse direction,
 the first inductor is disposed on a connection line between the pair of input terminals and the first bridge circuit, and
 the primary winding is connected to the first bridge circuit to form a H-bridge configuration, and the secondary winding is disposed in the rectifying/smoothing circuit.

2. The switching power supply according to claim 1, wherein
 the rectifying/smoothing circuit includes a second inductor.

3. The switching power supply according to claim 2, wherein
 the first and second inductors are magnetically coupled to each other.

4. The switching power supply according to claim 2, wherein
 the primary winding includes first and second primary windings connected in series to each other, and
 the secondary winding includes a first secondary winding magnetically coupled to the first primary winding, and a second secondary winding magnetically coupled to the second primary winding.

5. The switching power supply according to claim 4, wherein
 the rectifying/smoothing circuit includes third and fourth rectifying elements, and a third capacitive element,
 a second bridge circuit is configured in the rectifying/smoothing circuit, by an arm including the first secondary winding and the third rectifying element, and another arm including the second secondary winding and the fourth rectifying element,
 the second inductor is connected to the second bridge circuit to form a H-bridge configuration, and
 the third capacitive element is disposed between a pair of connection lines which connects the second bridge circuit to the pair of output terminals.

6. The switching power supply according to claim 1, wherein
 voltage boosting of the input voltage is achieved through control over a duty ratio of each of the first and second switching elements in the switching circuit.

7. The switching power supply according to claim 6, wherein
 an on-duty ratio, D, of the first switching element satisfies a relationship of "$D \times (1-D) > n \times (1-2D)$", where n is a ratio between the primary and secondary windings in the transformer in terms of winding turns.

8. The switching power supply according to claim 1, wherein
 the rectifying/smoothing circuit includes first and second elements, third and fourth rectifying elements, and a third capacitive element,
 a third bridge circuit is configured, in the rectifying/smoothing circuit, by an arm including the first element and the third rectifying element, and another arm including the second element and the fourth rectifying element,
 the secondary winding is connected to the third bridge circuit to form a H-bridge configuration, and
 the third capacitive element is disposed between a pair of connection lines which connects the third bridge circuit to the pair of output terminals.

9. The switching power supply according to claim 8, wherein
 each of the first and second elements is an inductor.

10. The switching power supply according to claim 9, wherein
 the first inductor, the inductor as the first element, and the inductor as the second element are magnetically coupled together.

11. The switching power supply according to claim 9, wherein
 voltage boosting of the input voltage is achieved through control over a duty ratio of each of the first and second switching elements in the switching circuit.

12. The switching power supply according to claim 11, wherein
 an on-duty ratio, D, of the first switching element satisfies a relationship of "$D \times (1-D) > n \times (1-2D)$", where n is a ratio between the primary and secondary windings in the transformer in terms of winding turns.

13. The switching power supply according to claim 8, wherein
 each of the first and second elements is a rectifying element, and
 the rectifying/smoothing circuit includes a third inductor between the third bridge circuit and one end of the third capacitive element.

14. The switching power supply according to claim 13, wherein
 the first and third inductors are magnetically coupled to each other.

15. The switching power supply according to claim 13, wherein
 voltage boosting of the input voltage is achieved through control over a duty ratio of each of the first and second switching elements in the switching circuit.

16. The switching power supply according to claim 15, wherein
 an on-duty ratio, D, of the first switching element satisfies a relationship of "$2D \times (1-D) > n \times (1-2D)$", where n is a ratio between the primary and secondary windings in the transformer in terms of winding turns.

17. The switching power supply according to claim 1, wherein
either the first or second switching element performs a switching operation by PWM (Pulse Width Modulation), and the remaining switching element remains OFF state.

18. A switching power supply that generates a DC output voltage by conversion of an input voltage coming from a pair of input terminals, and outputs the resulting DC output voltage from a pair of output terminals, the switching power supply comprising:
a transformer including a primary winding disposed on a side of the pair of input terminals, and a secondary winding disposed on a side of the pair of output terminals;
a switching circuit disposed on the side of the pair of input terminals, and including a switching element, first and second rectifying elements, first and second capacitive elements, and a first inductor; and
a rectifying/smoothing circuit disposed on the side of the pair of output terminals, wherein
a first bridge circuit is configured, in the switching circuit, by the first and second rectifying elements located in a diagonal arrangement, and the first and second capacitive elements also located in a diagonal arrangement,
the switching element is connected in parallel to either the first or second rectifying element, and one of the first and second rectifying elements is connected in forward direction and other is connected in inverse direction,
the first inductor is disposed on a connection line between the pair of input terminals and the first bridge circuit, and
the primary winding is connected to the first bridge circuit to form a H-bridge configuration, and the secondary winding is disposed in the rectifying/smoothing circuit.

* * * * *